(12) United States Patent
Taniguchi et al.

(10) Patent No.: US 6,456,968 B1
(45) Date of Patent: Sep. 24, 2002

(54) SUBBAND ENCODING AND DECODING SYSTEM

(75) Inventors: Shohei Taniguchi, Yokohama; Makoto Yamauchi, Sagamihara, both of (JP)

(73) Assignee: Matsushita Electric Industrial Co., Ltd. (JP)

( * ) Notice: Subject to any disclaimer, the term of this patent is extended or adjusted under 35 U.S.C. 154(b) by 103 days.

(21) Appl. No.: 09/626,786

(22) Filed: Jul. 26, 2000

(30) Foreign Application Priority Data

Jul. 26, 1999 (JP) .......................................... 11-211263

(51) Int. Cl.⁷ ............................................. G10L 21/00
(52) U.S. Cl. ...................... 704/229; 704/500; 704/501; 704/230
(58) Field of Search ................................ 704/229, 230, 704/212, 500, 501, 502, 503, 504; 375/240.11

(56) References Cited

U.S. PATENT DOCUMENTS

| | | | | |
|---|---|---|---|---|
| 4,811,398 A | * | 3/1989 | Copperi et al. ............... | 381/37 |
| 5,105,463 A | | 4/1992 | Veldhuis et al. .............. | 381/30 |
| 5,808,683 A | * | 9/1998 | Tong et al. ................. | 348/398 |
| 5,864,800 A | * | 1/1999 | Imai et al. .................. | 704/229 |
| 6,098,039 A | * | 8/2000 | Nishida ..................... | 704/229 |
| 6,128,592 A | * | 10/2000 | Miyazaki et al. ............ | 704/224 |
| 6,285,982 B1 | * | 9/2001 | Imai et al. .................. | 704/503 |

FOREIGN PATENT DOCUMENTS

| | | |
|---|---|---|
| JP | 2599624 | 1/1997 |
| JP | 2732854 | 12/1997 |
| JP | 2842370 | 10/1998 |

* cited by examiner

*Primary Examiner*—Richemond Dorvil
*Assistant Examiner*—Susan McFadden
(74) *Attorney, Agent, or Firm*—Parkhurst & Wendel, LLP

(57) ABSTRACT

A band splitting section a01 splits an encoder input signal s00, entered into a subband encoding apparatus, into k band components. The band splitting section a01 outputs a subband signal s01 for each of n (<k) split bands, where n is determined by a processible upper-limit frequency on each application. A scale factor producing section a02 detects a maximum amplitude level of the subband signal s01 for each of n split bands. Then, the scale factor producing section a02 produces scale factor information s02 representing a normalized scale factor. A bit allocation producing section a04 outputs bit allocation information s04 for each of n split bands. A bit allocation value 0 is assigned to each of (n+1) to k split bands. A requantizng section a06 requalizes the subband signal s01 for each split band. A frame constructing section a07 constructs a coded frame.

29 Claims, 40 Drawing Sheets

SUBBAND ENCODING AND DECODING SYSTEM

BACKGROUND OF THE INVENTION

The present invention relates to a subband encoding and decoding system, and more particularly to a subband decoding and decoding system preferably used for compressing a digital signal.

A representative example of a conventional subband encoding system is a MPEG1 audio system. FIG. 40 is a block diagram showing a conventional MPEG1 audio layer encoding system. An encoding input digital signal s101 of sampling frequency fs, which is an input signal entered into this encoding system, is supplied to a band splitting section a101. The band splitting section a101 splits the input signal s101 for encoder into a total of k band components successive in an entire frequency zone ranging from 0 to a Nyquist frequency (fs/2) of the encoder input signal s101, where "k" is an arbitrary integer. The band splitting section a101 outputs each subband signal s102 of k split bands. For example, MPEG1 audio is based on a uniform band width slpitting of k=32. However, instead of using the uniform splitting, it is possible to adopt a non-uniform splitting depending on an individual filter arrangement, provided that each of k split band widths is a predetermined fixed value.

Furthermore, in the MPEG1 audio layer, each subband signal is down-sampled into a baseband signal by using a sort of frequency modulation. Meanwhile, while maintaining time synchronization with the band splitting section a101, a time-frequency converting section a102 performs a time-frequency conversion on the encoding input digital signal s101, wherein time window curtain is applied to w samples each having a unit sample length equivalent to a reciprocal (1/fs) of the sampling frequency. The time-frequency converting section a102 outputs frequency information s103 as a result of the time-frequency conversion. A time window length "w" used for the time-frequency conversion is obtained according to a frequency resolution "fr" required for the frequency information s103.

$$W=(1/fr)/(1/fs)$$

According to the MPEG1 audio layer, a fast Fourier transform technique is used for time-frequency conversion. The value "w" is defined as a minimum value $2^w$ satisfying the required frequency resolution "fr." Furthermore, considering time continuity, an appropriate overlap zone is provided between two consecutive time windows.

A frequency analyzing section a103 calculates a bit allocation number for each of k split bands to produce bit allocation information s104, by using a conventionally known auditory masking based on a psychoacoustic model, during a time length of a time window excluding the overlap zone used in the time-frequency converting section a102. The time length of a time window excluding the overlap zone is a unit time length of frame. An encoding section a104 produces a scale factor of each split band with reference to a maximum amplitude value per unit frame length of each subband signal s102. Based on the obtained scale factor of each split band, the amplitude of each subband signal s102 is normalized. Subsequently, requantization for each split is performed band based on the bit allocation information s104. The encoding section a104 forms a bit stream including the requantized sample, the bit allocation information, the scale factor and a frame sync information. Thus, the encoding section a104 produces a coded output signal s105.

FIG. 41 is a block diagram showing a conventional MPEG1 audio layer decoding system. A decoder input signal s106, which is a coded signal produced from the encoding system, is entered into the decoding system. A frame analyzing section a105 detects a frame, bit allocation information, and scale factor contained in the decoder input signal s106, thereby producing frame analysis information s107. A decoding section a106 performs the decoding processing for each split band based on the frame analysis information s107 to output a subband signal s108. Subsequently, a band combining section a107 combines the subband signals s108 to output a decoded output signal s109. To prevent any deterioration of information through the encoding-decoding processing, the condition required for the band combining device is to establish perfect reconstruction conditions matching with the band splitting section a101 of the encoding system. A conventionally known technique using QMF provides a filter arrangement satisfying such perfect reconstruction conditions.

However, the conventional MPEG subband encoding system performs the scale factor information and bit allocation information producing processing as well as the requantization processing for each of k split bands, and then constructs a frame with reference to the obtained information. This significantly increases a processing amount in the encoding processing and also increases a bit rate.

Furthermore, the conventional MPEG subband encoding system performs the compression of information based on the psychoacoustic model. Thus, the time-frequency conversion and the signal analysis in frequency regions are inevitable. To realize highly efficient compression without causing deterioration of information, it is necessary to maintain sufficient frequency resolution. To realize this, the frequency conversion requires a window curtain applied to a sufficiently long time sample. Regarding the delay time in the subband encoding and decoding processing, a frame length is determined based on a sample number required for the window curtain processing. This frame length serves as a unit length for performing each of the encoding processing, the decoding processing, and the buffering processing. Thus, the delay time depends on a processing time per frame length caused in each processing and a group delay of the band split filter. Thus, the processing delay time necessarily increases when to realize high sound quality and high compression rate.

Furthermore, the conventional MPEG subband encoding system requires a great processing amount for the frequency analysis and the bit allocation processing.

Moreover, when the conventional MPEG subband encoding system is used for radio transmission, it is necessary to add the sync word generating processing and the sync word detecting processing for performing a clock sync acquisition of a receiving system and a synchronization of a radio frame. To reduce errors caused in a transmission path, it is necessary to add the error correction processing separately. Accordingly, the processing delay time of an overall system further increases due to a buffering time in each processing etc. The separately added error correction processing is performed without considering characteristics of each information in the subband encoding processing. Thus, even in a preferable condition where a burst error is acceptable or a bit error rate during a long time period is relatively low, a fatal error may occur at an application level.

SUMMARY OF THE INVENTION

To solve the above-described conventional problems, the present invention has an object to provide a subband encoding and decoding system capable of reducing both the encoding processing amount and the encoding bit rate.

In order to accomplish this and other related objects, the present invention provides a subband encoding system comprising a band splitting means for implementing a band splitting on an encoder input signal to produce subband signals, a scale factor producing means for producing scale factor information in accordance with a signal output level of each subband signal, a bit allocation producing means for calculating bit allocation information based on the scale factor information, a requantizing means for implementing requantization based on the subband signal, the scale factor information and the bit allocation information, thereby outputting a requantized output signal, a frame constructing means for constructing a coded frame based on the requantized output signal and the scale factor information, thereby outputting a coded output signal, and a limiting means for limiting a total number of split bands of the requantized output signal based on an audible upper limit frequency.

With this arrangement, the bit allocation is calculated based on the scale factor without requiring the frequency analysis. The subband encoding is performed based on the information representing a change of the scale factor relative to a scale factor of an immediately previous frame. The total number of split bands is limited based on the audible upper limit frequency. Both the encoding processing amount and the encoding bit rate can be reduced.

Preferably, a group scale factor information producing means is provided for producing group scale factor information based on the scale factor information, the group scale factor information being obtained as a representative value of each split band group. The bit allocation producing means calculates the bit allocation information based on the group scale factor information, the requantizing means requantizes the subband signal based on the group scale factor information, thereby outputting the requantized output signal. And, the frame constructing means outputs the coded output signal based on the group scale factor information and the requantized output signal.

With this arrangement, the subband encoding is performed based on the group scale factor, thereby reducing both the encoding processing amount and the encoding bit rate.

Preferably, the subband encoding system further comprises a means for determining an upper limit split band number based on a minimum integer satisfying the following formula ((encoder input signal sampling frequency/2)/(total number of split bands)×(upper limit split band number ))≧(upper limit frequency on application)

and then for setting an encoding processible upper limit frequency.

With this arrangement, it becomes possible to perform a real time output operation by constituting a frame having a time length equal to a minimum unit or twice of the same, the minimum unit being required for expressing a minimum frequency of the band splitting in the subband encoding.

Preferably, the bit allocation producing means obtains a ratio of the scale factor information in each split band to a minimum value of an audible smallest value in a corresponding split band group, and produces the bit allocation information based on an energy ratio of each of all split bands considering the audible smallest value.

With this arrangement, in the subband encoding, the bit allocation is efficiently produced by using the energy ratio determined based on the scale factor information of each split band and the audible smallest value which is the conventionally known characteristics. Thus, the calculation amount required for the bit allocation processing can be reduced.

Preferably, the subband encoding system further comprises a means for equalizing an encoding frame length with a transmission frame length, a means for putting additional transmission information during an encoding operation, the additional transmission information including a sync word, a means for performing an error-correction encoding processing during an encoding operation, and a means for performing interleave processing during construction of a coded frame.

With this arrangement, the sync acquisition processing, the error correction processing, and the interleave processing are performed during the frame construction of the subband encoding used for the radio transmission. Thus, the processing delay time of an overall system can be reduced.

Preferably, the error-correction encoding processing is performed by assigning different error-correction capabilities to respective information constituting a coded frame considering characteristics of encoder error robustness.

With this arrangement, in the subband encoding processing used for radio transmission, it becomes possible to differentiate the error correction processing in accordance with importance of the frame information at an application level. Thus, it becomes possible to prevent the occurrence of fatal error at an application level in a condition where a bit error rate during a long time period is relatively low.

Preferred embodiments of the present invention provide a subband encoding system comprising: band splitting means for implementing a band splitting on an encoder input signal to produce subband signals; scale factor producing means for producing scale factor information in accordance with a signal output level of each subband signal; bit allocation producing means for calculating bit allocation information based on the scale factor information; requantizing means for implementing requantization based on the subband signal, the scale factor information and the bit allocation information, thereby outputting a requantized output signal; frame constructing means for constructing a coded frame based on the requantized output signal and the scale factor information, thereby outputting a coded output signal; and limiting means for limiting a total number of split bands of the requantized output signal based on an audible upper limit frequency. Limiting the total number of the split bands makes it possible to reduce the encoding bit rate and the encoding processing amount.

Furthermore, preferred embodiments of the present invention provide a subband decoding system comprising: frame analyzing means for receiving a subband coded signal as a decoder input signal and for detecting a requantized signal and scale factor information from the received subband coded signal while maintaining frame synchronization; bit allocation producing means for producing bit allocation information based on the scale factor information; subband signal producing means for producing a subband signal from the requantized signal based on the scale factor information and the bit allocation information; and band combining means for combining subband signals produced from the subband signal producing means. Limiting the total number of the split bands makes it possible to reduce the decoding processing amount.

A preferred embodiment of the present invention provides the subband encoding system further comprising group scale factor information producing means for producing group scale factor information based on the scale factor information, the group scale factor information being obtained as a representative value of each split band group, wherein the bit allocation producing means calculates the bit allocation information based on the group scale factor information, the requantizing means requantizes the subband signal based on the group scale factor information, thereby outputting the requantized output signal, and the frame constructing means outputs the coded output signal based on the group scale factor information and the requantized output signal. Grouping the split bands and producing a representative scale factor information makes it possible to reduce the encoding bit rate and the encoding processing amount.

According to a preferred embodiment of the present invention, the frame analyzing means receives the subband coded signal as a decoder input signal and detects the requantized signal and group scale factor information from the received subband coded signal while maintaining frame synchronization, the bit allocation producing means produces the bit allocation information based on the group scale factor information, and the subband signal producing means produces the subband signal from the requantized signal based on the group scale factor information and the bit allocation information. Grouping the split bands and producing a representative scale factor information makes it possible to reduce the decoding processing amount and the encoding bit rate.

A preferred embodiment of the present invention provides the subband encoding system further comprising a means for determining an upper limit split band number based on a minimum integer satisfying the following formula ((encoder input signal sampling frequency/2)/(total number of split bands)×(upper limit split band number ))≧(upper limit frequency on application)

and then for setting an encoding processible upper limit frequency.

Thus, it becomes possible to set the minimum upper limit frequency satisfying a request on application.

According to a preferred embodiment of the present invention, the group scale factor information producing means produces the group scale factor information for each of 6–20 split band groups when encoding processing is performed for 32 split bands ranging from 0 to a frequency equivalent to (sampling frequency)/2.

A preferred embodiment of the present invention provides the subband encoding system further comprising a means for setting an encoding frame length equal to (total number of split bands)/(sampling frequency number). Thus, the processing delay time in the encoding processing is so reduced that the real time output operation is realized.

A preferred embodiment of the present invention provides the subband encoding system further comprising a means for setting an encoding frame length equal to (total number of split bands)×2/(sampling frequency number). Thus, the processing delay time in the encoding processing is so reduced that the real time output operation is realized.

According to a preferred embodiment of the present invention, the bit allocation producing means obtains a ratio of the scale factor information in each split band to a minimum value of an audible smallest value in a corresponding split band group, and produces the bit allocation information based on an energy ratio of each of all split bands considering the audible smallest value. Thus, a calculation amount required for the bit allocation processing can be reduced.

According to a preferred embodiment of the present invention, the bit allocation producing means obtains a ratio of the scale factor information in each split band to an average value of an audible smallest value in a corresponding split band group, and produces the bit allocation information based on an energy ratio of each of all split bands considering the audible smallest value. Thus, a calculation amount required for the bit allocation processing can be reduced.

According to a preferred embodiment of the present invention, the bit allocation producing means converts the bit allocation information into a comparable integer for each band, wherein remaining allocatable bits are allocated one by one to appropriate split bands according to a ranking order of the split bands determined based on largeness of a numerical value in the digits lower than a decimal point in their energy ratios. Thus, the encoding bits can be effectively utilized.

According to a preferred embodiment of the present invention, the bit allocation producing means produces the bit allocation information by multiplying a weighting factor of each frequency region. Thus, the sound quality in the encoding processing can be improved.

According to a preferred embodiment of the present invention, the bit allocation producing means produces the bit allocation information by multiplying a weighting factor of the scale factor information of each split band. Thus, the sound quality in the encoding processing can be improved.

A preferred embodiment of the present invention provides the subband encoding system further comprising a means for equalizing an encoding frame length with a transmission frame length, and a means for putting additional transmission information during an encoding operation, the additional transmission information including a sync word. Thus, a buffering time and a processing amount required for the transmission path encoding and decoding processing can be shortened and the encoding bit rate can be reduced when this subband encoding system is used for radio transmission.

A preferred embodiment of the present invention provides the subband encoding system further comprising a means for transmitting a sync-dedicated frame at predetermined time intervals, the sync-dedicated frame consisting of sync acquisition words only. Thus, even when the scale factor information is deteriorated due to transmission error when this subband encoding system is used for radio transmission, a reset time required for restoring the scale factor information can be shortened.

A preferred embodiment of the present invention provides the subband decoding system further comprising a means for performing mute processing applied to a sync-dedicated frame which appears at predetermined time intervals and consists of sync acquisition words only, and a means for performing interpolation of data applied to a digital signal in a decoding processing section. Thus, even if a data blank of one frame occurs during the encoding and decoding processing, it becomes possible to prevent such a data blank from being detected at a user side.

A preferred embodiment of the present invention provides the subband decoding system further comprising a means for performing mute processing applied to a sync-dedicated frame which appears at predetermined time intervals and consists of sync acquisition words only, and a means for performing interpolation of data applied to an analog signal in a decoding processing section. Thus, even if a data blank of one frame occurs during the encoding and decoding processing, it becomes possible to prevent such a data blank from being detected at a user side.

A preferred embodiment of the present invention provides the subband encoding system further comprising a means for performing an error-correction encoding processing during an encoding operation. Thus, the transmission error can be reduced when this subband encoding system is used for radio transmission.

According to a preferred embodiment of the present invention, the error-correction encoding processing is performed by assigning different error-correction capabilities to respective information constituting a coded frame considering characteristics of encoder error robustness. Thus, the transmission error can be reduced when this subband encoding system is used for radio transmission.

According to a preferred embodiment of the present invention, the error-correction encoding processing is performed by using BCH codes. Thus, the transmission error can be reduced when this subband encoding system is used for radio transmission.

According to a preferred embodiment of the present invention, the error-correction encoding processing is performed by using a convolutional coding. Thus, the transmission error can be reduced when this subband encoding system is used for radio transmission.

According to a preferred embodiment of the present invention, the error-correction encoding processing is performed by assigning different types of error correction codes to respective information constituting a coded frame considering characteristics of encoder error robustness. Thus, the transmission error can be reduced when this subband encoding system is used for radio transmission.

According to a preferred embodiment of the present invention, the different types of error correction codes are a combination of BCH and convolutional codes. Thus, the transmission error can be reduced when this subband encoding system is used for radio transmission.

According to a preferred embodiment of the present invention, the error-correction encoding processing is performed for part of information constituting a coded frame in response to importance of each information. Thus, the encoding bit rate can be reduced.

A preferred embodiment of the present invention provides the subband encoding system further comprising a means for rearranging requantized output signals considering influence of encoding error. Thus, it becomes possible to eliminate deterioration due to encoding error at the application level.

A preferred embodiment of the present invention provides the subband decoding system further comprising a means for performing mute processing applied to a frame having an error bit number not smaller than a predetermined threshold, and a means for performing interpolation of data applied to a digital signal in a decoding processing section. Thus, even if an encoding error occurs during radio transmission, it becomes possible to interpolate it without being detected at a user side.

A preferred embodiment of the present invention provides the subband decoding system further comprising a means for performing mute processing applied to a frame having an error bit number not smaller than a predetermined threshold, and a means for performing interpolation of data applied to an analog signal in a decoding processing section. Thus, even if an encoding error occurs during radio transmission, it becomes possible to interpolate it without being detected at a user side.

A preferred embodiment of the present invention provides the subband encoding system further comprising a means for performing interleave processing during construction of a coded frame. Thus, when this subband encoding system is used for radio transmission, a burst-like transmission error can be reduced.

A preferred embodiment of the present invention provides the subband decoding system further comprising a means for performing de-interleave processing during analysis of a transmitted frame. Thus, when this subband decoding system is used for radio transmission, a burst-like transmission error can be reduced.

BRIEF DESCRIPTION OF THE DRAWINGS

The above and other objects, features and advantages of the present invention will become more apparent from the following detailed description which is to be read in conjunction with the accompanying drawings, in which.

DESCRIPTION OF THE PREFERRED EMBODIMENTS

Figure 1:
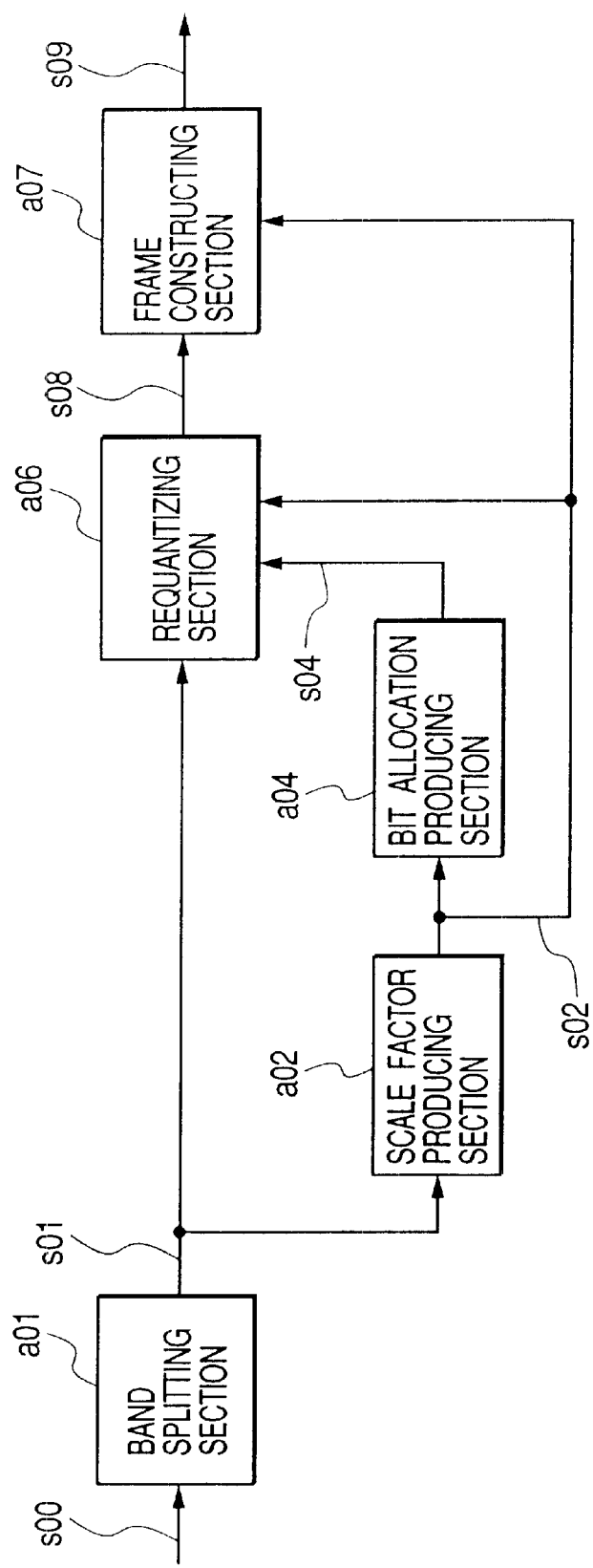
FIG. 1 is a block diagram showing a subband encoding system in accordance with a first embodiment of the present invention.

Hereinafter, preferred embodiments of the present invention will be explained with reference to FIGS. 1 to 39. Identical parts are denoted by the same reference numerals throughout the views.

First Embodiment

A first embodiment of the present invention provides a subband encoding system which limits a total number of split bands based on an audible upper limit frequency, calculates bit allocation information based on scale factor information for each split band, and implements a requantization for constructing and outputting a coded frame.

FIG. 1 is a block diagram showing a subband encoding system in accordance with a first embodiment of the present invention. In FIG. 1, a band splitting section a01 splits an encoder input signal s00 into a plurality of band components. A scale factor producing section a02 produces a scale factor which is used for normalizing each subband signal. A bit allocation producing section a04 produces a bit allocation for each split band based on the scale factor. A requantizing section a06 requantizes a subband signal of each split band based on the bit allocation information and the scale factor information. A frame constructing section a07 constructs a coded frame by using the scale factor information and the requantized output signals.

Figure 2:
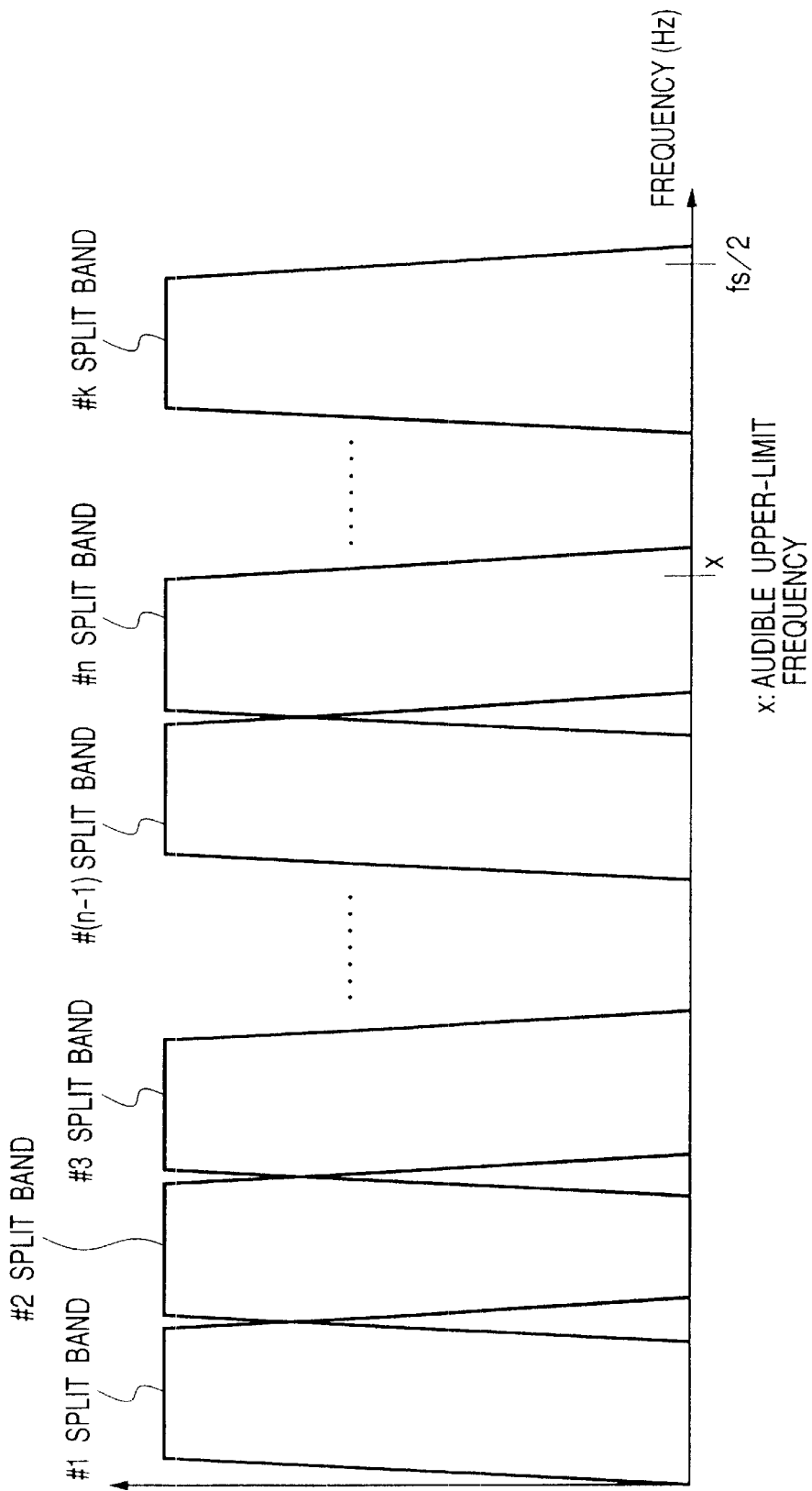
FIG. 2 is a view showing the relationship between split bands and a processible upper limit frequency in accordance with the subband encoding/decoding system in accordance with the first embodiment of the present invention.
Figure 3:
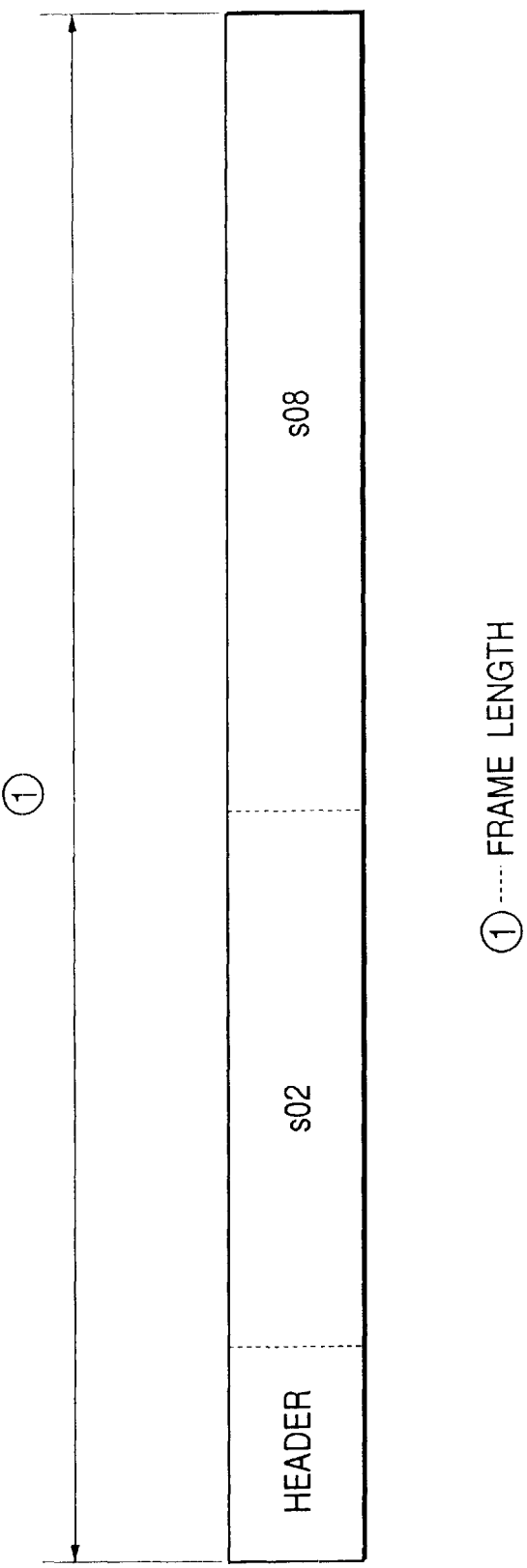
FIG. 3 is a view showing a frame arrangement for the subband encoding/decoding system in accordance with the first embodiment of the present invention.

FIG. 2 is a view showing the relationship between the split bands and a processible upper limit frequency in accordance with the first embodiment of the present invention. FIG. 3 is a view showing a frame example in accordance with the encoding system of the first embodiment of the present invention.

The subband encoding system in accordance with the first embodiment of the present invention will be explained hereinafter with reference to the block diagram of the encoding system shown in FIG. 1, the relationship between the split bands and the processible upper limit frequency shown in FIG. 2, and the frame arrangement of the encoding system shown in FIG. 3.

The encoder input signal s00 of sampling frequency fs is entered as an input signal into this encoding system. As shown in FIG. 2, the band splitting section a01 splits the encoder input signal s00 into a total of k band components successive in an entire frequency zone ranging from 0 to a Nyquist frequency (fs/2) of the encoder input signal s00, where "k" is an arbitrary integer. For example, MPEG1 audio is based on a uniform band width slpitting of k=32. However, instead of using the uniform splitting, it is possible to adopt a non-uniform splitting depending on an individual filter arrangement, provided that each of k split band widths is a predetermined value. Although a total of k split bands are producible through this band splitting operation, the band splitting section a01 produces a total of "n" subband signals s01 of n frequency bands, where "n" is an arbitrary integer within a range from 1 to (k−1). The value of "n" shown in FIG. 2 is determined considering the upper limit frequency according to an application. Each subband signal s01 is down-sampled into a baseband signal by using a sort of frequency modulation.

The scale factor producing section a02 detects a maximum amplitude level of the subband signal s01 corresponding to a sample in a time length per frame for each of n split bands, while maintaining time synchronization with the band splitting section a01. Then, the scale factor producing section a02 obtains a scale factor used for normalizing the maximum amplitude level to an arbitrary value. The obtained scale factor is output as scale factor information s02. In this case, the scale factor value for each of (n+1) to k frequency bands is set to the maximum value, i.e., a scale factor indicating a minimum signal amplitude. It is assumed that the following processing is implemented for each of a unit input and a unit output which corresponds to an input signal sample having a frame length. Regarding the normalization level, it is general to obtain a value equivalent to a maximum input sound pressure level in an encoding block.

The bit allocation producing section a04 obtains a bit allocation for each of n frequency bands based on each scale factor information of n frequency bands. The obtained bit allocation is output as bit allocation information s04. In this case, the allocation value for each of (n+1) to k frequency bands is 0, i. e., no bit allocation is applied.

The requantizing section a06 requantizes the subband signal s01 for each split band based on the bit allocation information s04 and the scale factor information s02. The requantizing section a06 produces a requantized output signal s08.

The frame constructing section a07 puts additional information, such as a detected signal for sync of encoding frame, and constructs a coded frame shown in FIG. 3 by using the scale factor information S02 and the requantized output signal s08. The frame constructing section a07 outputs the constructed data as a coded output signal s09.

FIG. 3 shows coded portions S02 and S08 corresponding to respective signals S02 and S08 shown in FIG. 1.

In FIG. 3, a header representing the additional information is positioned at a time-based leading side of the frame. However, the position of the additional information in each frame is arbitrary provided that predetermined regularity is maintained between the encoding processing and the decoding processing. Regarding the order of other information, it can be changed if such a change is consistent in both of the encoding processing and the decoding processing.

A practical encoding arrangement will be explained hereinafter with reference to the relationship between the split bands and the processible upper limit frequency shown in FIG. 2. It is now assumed that an upper limit frequency "y" on an application is 20 kHz, a sampling frequency fs of an encoder input signal and a decoded output signal in FIG. 2 is 48 kHz, and the total number of split bands is 32.

The upper limit split band number "n", which is a minimum integer satisfying the following formula, is 27.

((encoder input signal sampling frequency/2)/(total number of split bands)×(upper limit split band number))≧(upper limit frequency on application)

Under these conditions, the band splitting processing and the re-constructing of bands are implemented. The scale factor information and the bit allocation information in the encoding and decoding processing are produced for only low frequency split bands. From the above, a theoretical encoding processible upper limit frequency "x" becomes 20.25 kHz. Regarding the remaining higher frequency split bands, they are not taken into consideration in structuring the coded frame and have 0 values in a decoded output signal. The following is practical values for the above data.

| No. | y (kHz) | fs (kHz) | k | n | x (kHz) |
| --- | --- | --- | --- | --- | --- |
| 1 | 20 | 48 | 32 | 27 | 20.25 |
| 2 | 20 | 44.1 | 32 | 30 | 20.671875 |
| 3 | 20 | 96 | 64 | 54 | 20.25 |
| 4 | 15 | 48 | 32 | 20 | 15 |
| 5 | 15 | 44.1 | 32 | 11 | 15.1597375 |
| 6 | 15 | 44.1 | 64 | 40 | 15 |
| 7 | 15 | 32 | 32 | 30 | 15 |
| 8 | 10 | 48 | 32 | 14 | 10.5 |
| 9 | 10 | 44.1 | 32 | 28 | 11.025 |
| 10 | 10 | 96 | 64 | 28 | 10.5 |
| 11 | 10 | 32 | 32 | 20 | 10 |
| 12 | 7 | 48 | 32 | 10 | 7.5 |
| 13 | 7 | 44.1 | 32 | 6 | 8.26875 |
| 14 | 7 | 96 | 64 | 20 | 7.5 |
| 15 | 7 | 32 | 32 | 14 | 7 |

As described above, the first embodiment of the present invention provides a subband encoding system which limits a total number of split bands based on an audible upper limit frequency, calculates bit allocation information based on scale factor information for each split band, and implements requantization for outputting a coded frame. A total number of split bands is limited based on an audible upper frequency. Thus, it becomes possible to reduce both an encoding processing amount and an encoding bit rate.

Second Embodiment

A second embodiment of the present invention provides a subband decoding system which limits a total number of split bands of a requantized signal based on an audible upper limit frequency, produces bit allocation information based on scale factor information, and produces each subband signal from the requantized signal, then combines the subband signals.

Figure 4:
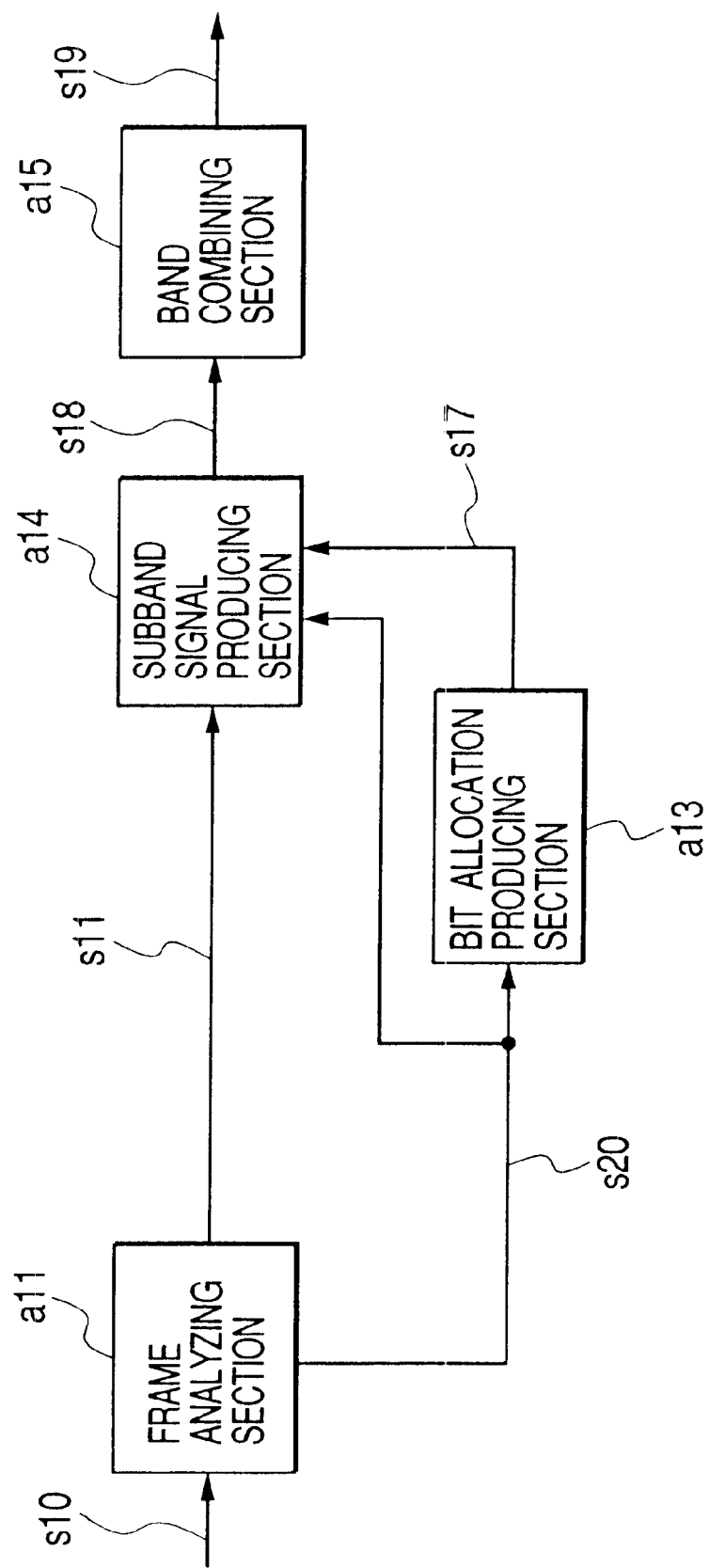
FIG. 4 is a block diagram showing a subband decoding system in accordance with a second embodiment of the present invention.

FIG. 4 is a functional block diagram showing a subband decoding system in accordance with a second embodiment of the present invention. In FIG. 4, a frame analyzing section a11 detects scale factor information and a requantized signal of each band. A bit allocation producing section a13 produces a bit allocation for each split band based on the obtained scale factor information. A subband signal producing section a14 produces a subband signal based on the bit allocation information, the requantized signal, and the scale factor information. A band combining section a15 combines subband signals to produce a decoded output signal.

The subband decoding system in accordance with the second embodiment of the present invention will be explained hereinafter with reference to the block diagram of the decoding system shown in FIG. 4, as well as the relationship between the split bands and the processible upper limit frequency shown in FIG. 2 and the frame arrangement of the encoding system shown in FIG. 3.

In FIG. 4, a decoder input signal s10 is an input signal entered into a decoding section. The frame arrangement of the decoder input signal s10 is identical with the coded frame arrangement shown in FIG. 3. The frame analyzing section a11 analyzes each information shown in FIG. 3. More specifically, the frame analyzing section a11 detects scale factor information s20 and a requantized signal s11 for each of n bands in synchronism with the coded frame based on the header shown in FIG. 3. The frame analyzing section a11 outputs the detected values of the scale factor information s20 and the requantized signal s11, respectively.

The frame analyzing section a11 generates each output in response to each frame. The following processing is performed for each frame. The scale factor information s20 is a maximum scale factor for each of the (n+1) to k bands. In other words, the scale factors for the (n+1) to k bands are forcibly set to a scale factor indicating a minimum signal amplitude.

The bit allocation producing section a13 obtains a bit allocation for each of n frequency bands based on each scale factor information of n frequency bands. The obtained bit allocation is output as bit allocation information s17. In this case, the allocation value for each of (n+1) to k frequency bands is 0, i.e., no bit allocation is applied.

A subband signal producing section a14 detects the requantized signal s11 of each split band based on the corresponding bit allocation information s17. The subband signal producing section a14 produces each subband signal s18 based on the scale factor information s20 and outputs the same.

A band combining section a15 combines the subband signals s18 to produce a decoded output signal s19. Like the encoding processing shown in FIG. 2, the re-constructing of bands is applied to the k band components successive in an entire frequency zone ranging from 0 to the Nyquist frequency (fs/2), where "k" is an arbitrary integer. For example, MPEG1 audio is based on a uniform band width slpitting of k=32. However, instead of using the uniform splitting, it is possible to adopt a non-uniform splitting depending on an individual filter arrangement, provided that each of k split band widths is a predetermined value.

Furthermore, each subband signal s18 is down-sampled into a baseband signal by using a sort of frequency modulation. The decoded output signal s19 is generated at time intervals of the reciprocal of sampling frequency fs. The amplitude level is expressed by a binary value in accordance with the number of quantization bits.

As described above, the second embodiment of the present invention provides a subband decoding system which limits a total number of split bands of a requantized signal based on an audible upper limit frequency, produces bit allocation information based on scale factor information, produces each subband signal from the requantized signal, and then combines the subband signals. Thus, it becomes possible to reduce both an encoding processing amount and an encoding bit rate.

Third Embodiment

A third embodiment of the present invention provides a subband encoding system which makes a split band groups, produces scale factor information and the bit allocation information, requantizes each subband signal based on these information, and generates a coded output signal.

Figure 5:
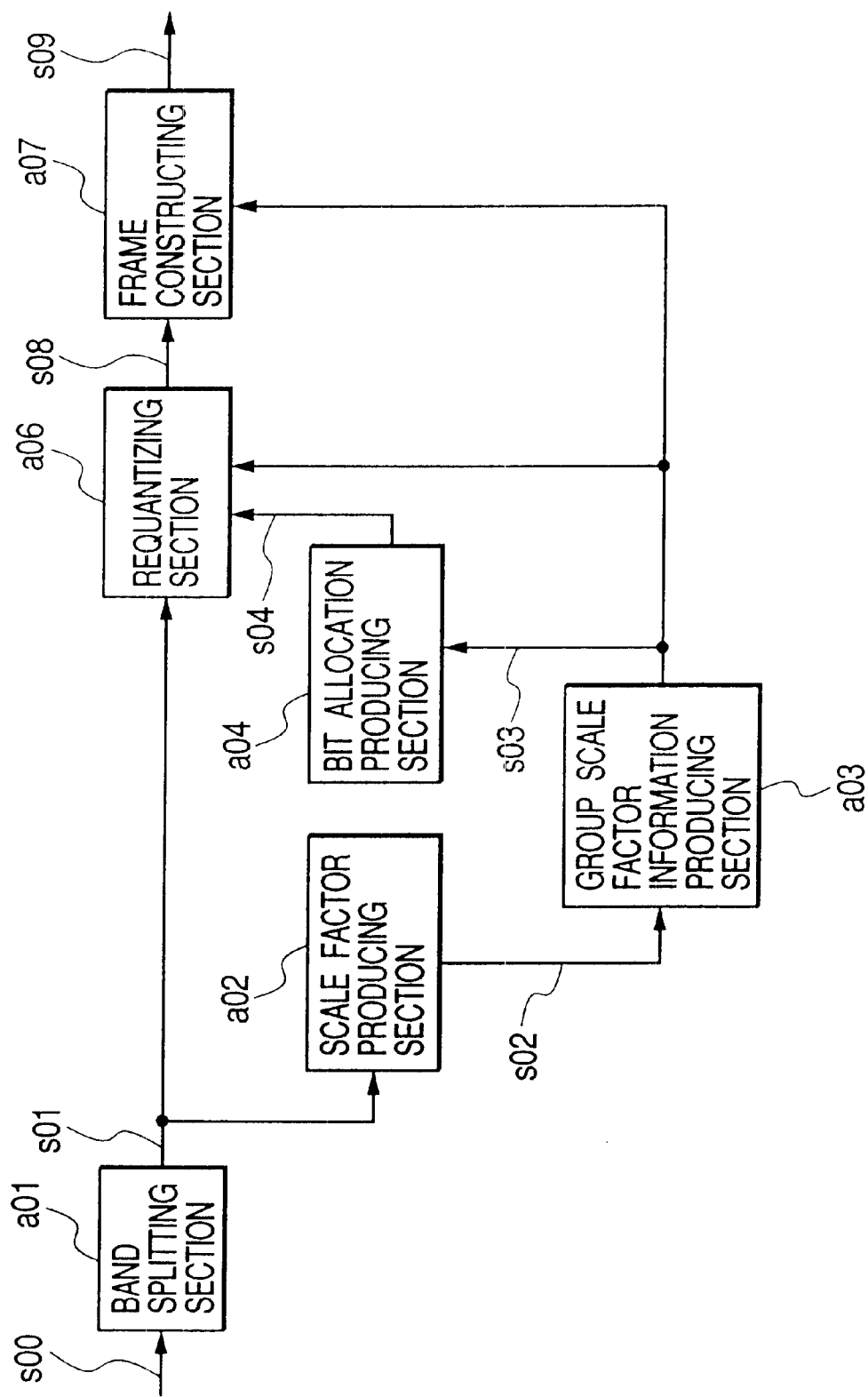
FIG. 5 is a block diagram showing a subband encoding system in accordance with a third embodiment of the present invention.
Figure 6:
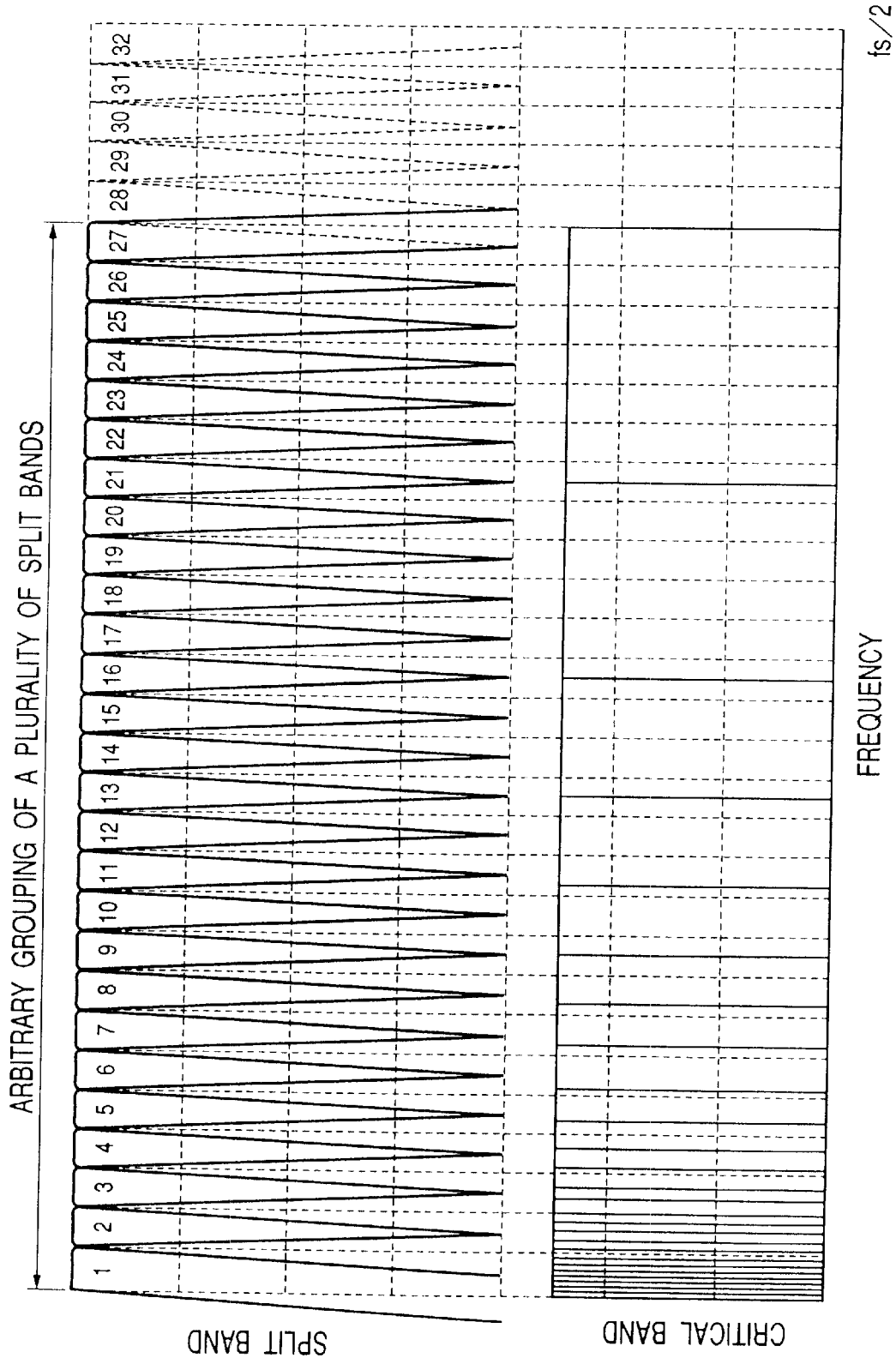
FIG. 6 is a view showing the relationship between the number of split bands and the band number of scale factor information in accordance with the subband encoding/decoding system in accordance with the third embodiment of the present invention.
Figure 7:
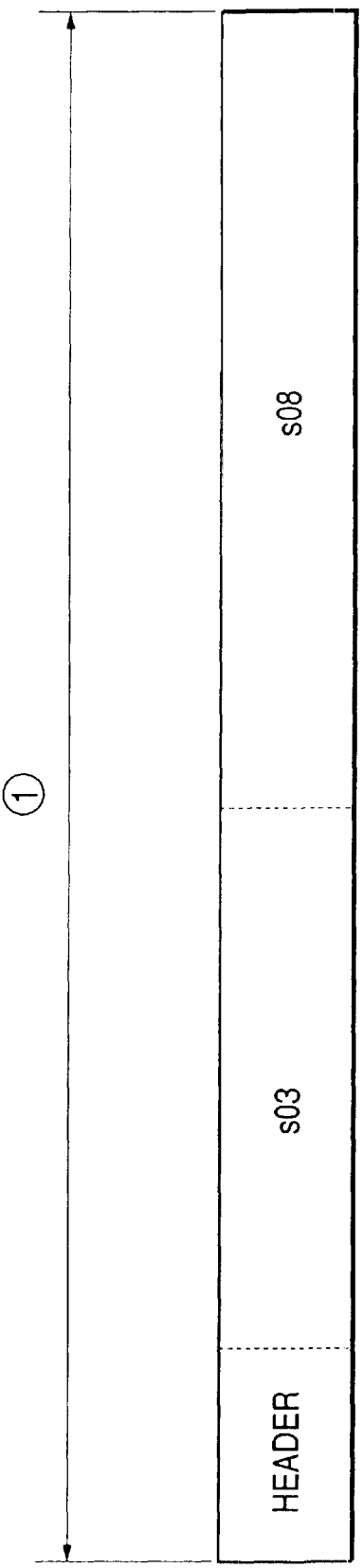
FIG. 7 is a view showing a frame arrangement for the subband encoding/decoding system in accordance with the third embodiment of the present invention.

FIG. 5 is a functional block diagram showing a subband encoding system in accordance with a third embodiment of the present invention. In FIG. 5, a group scale factor information producing section a03 makes scale factor information groups. FIG. 6 is a view showing the relationship between the number of split bands and the band number of scale factor information. FIG. 7 is a view showing a frame example in accordance with the encoding system of the third embodiment of the present invention.

The subband encoding system in accordance with the third embodiment of the present invention will be explained hereinafter with reference to the block diagram of the encoding system shown in FIG. 5, the relationship between the number of split bands and the band number of scale factor information shown in FIG. 6, and the frame arrangement of the encoding system shown in FIG. 7.

An encoder input signal s00 of sampling frequency fs is supplied to this encoding system. As shown in FIG. 2, a band splitting section a01 splits the encoder input signal s00 into a total of k band components successive in an entire frequency zone ranging from 0 to a Nyquist frequency (fs/2) of the encoder input signal s00, where "k" is an arbitrary integer. For example, MPEG1 audio is based on a uniform band width slpitting of k=32. However, instead of using the uniform splitting, it is possible to adopt a non-uniform splitting depending on an individual filter arrangement, provided that each of k split band widths is a predetermined value. Although a total of k split bands are producible through this band splitting operation, the band splitting section a01 produces a total of "n" subband signals s01 of n frequency bands, where "n" is an arbitrary integer within a range from 1 to (k−1). The value of "n" determined based on an audible upper frequency, like 20 kHz shown in the example of FIG. 2. Each subband signal s01 is down-sampled into a baseband signal by using a sort of frequency modulation.

A scale factor producing section a02 detects a maximum amplitude level of the subband signal s01 corresponding to a sample in a time length per frame for each of n split bands, while maintaining time synchronization with the band splitting section a01. Then, the scale factor producing section a02 obtains a scale factor used for normalizing the maximum amplitude level to an arbitrary value. The obtained scale factor is output as scale factor information s02. In this case, the scale factor value for each of (n+1) to k frequency bands is set to the maximum value, i.e., a scale factor indicating a minimum signal amplitude. It is assumed that the following processing is implemented for each of a unit input and a unit output which corresponds to an input signal sample having a frame length. Regarding the normalization level, it is general to obtain a value equivalent to a maximum input sound pressure level in an encoding block.

The group scale factor information producing section a03 converts the scale factor information s02 of n split bands into a plurality of scale factor information groups of m split bands each being output as a group scale factor information s03. FIG. 6 illustrates the grouping of split bands in an example of k=32 and n=27. In this case, "m" is an arbitrary natural number smaller than n. For example, in the example of FIG. 6, "m" is an arbitrary number within a range from 1 to 26. It is however desirable, in view of sound quality, that the grouping should be performed considering critical bands of human auditory system which are known as conventional properties.

The bit allocation producing section a04 obtains a bit allocation for each of n frequency bands based on each group scale factor information s03 of the n frequency bands. The obtained bit allocation is output as bit allocation information s04. In this case, the allocation value for each of (n+1) to k frequency bands is 0, i.e., no bit allocation is applied. Meanwhile, a requantizing section a06 requantizes the subband signal s01 for each split band based on the bit allocation information s04 and the group scale factor information s03. The requantizing section a06 produces a requantized output signal s08.

A frame constructing section a07 puts additional information, such as a detected signal for sync of encoding frame, and constructs a coded frame shown in FIG. 7 by using the group scale factor information S03 and the requantized output signal s08. The frame constructing section a07 outputs the constructed data as a coded output signal s09. FIG. 7 shows coded portions S03 and S08 corresponding to respective signals S03 and S08 shown in FIG. 5. In FIG. 7, a header representing the additional information is positioned at a time-based leading side of the frame. However, the position of the additional information in each frame is arbitrary provided that predetermined regularity is maintained between the encoding processing and the decoding processing. Regarding the order of other information, it can be changed if such a change is consistent in both of the encoding processing and the decoding processing.

Grouping of Split Bands (I)

Figure 9:
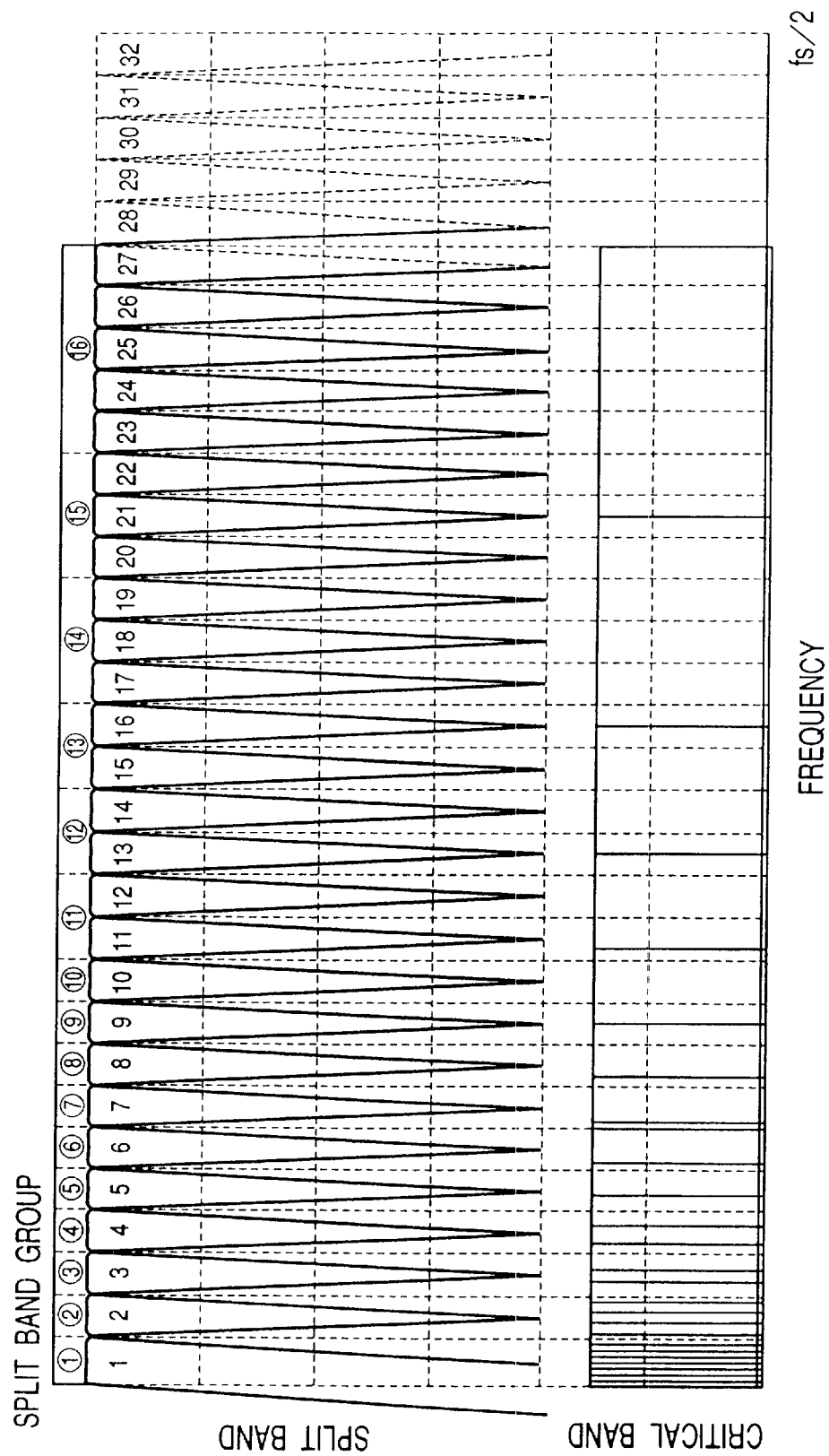
FIG. 9 is a view showing a grouping of split frequency bands for the subband encoding/decoding system in accordance with the third embodiment of the present invention.

A practical example 1 of the grouping of split bands will be explained hereinafter with reference to FIG. 9 which shows a grouping of split frequency bands. In the example of FIG. 9, fs=48 kHz, and a frequency band of (fs/2)=24 kHz is divided into 32 split bands. An upper limit of the grouping is set to the $27^{th}$ split band. The lower part of FIG. 9 shows an example of critical bands of human auditory system which are known as conventional properties.

As shown in FIG. 9, in which the encoding processing is applied to a total of 27 split bands, the grouping operation makes a group of eleventh and twelfth split bands, a group of thirteenth and fourteenth split bands, a group of fifteenth and sixteenth split bands, a group of seventeenth to nineteenth split bands, a group of twentieth to twenty-second split bands, and a group of twenty-third to twenty-seventh split bands. The first to tenth split bands remain unchanged, serving as independent groups respectively As a result, the grouping operation makes a total of 16 split band groups. The group scale factor information is produced for each of 16 groups. In other words, a total of 16 scale factor information are produced. Regarding the production of the group scale factor information, a smallest scale factor in each group is selected as a representative value. All of the split bands belonging to a same group commonly possess a same scale factor equal to the smallest scale factor in this group.

Grouping of Split Bands (II)

Figure 10:
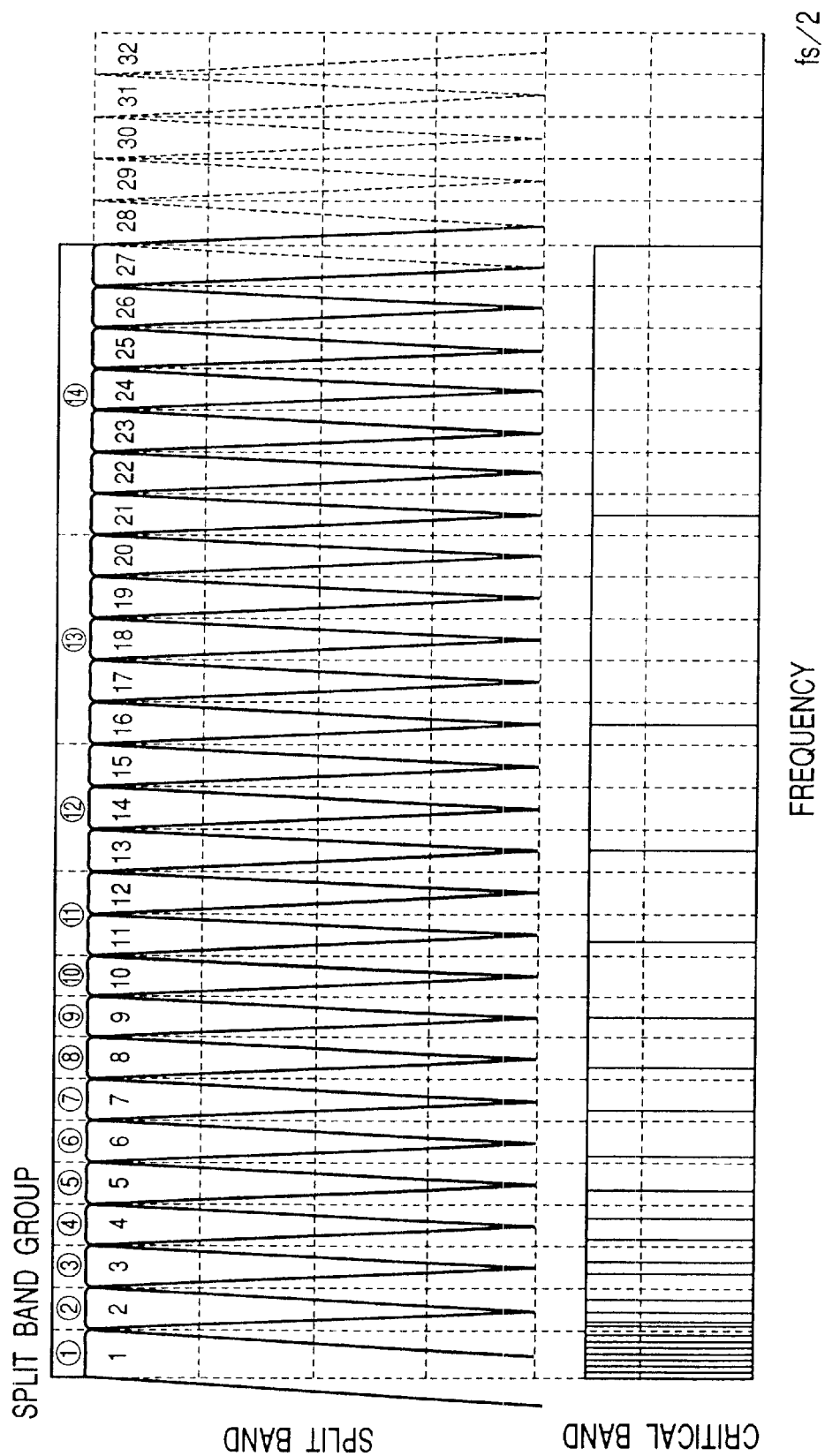
FIG. 10 is a view showing another grouping of split frequency bands for the subband encoding/decoding system in accordance with the third embodiment of the present invention.

A practical example 2 of the grouping of split bands will be explained hereinafter with reference to FIG. 10 which shows another grouping of split frequency bands. In the example of FIG. 10, fs=48 kHz, and a frequency band of (fs/2)=24 kHz is divided into 32 split bands. An upper limit of the grouping is set to the $27^{th}$ split band. The lower part of FIG. 10 shows an example of critical bands of human auditory system which are known as conventional properties.

As shown in FIG. 10, the encoding processing is applied to a total of 27 split bands, the grouping operation makes a group of eleventh and twelfth split bands, a group of thirteenth to fifteenth split bands, a group of sixteenth to twenties split bands, and a group of twenty-first to twenty-seventh split bands. The first to tenth split bands remain unchanged, serving as independent groups respectively. As a result, the grouping operation makes a total of 14 split band groups. The group scale factor information is produced for each of 14 groups. In other words, a total of 14 scale factor information are produced.

Grouping of Split Bands (III)

Figure 11:
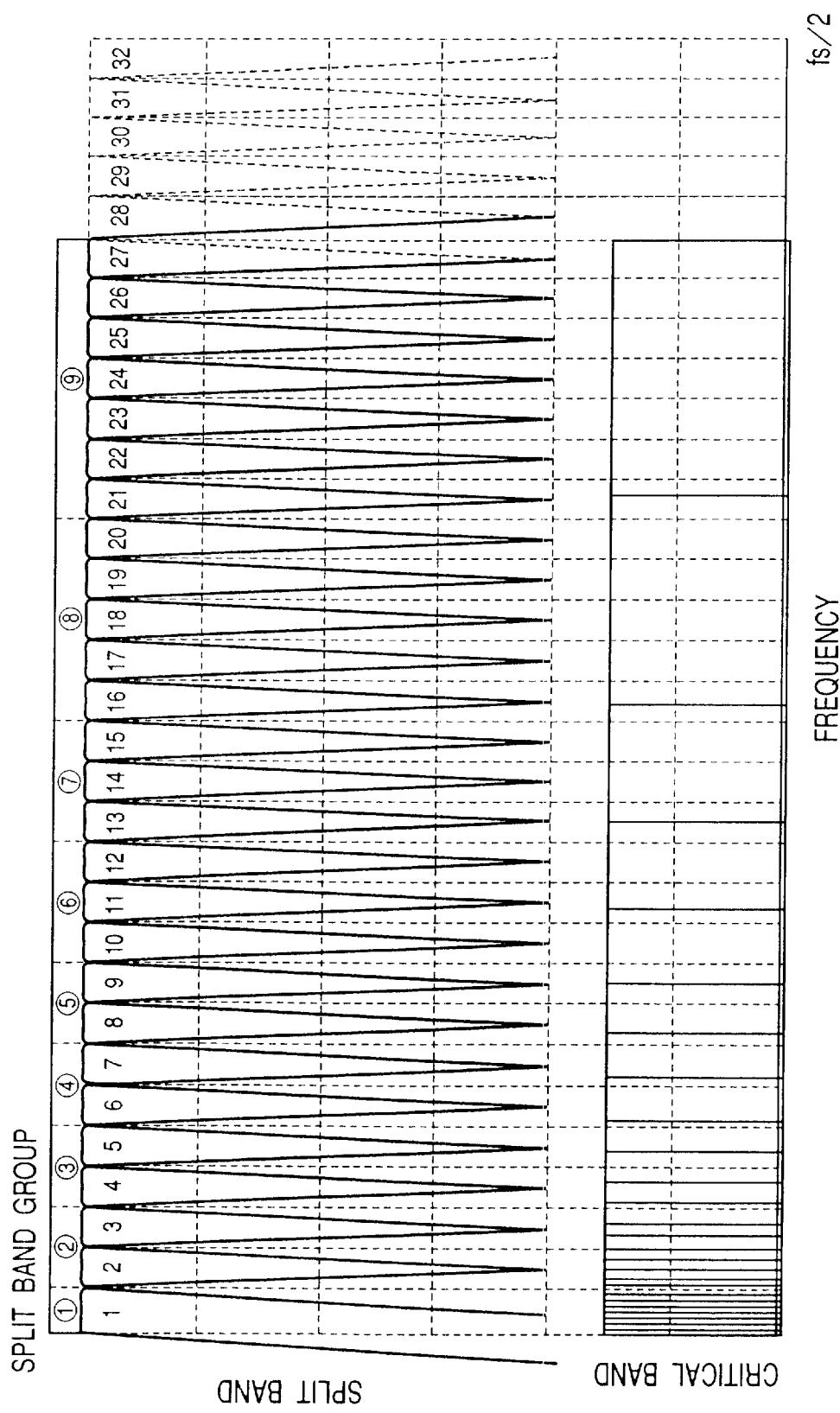
FIG. 11 is a view showing another grouping of split frequency bands for the subband encoding/decoding system in accordance with the third embodiment of the present invention.

A practical example 3 of the grouping of split bands will be explained hereinafter with reference to FIG. 11 which shows another grouping of split frequency bands. In the example of FIG. 11, fs=48 kHz, and a frequency band of (fs/2)=24 kHz is divided into 32 split bands. An upper limit of the grouping is set to the $27^{th}$ split band. The lower part of FIG. 11 shows an example of critical bands of human auditory system which are known as conventional properties.

As shown in FIG. 11, the encoding processing is applied to a total of 27 split bands, the grouping operation makes a group of second and third split bands, a group of fourth and fifth split bands, a group of sixth and seventh split bands, a group of eighth and ninth split bands, a group of tenth to twelfth split bands, a group of thirteenth to fifteenth split bands, a group of sixteenth to twentieth split bands, and a group of twenty-first to twenty-seventh split bands. The first split band remains unchanged, serving as an independent group. As a result, the grouping operation makes a total of nine split band groups. The group scale factor information is produced for each of nine groups. In other words, a total of nine scale factor information are produced.

Encoding Processing (I)

Figure 12:
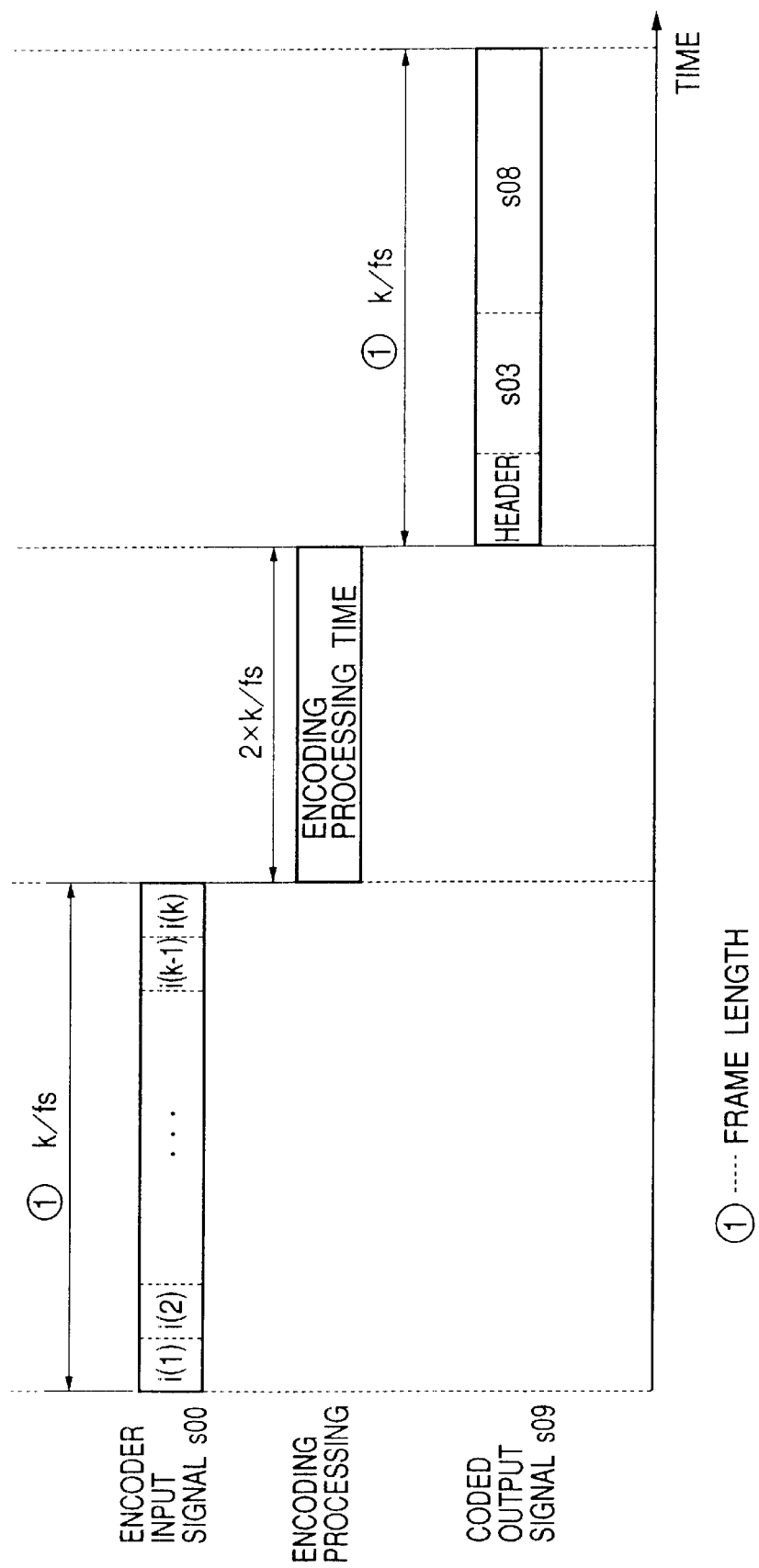
FIG. 12 is a timing chart of the encoding processing performed in the subband encoding system in accordance with the third embodiment of the present invention.
Figure 13:
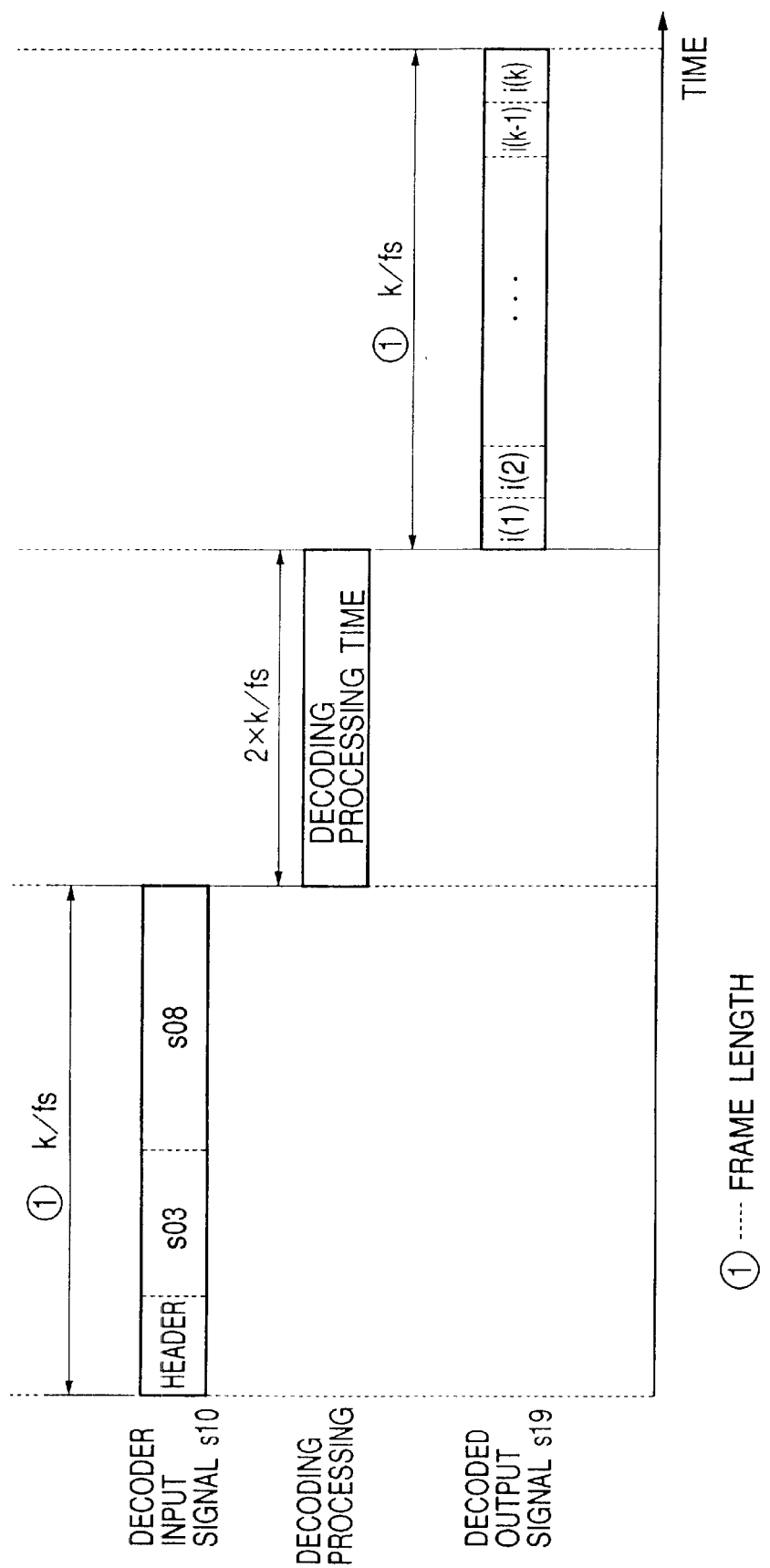
FIG. 13 is a timing chart of the decoding processing performed in the subband decoding system in accordance with the fourth embodiment of the present invention.

Hereinafter, an example 1 of the encoding processing will be explained with reference to a timing chart of the encoding processing shown in FIG. 12, the block diagram of the encoding system shown in FIG. 5, and the relationship between the number of split bands and the band number of scale factor information shown in FIG. 6. FIG. 6 shows an example of k=32 and n=27, where the split band group number "m" is an arbitrary integer within a range from 2 to (n−1). In FIGS. 12 and 13, the coded portions S00, S03, S08 and S09 correspond to respective information signals S00, S03, S08 and S09 shown in FIG. 5 and "fs" and "k" have the same values as those shown in FIG. 6.

The encoder input signal s00 entered into the band splitting section a01 of FIG. 5 includes information i(1), i(2), - - - , each corresponding to the quantized bit number, entered at the time intervals of 1/(sampling frequency fs), as shown in FIG. 12.

The band splitting section a01 splits the frequency region of fs/2 into k frequency bands, as shown in FIG. 6. For the first band splitting processing, a required information amount of encoder input signal s00 is k; namely, information i(1) to i(k) are required. This information amount defines the smallest input unit for the succeeding encoding processing. To this end, the sequential encoding processing from a01 to a07 shown in FIG. 5 is performed for each of the information i(1) to i(k) of the encoder input signal s00, thereby obtaining a frame shown in FIG. 12 which has a time length equal to (total split band number k)/(sampling frequency fs). Furthermore, to realize the real time processing, the encoding processing is accomplished within a time period equal to 2×(total split band number k)/(sampling frequency fs), as shown in FIG. 12.

Encoding Processing (II)

Figure 14:
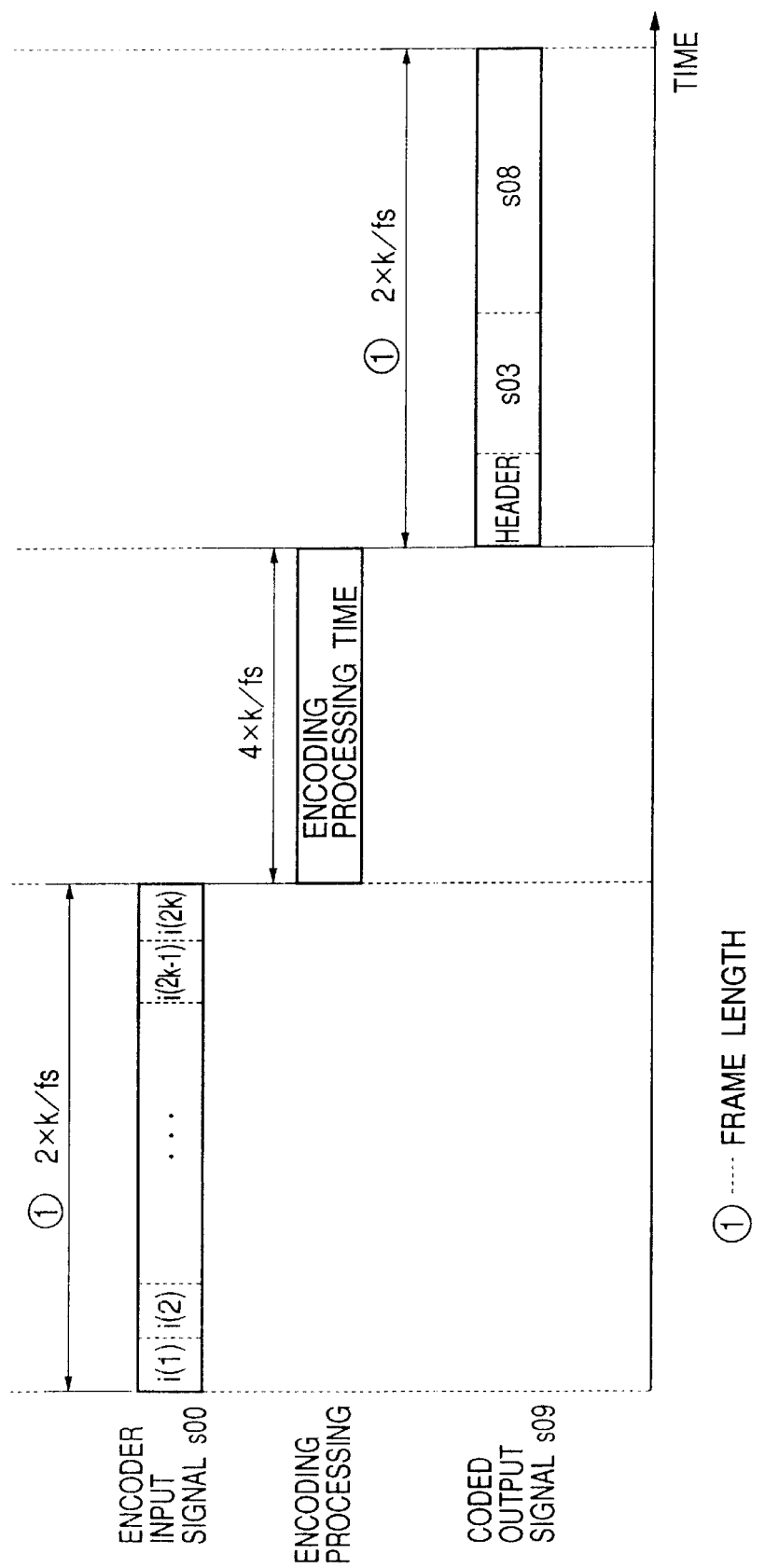
FIG. 14 is a timing chart of the encoding processing performed in the subband encoding system in accordance with the third embodiment of the present invention.
Figure 15:
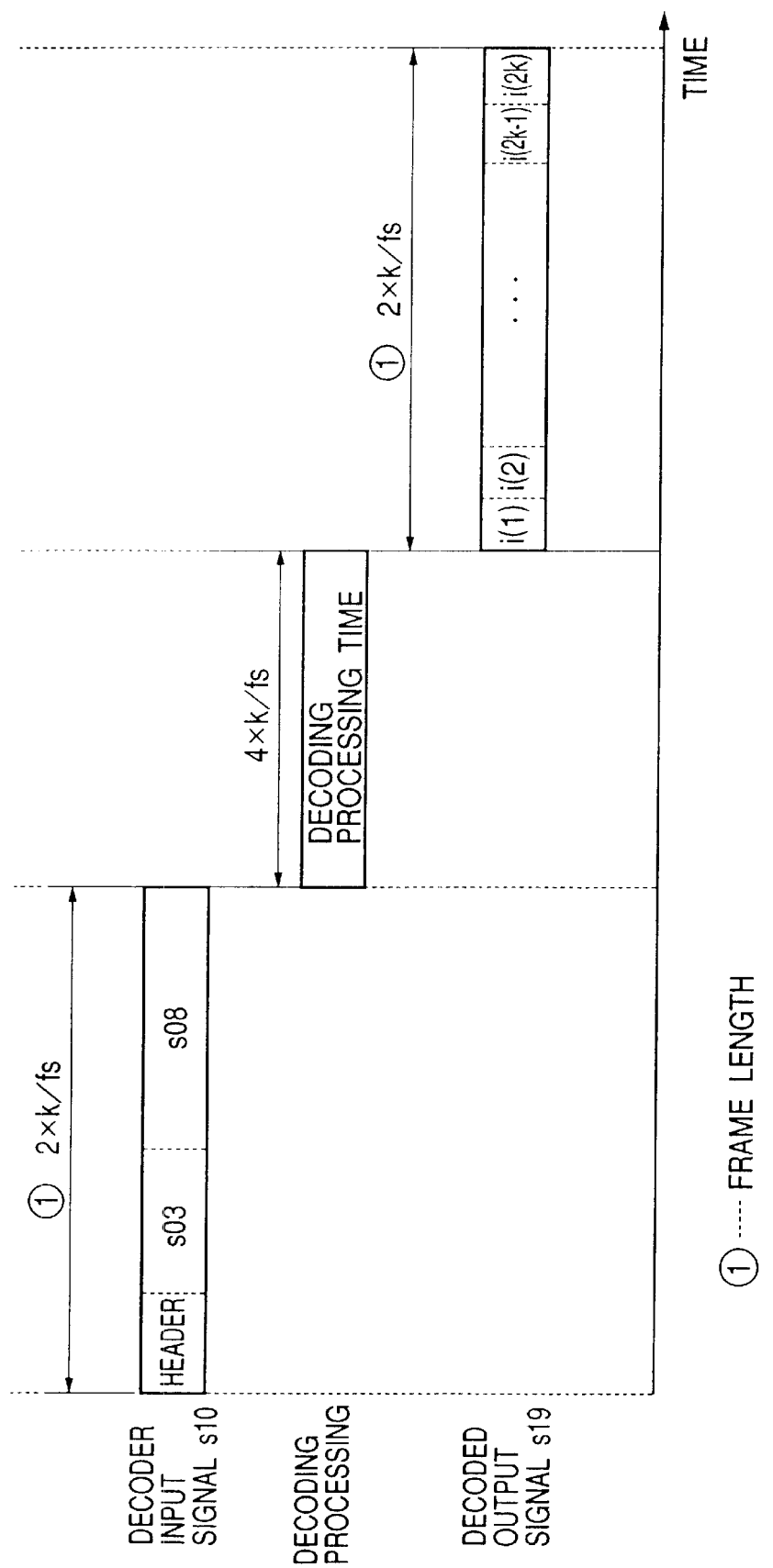
FIG. 15 is a timing chart of the decoding processing performed in the subband decoding system in accordance with the fourth embodiment of the present invention.

Hereinafter, an example 2 of the encoding processing will be explained with reference to a timing chart of the encoding processing shown in FIG. 14, the block diagram of the encoding system shown in FIG. 5, and the relationship between the number of split bands and the band number of scale factor information shown in FIG. 6. FIG. 6 shows an example of k=32 and n=27, where the split band group number "m" is an arbitrary integer within a range from 2 to (n−1). In FIGS. 14 and 15, the coded portions S00, S03, S08 and S09 correspond to respective information signals S00, S03, S08 and S09 shown in FIG. 5 and "fs" and "k" have the same values as those shown in FIG. 6.

The encoder input signal s00 entered into the band splitting section a01 of FIG. 5 includes information i(1), i(2),- - -, each corresponding to the quantized bit number, entered at the time intervals of 1/(sampling frequency fs), as shown in FIG. 14. The band splitting section a01 splits the frequency region of fs/2 into k frequency bands, as shown in FIG. 6. For the first band splitting processing, a required information amount of encoder input signal s00 is k; namely, information i(1) to i(k) are required. This information amount defines the smallest input unit for the succeeding encoding processing. To this end, the sequential encoding processing from a01 to a07 shown in FIG. 5 is performed for each of the information i(1) to i(2k) of the encoder input signal s00, thereby obtaining a frame shown in FIG. 14 which has a time length equal to 2×(total split band number k)/(sampling frequency fs). Furthermore, to realize the real time processing, the encoding processing is accomplished within a time period equal to 4×(total split band number k)/(sampling frequency fs), as shown in FIG. 14.

Normalization Processing (I)

Hereinafter, an example 1 of the normalization processing will be explained with reference to frequency characteristics shown in FIG. 16 and the block diagram of the encoding system shown in FIG. 5. In the example 1 shown in FIG. 16, the total split band number k=32, the split band group number m=14, the encoding input sampling frequency fs=48 kHz, the encoding processible upper limit split band number n=27, and the frame length=(32/48000) sec. The signal shown in FIG. 16 shows the frequency characteristics of the encoder input signal s00 shown in FIG. 5 during a time duration equivalent to 1 frame.

Figure 16:
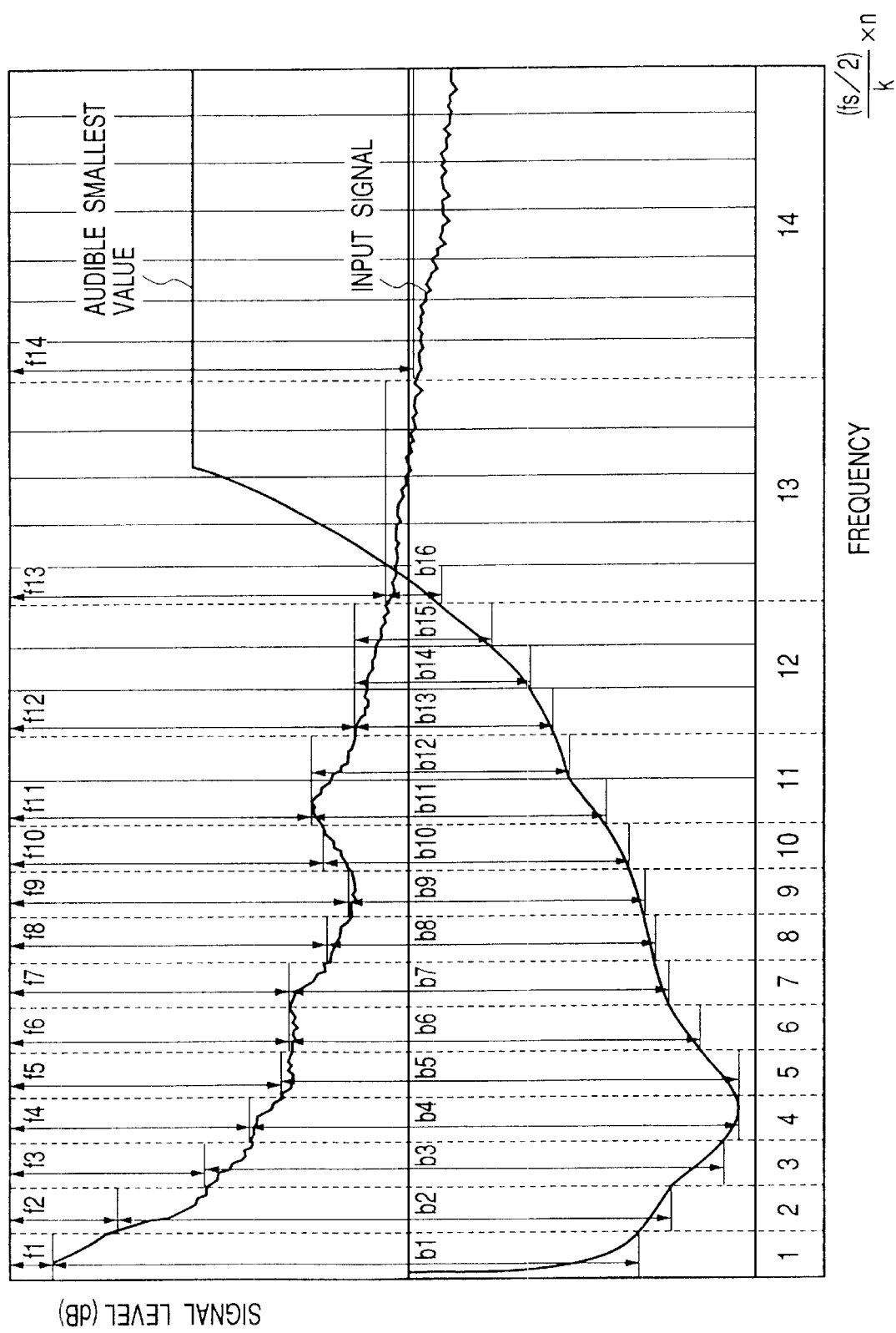
FIG. 16 is a graph showing frequency characteristics of the subband encoding/decoding system in accordance with the third embodiment of the present invention.

The group scale factor information producing section a03 shown in FIG. 5 produces a plurality of scale factor information f1, f2, - - - , f14 for respective 14 split band groups based on the input signal frequency characteristics, as shown in FIG. 16. The scale factor information f1, f2, - - - , f14 are values representing a ratio of the maximum value of an input signal to the normalization level in each split band group.

The bit allocation producing section a04 shown in FIG. 5 produces ratios b1, b2, - - - , b27 for respective 27 split bands as shown in FIG. 16. Each of ratios b1, b2, - - - , b27 represents a ratio of the group scale factor information to a minimum value of the audible smallest value in each split band. The audible smallest values are conventionally known properties. FIG. 16 does not show the values of b17 to b27 because the input signal is smaller than the audible smallest value in the $17^{th}$ to $27^{th}$ split bands. In this case, a bit allocation value 0 is given to each of the $17^{th}$ to $27^{th}$ split bands. Based on the input signal levels b1, b2, - - -, b27 the energy ratio in each split band is calculated according to the following equation.

$$\text{Energy Ratio in Split Band "}i\text{"} = \frac{b_i}{\sum_{j=1}^{27}(b_j)}$$

where i is an integer within a range from 1 to 27.

Then, the obtained energy ratio in each split band is multiplied with the allocatable bit number per frame (i.e., the predetermined bit number allocatable to one frame). The multiplied value is converted into an equivalent or comparable integer and is output as the bit allocation information s04 of each split band. The conversion of the multiplied value into an integer is performed so as to satisfy the condition that a sum of integer values representing the bit allocations of all split bands is equal to or smaller than the allocatable bit number per frame.

Normalization Processing (II)

Hereinafter, an example 2 of the normalization processing will be explained with reference to frequency characteristics shown in FIG. 17 and the block diagram of the encoding system shown in FIG. 5. In the example 2 shown in FIG. 17, the total split band number k=32, the split band group number m=14, the encoding input sampling frequency fs=48 kHz, the encoding processible upper limit split band number n=27, and the frame length=(32/48000) sec.

Figure 17:
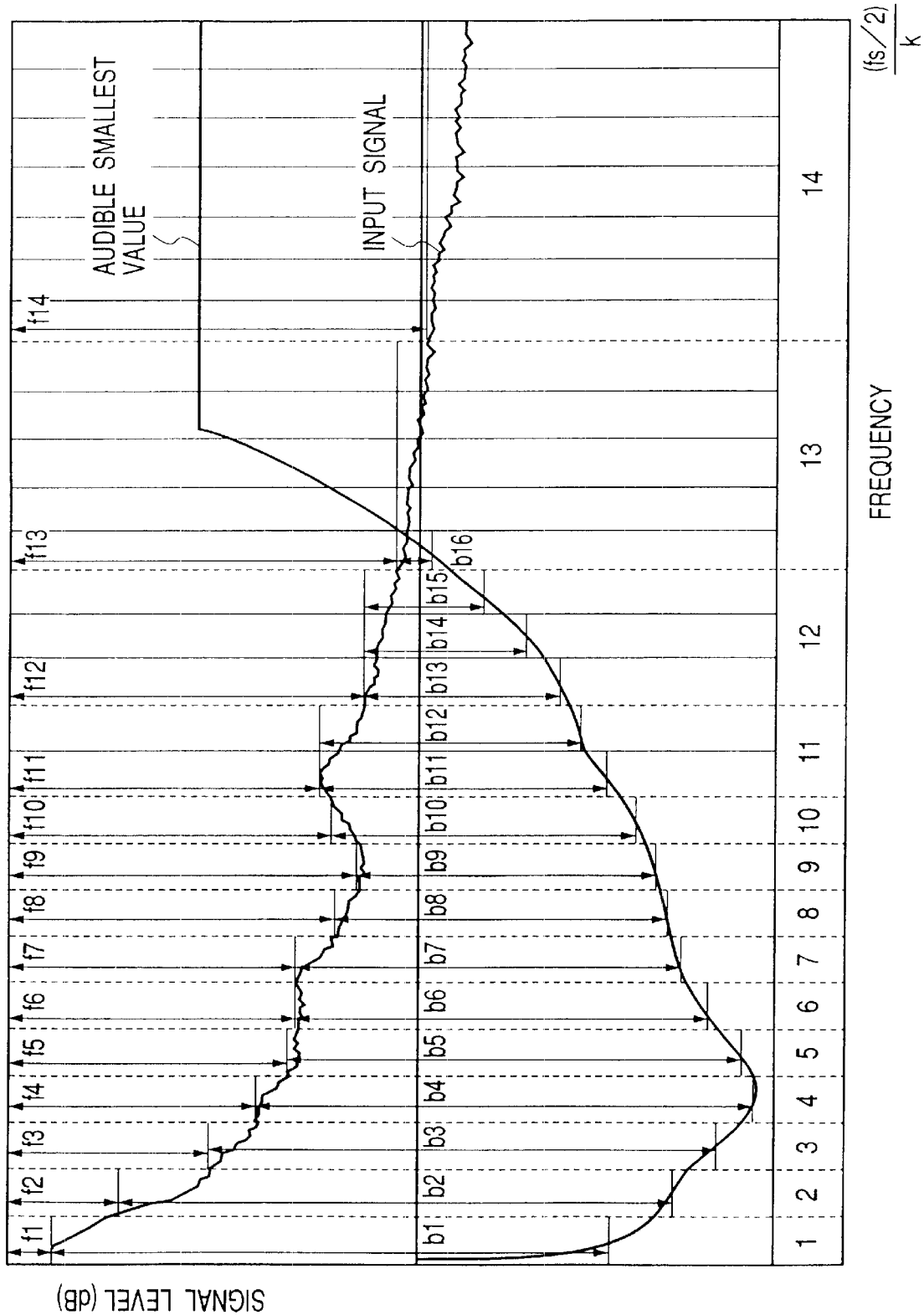
FIG. 17 is a graph showing frequency characteristics of the subband encoding/decoding system in accordance with the third embodiment of the present invention.

The signal shown in FIG. 17 shows the frequency characteristics of the encoder input signal s00 shown in FIG. 5 during a time duration equivalent to 1 frame. The group scale factor information producing section a03 shown in FIG. 5 produces a plurality of scale factor information f1, f2, - - - , f14 for respective 14 split band groups based on the input signal frequency characteristics, as shown in FIG. 17. The scale factor information f1, f2, - - - , f14 are values representing a ratio of the maximum value of an input signal to the normalization level in each split band group.

The bit allocation producing section a04 shown in FIG. 5 produces ratios b1, b2, - - - , b27 for respective 27 split bands as shown in FIG. 17. Each of ratios b1, b2, - - - , b27 represents a ratio of the group scale factor information to an average value of the audible smallest value in each split band. The audible smallest values are conventionally known properties. The method for obtaining an average value of the audible smallest value in each split band is arbitrary. FIG. 17 does not show the values of b17 to b27 because the input signal is smaller than the average value of the audible smallest value in the $17^{th}$ to $27^{th}$ split bands. In this case, a bit allocation value 0 is given to each of the $17^{th}$ to $27^{th}$ split bands.

Hereinafter, the bit allocation processing performed based on the energy ratio of each split band will be explained under the conditions that the total split band number k=32, the split band group number m=14, the encoding input sampling frequency fs=48 kHz, the encoding processible upper limit split band number n=27, and the frame length=(32/48000) sec.

As described above, the energy ratio of each split band is multiplied with the allocatable bit number per frame (i.e., the predetermined bit number allocatable to one frame). In the conversion processing for converting the obtained multiplied value into an integer, all split bits are ranked in order of largeness of a numerical value of the obtained multiplied value in the digits lower than the decimal point. Thereafter, the numerical value in the digits lower than the decimal is cut. Then, a sum of the integers representing the bit allocation information of all of split bands is obtained. Then, the remaining allocatable bit number is calculated based on a subtraction; i.e., (the allocatable bit number per frame)–(sum of the integers representing the bit allocation information of all of split bands). Subsequently, according to the ranking order of the split bands determined based on the numerical value in the digits lower than the decimal point, the remaining allocatable bits are allocated one by one to appropriate split bands. This processing is repeated until the remaining allocatable bit number becomes zero. With the above processing, all of the bit allocation information necessary for the encoding and decoding system is obtained.

Next, the processing for implementing the bit allocation based on the energy ratio and weighting of each split band will be explained under the conditions that the total split band number k=32, the split band group number m=14, the encoding input sampling frequency fs=48 kHz, the encoding processible upper limit split band number n=27, and the frame length=(32/48000) sec.

A weighting factor of each split band is multiplied with the value obtained by multiplying the energy ratio of each split band with the allocatable bit number per frame. The weighting factors of respective split bands are provided for implementing weighting of respective frequency regions according to an application. A weighting factor value has an arbitrary range and an arbitrary step. The conversion processing for converting a bit allocation value to an integer is performed after the weighting processing is accomplished. All of the bit allocation information necessary for the encoding and decoding system is thus obtained.

Next, the processing for implementing the bit allocation based on the energy ratio of each split band and weighting of each scale factor value will be explained under the conditions that the total split band number k=32, the split band group number m=14, the encoding input sampling frequency fs=48 kHz, the encoding processible upper limit split band number n=27, and the frame length=(32/48000) sec.

A weighting factor of each scale factor value is multiplied with the value obtained by multiplying the energy ratio of each split band with the allocatable bit number per frame. The weighting factor of each scale factor is provided for performing a weighting in the amplitude direction according to an application. A weighting factor value has an arbitrary range and an arbitrary step. The conversion processing for converting a bit allocation value to an integer is performed after the weighting processing is accomplished. All of the bit allocation information necessary for the encoding and decoding system is thus obtained.

As described above, the third embodiment of the present invention provides a subband encoding system which makes split band groups, produces scale factor information and the bit allocation information, requantizes each subband signal based on these information, and generates a coded output signal. Thus, by grouping the scale factor information, it becomes possible to reduce both an encoding processing amount and an encoding bit rate.

Forth Embodiment

A fourth embodiment of the present invention provides a subband decoding system which analyzes an input signal, makes split band groups, produces scale factor information, bit allocation information and a requantized signal, and obtains each split band signal, thereby implementing a decoding operation.

Figure 8:
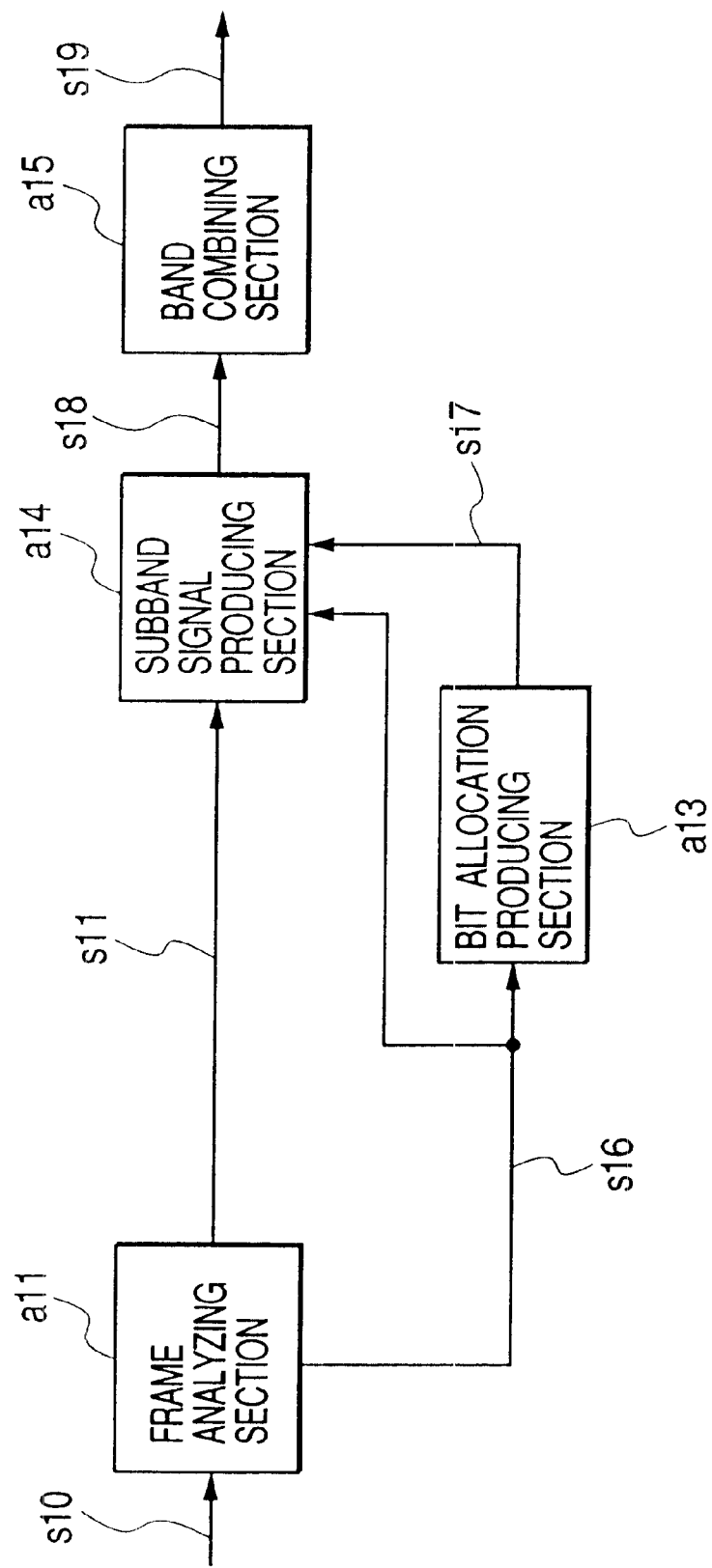
FIG. 8 is a block diagram showing a subband decoding system in accordance with a fourth embodiment of the present invention.

FIG. 8 is a functional block diagram showing a subband decoding system in accordance with the fourth embodiment of the present invention. In FIG. 8, group scale factor information s16 is obtained by analyzing a decoder input signal. The group scale factor information s16 is a representative scale factor of one or a plurality of frequency bands The rest of the fourth embodiment is substantially the same as that of the second embodiment shown in FIG. 4.

The subband decoding system in accordance with the fourth embodiment will be explained hereinafter with reference to the block diagram of the decoding system shown in FIG. 8, the relationship between the number of split bands and the band number of scale factor information shown in FIG. 6, and the frame arrangement of the encoding system shown in FIG. 7.

In FIG. 8, a decoder input signal s10 is an input signal entered into a decoding section. The frame arrangement of the decoder input signal s10 is identical with the coded frame arrangement shown in FIG. 7. The frame analyzing section a11 analyzes each information shown in FIG. 7. More specifically, the frame analyzing section a11 detects group scale factor information s03 and a requantized signal s08 for each of m band groups in synchronism with the coded frame based on the header shown in FIG. 7. The frame analyzing section a11 converts the detected information into k split bands and outputs the group scale factor information s16 and the requantized signal s11 of respective k split bands.

FIG. 6 illustrates the grouping of split bands in an example of k=32 and n=27. In this case, "m" is an arbitrary natural number smaller than n. For example, in the example of FIG. 6, "m" is an arbitrary number within a range from 1 to 26. It is however desirable, in view of sound quality, that the grouping should be performed considering critical bands of human auditory system which are known as conventional properties. In this case, the group scale factor information s16 for each of (n+1) to k frequency bands is forcibly set to the maximum value, i.e., a scale factor indicating a minimum signal amplitude. It is assumed that the following processing is implemented for each of a unit input and a unit output which corresponds to an input signal sample having a frame length. The frame analyzing section a11 generates each output in response to each frame. Thus, the following processing is performed for each frame.

A bit allocation producing section a13 obtains a bit allocation for each of n frequency bands based on the group scale factor information of n frequency bands. The obtained bit allocation is output as bit allocation information s17. In this case, the allocation value for each of (n+1) to k frequency bands is 0, i.e., no bit allocation is applied.

A subband signal producing section a14 detects the requantized signal s11 of each split band based on the corresponding bit allocation information s17. The subband signal producing section a14 produces each subband signal s18 based on the group scale factor information s16 and outputs the same.

A band combining section a15 combines the subband signals s18 to produce a decoded output signal s19. Like the encoding processing shown in FIG. 2, the re-constructing of bands is applied to the k band components successive in an entire frequency zone ranging from 0 to the Nyquist frequency (fs/2), where "k" is an arbitrary integer. For example, MPEG1 audio is based on a uniform band width slpitting of k=32. However, instead of using the uniform splitting, it is possible to adopt a non-uniform splitting depending on an individual filter arrangement, provided that each of k split band widths is a predetermined value. Furthermore, each subband signal s18 is down-sampled into a baseband signal by using a sort of frequency modulation. The decoded output signal s19 is generated at time intervals of the reciprocal of sampling frequency fs. The amplitude level is expressed by a binary value in accordance with the number of quantization bits.

The decoding processing will be explained hereinafter with reference to a timing chart shown in FIG. 13 and a timing chart shown in FIG. 15. The decoding processing shown in FIG. 13 is performed in the decoding system shown in FIG. 8. Like the encoding processing, to realize real time processing, the decoding processing is accomplished within a time period equal to 2×(total split band number k)/(sampling frequency fs), as shown in FIG. 13. Similarly, the decoding processing shown in FIG. 15 is performed in the decoding system shown in FIG. 8. Like the encoding processing, to realize real time processing, the decoding processing is accomplished within a time period equal to 4×(total split band number k)/(sampling frequency fs), as shown in FIG. 15.

The bit allocation processing in the decoding processing is performed in the same manner as the bit allocation processing in the encoding processing.

As described above, the fourth embodiment of the present invention provides a subband decoding system which analyzes an input signal, makes split band groups, produces scale factor information, bit allocation information and a requantized signal, and obtains each split band signal, thereby implementing a decoding operation. Thus, by grouping the scale factor information, it becomes possible to reduce both an encoding processing amount and an encoding bit rate.

Fifth Embodiment

A fifth embodiment of the present invention provides a subband encoding system which is preferably used in a radio transmission in which a transmission frame length is identical with the encoding frame length, a transmitter side adds requisite information for the radio transmission, such as a sync word required for sync acquisition, during the encoding operation, and a coded frame is detected based on the sync word.

Figure 18:
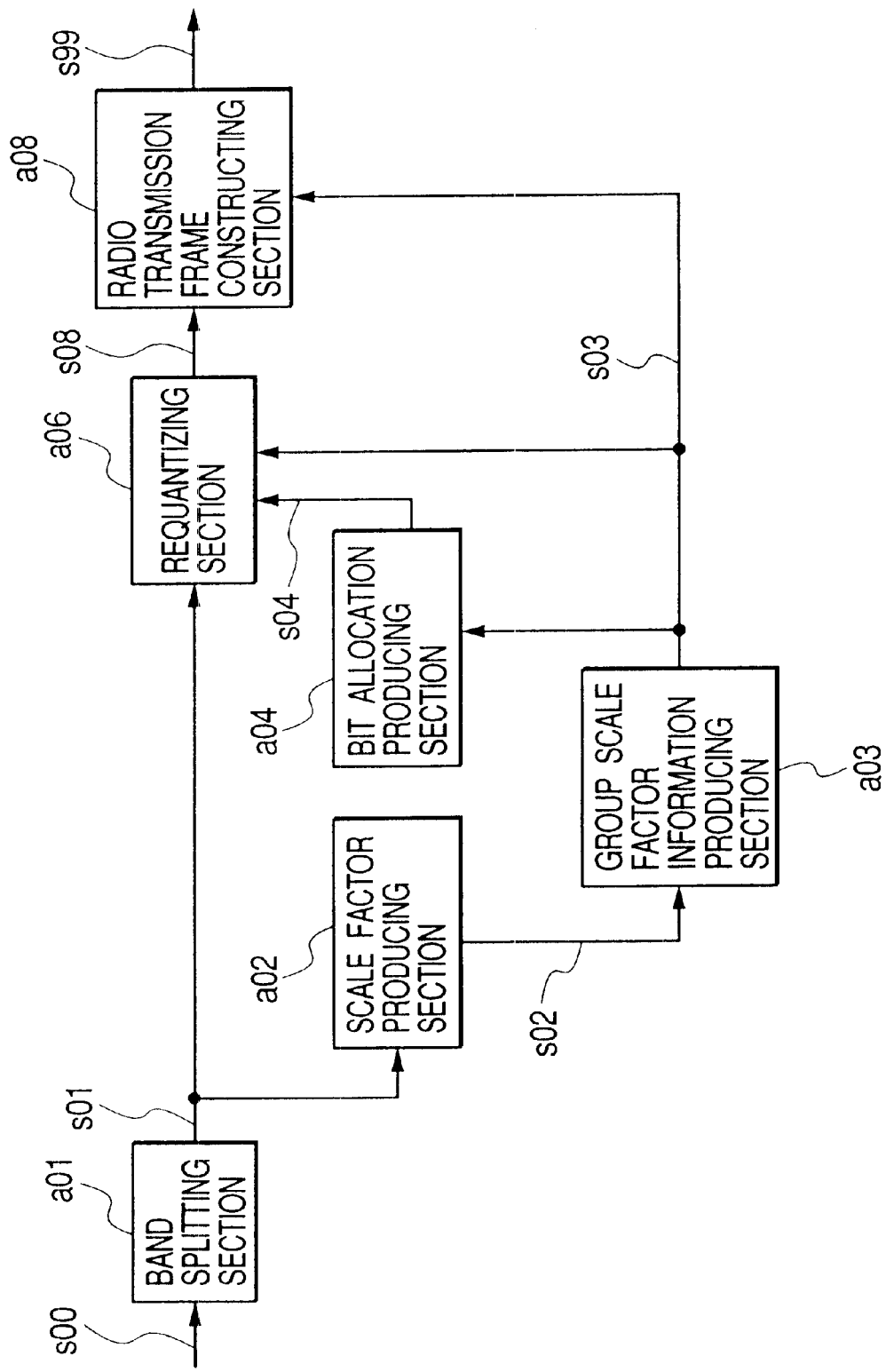
FIG. 18 is a block diagram showing a subband encoding system in accordance with a fifth embodiment of the present invention.

FIG. 18 is a block diagram showing a subband encoding system in accordance with a fifth embodiment of the present invention. In FIG. 18, a radio transmission frame constructing section a08 constructs a coded frame from the requantized signals based on the group scale factor information. The rest of the fifth embodiment is substantially the same as that of the third embodiment shown in FIG. 5.

Radio Transmission Coding (I)

The subband encoding system in accordance with the fifth embodiment of the present invention will be explained hereinafter with reference to the block diagram of the encoding system shown in FIG. 18, an example of frame arrangement for the radio transmission encoding system shown in FIG. 19, and a block diagram of a decoding system shown in FIG. 20.

An encoder input signal s00 of sampling frequency fs is supplied to this encoding system. The band splitting section a01 splits the encoder input signal s00 into a total of k band components successive in an entire frequency zone ranging from 0 to a Nyquist frequency (fs/2) of the encoder input signal s00, where "k" is an arbitrary integer. For example, MPEG1 audio is based on a uniform band width slpitting of k=32. However, instead of using the uniform splitting, it is possible to adopt a non-uniform splitting depending on an individual filter arrangement, provided that each of k split band widths is a predetermined value. Although a total of k split bands are producible through this band splitting operation, the band splitting section a01 produces a total of "n" subband signals s01 of n frequency bands, where "n" is an arbitrary integer within a range from 1 to (k−1). The value of "n" is determined considering a general audible upper limit frequency. For example, "n" split band is equivalent to 20 kHz. Each subband signal s01 is down-sampled into a baseband signal by using a sort of frequency modulation.

A scale factor producing section a02 detects a maximum amplitude level of the subband signal s01 corresponding to a sample in a time length per frame for each of n split bands, while maintaining time synchronization with the band splitting section a01. Then, the scale factor producing section a02 obtains a scale factor used for normalizing the maximum amplitude level to an arbitrary value. The obtained scale factor is output as scale factor information s02. In this case, the scale factor value for each of (n+1) to k frequency bands is set to the maximum value, i.e., a scale factor indicating a minimum signal amplitude. It is assumed that the following processing is implemented for each of a unit input and a unit output which corresponds to an input signal sample having a frame interval. Regarding the normalization level, it is general to obtain a value equivalent to a maximum input sound pressure level in an encoding block.

A group scale factor information producing section a03 converts the scale factor information s02 of n split bands into a plurality of scale factor information groups of m split bands each being output as a group scale factor information s03. This embodiment is based on an example of k=32 and n=27. In this case, "m" is an arbitrary natural number smaller than n. In other words, "m" is an arbitrary number within a range from 1 to 26. It is however desirable, in view of sound quality, that the grouping should be performed considering critical bands of human auditory system which are known as conventional properties.

A bit allocation producing section a04 obtains a bit allocation for each of n frequency bands based on each group scale factor information s03 of n frequency bands. The obtained bit allocation is output as bit allocation information s04. In this case, the allocation value for each of (n+1) to k frequency bands is 0, i.e., no bit allocation is applied. Furthermore, the requantizing section a06 requantizes the subband signal s01 for each split band based on the bit allocation information s04 and the group scale factor information s03. The requantizing section a06 produces a requantized output signal s08.

Figure 19:
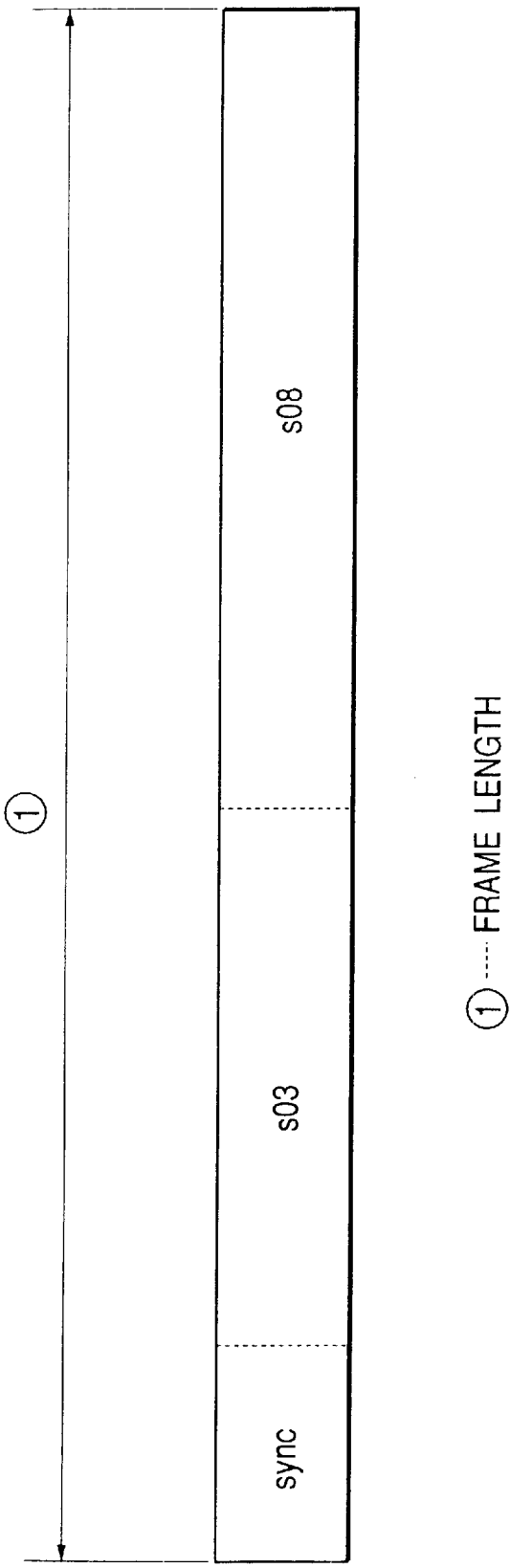
FIG. 19 is a view showing a radio transmission frame arrangement for the subband encoding system in accordance with the fifth embodiment of the present invention.
Figure 20:
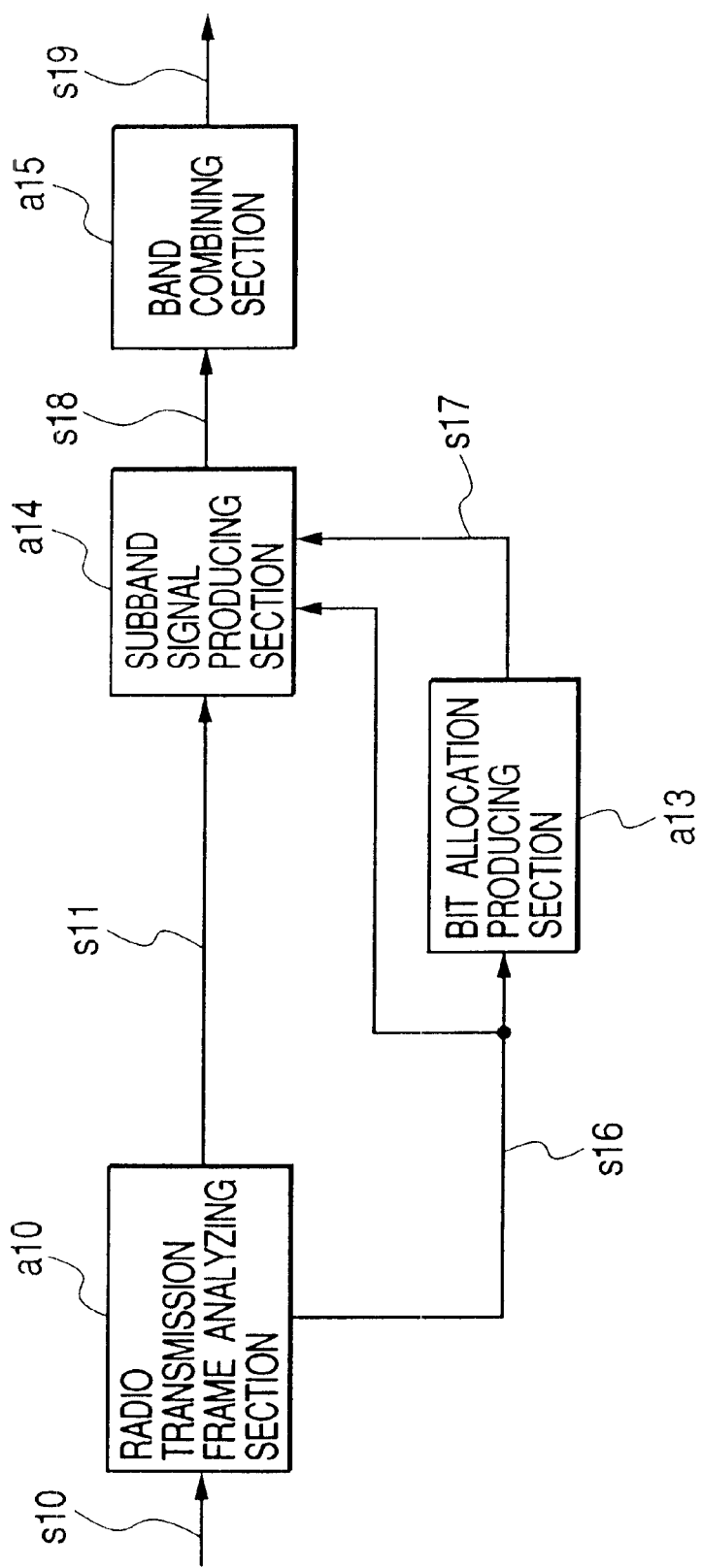
FIG. 20 is a block diagram showing a subband decoding system in accordance with the fifth embodiment of the present invention.

The radio transmission frame constructing section a08 puts additional information, such as a detected signal for sync of encoding frame, and constructs a coded frame shown in FIG. 19 by using the group scale factor information S03 and the requantized output signal s08. The radio transmission frame constructing section a08 outputs the constructed data as a radio transmission coded output signal s99. FIG. 19 shows coded portions S03 and S08 corresponding to respective signals S03 and S08 shown in FIG. 18. FIG. 19 is a conceptual frame arrangement integrating the radio transmission frame and the encoding frame. FIG. 19 shows additional radio transmission information "sync" which contains a sync acquisition signal, such as a frame sync signal and a clock sync signal, as well as radio transmission information, such as a guard time required for diversity switching or bidirectional switching.

The frame sync signal and the clock sync signal are expressed by repeating v times a sync word of a u-bit stationary pattern, where "u" and "v" are arbitrary integers being both stationary in the system. For example, according to a known practical method, the sync signal is produced by repeating 10 times a sync word "1001" serving as a 4-bit stationary pattern. Instead of independently constructing the frame sync signal and the clock sync signal, it is possible to express them by a common sync signal and a decoding section separately performs the clock synchronization and the frame synchronization. In FIG. 19, the additional information "sync" is positioned at a time-based leading side of the frame. However, the position of the additional information in each frame is arbitrary provided that predetermined regularity is maintained between the encoding processing and the decoding processing. Regarding the order of other information, it can be changed if such a change is consistent in both of the encoding processing and the decoding processing.

The radio transmission coded output signal s99 shown in FIG. 18 is modulated and then transmitted on a carrier having a predetermined transmission frequency. The transmitted radio wave is received by a receiving system. The receiving system converts the received signal into a baseband frequency signal, and demodulates this signal. The radio transmission encoding/decoding processing is thus accomplished.

Hereinafter, the decoding processing performed in the decoding system shown in FIG. 20 will be explained. A decoder input signal s10 is an input signal entered into a decoding section. The frame arrangement of the decoder input signal s10 is identical with the radio transmission coded frame arrangement shown in FIG. 19. A radio transmission frame analyzing section a10 analyzes each information shown in FIG. 19. More specifically, the radio transmission frame analyzing section a10 performs sync acquisition for the radio transmission coded frame and a decoder side clock based on "sync" shown in FIG. 19. Then, within a guard time, the radio transmission frame analyzing section a10 performs predetermined processing, such as diversity switching or bidirectional switching, which is necessary for the radio transmission. Then, the radio transmission frame analyzing section a10 detects group scale factor information s03 and a requantized signal s08. The radio transmission frame analyzing section a10 converts the detected information into k split bands and outputs the group scale factor information s16 and the requantized signal s11 of respective k split bands. This embodiment is based on an example of k=32 and n=27. In this case, "m" is an arbitrary natural number smaller than n. For example, "m" is an arbitrary number within a range from 1 to 26. It is however desirable, in view of sound quality, that the grouping should be performed considering critical bands of human auditory system which are known as conventional properties.

In this case, the group scale factor information s16 for each of (n+1) to k frequency bands is forcibly set to the maximum value, i.e., a scale factor indicating a minimum signal amplitude. The group scale factor information, the frame sync signal and the clock sync signal are expressed by repeating v times a sync word of a u-bit stationary pattern.

The radio transmission frame analyzing section a10 generates each output in response to each frame. Thus, the following processing is performed for each frame. Furthermore, the following processing is implemented for each of a unit input and a unit output which corresponds to an input signal sample having a frame length. A bit allocation producing section a13 obtains a bit allocation for each of n frequency bands based on the group scale factor information of n frequency bands. The obtained bit allocation is output as bit allocation information s17. In this case, the allocation value for each of (n+1) to k frequency bands is 0, i.e., no bit allocation is applied.

A subband signal producing section a14 detects the requantized signal s11 of each split band based on the corresponding bit allocation information s17. The subband signal producing section a14 produces each subband signal s18 based on the group scale factor information s16 and outputs the same. A band combining section a15 combines the subband signals s18 to produce a decoded output signal s19. Like the encoding processing, the re-constructing of bands is applied to the k band components successive in an entire frequency zone ranging from 0 to the Nyquist frequency (fs/2), where "k" is an arbitrary integer. For example, MPEG1 audio is based on a uniform band width slpitting of k=32. However, instead of using the uniform splitting, it is possible to adopt a non-uniform splitting depending on an individual filter arrangement, provided that each of k split band widths is a predetermined value. Furthermore, each subband signal s18 is down-sampled into a baseband signal by using a sort of frequency modulation. The decoded output signal s19 is generated at time intervals of the reciprocal of sampling frequency fs. The amplitude level is expressed by a binary value in accordance with the number of quantization bits.

Radio Transmission Encoding (II)

Figure 21:
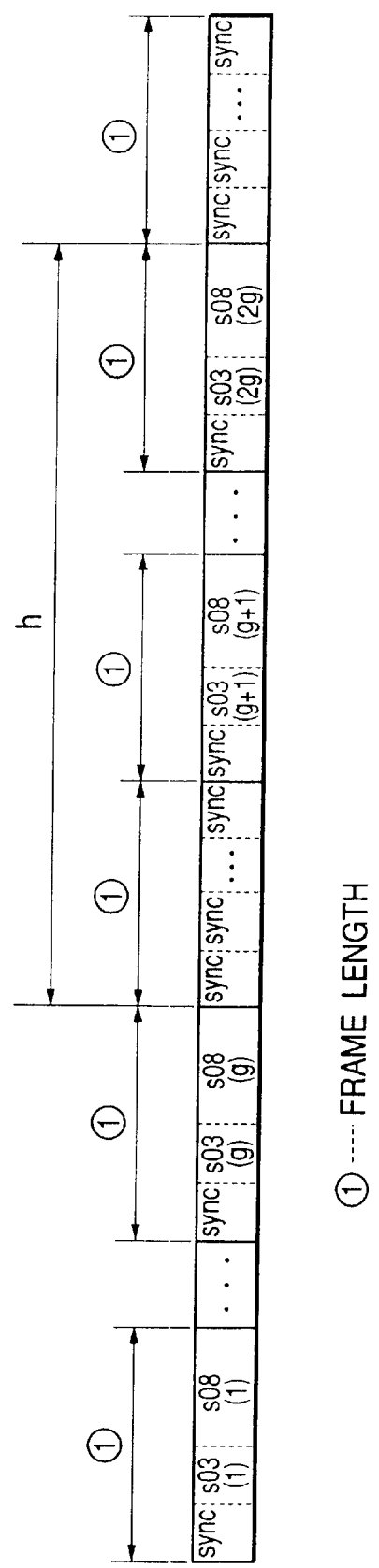
FIG. 21 is a view showing a radio transmission frame arrangement for the subband encoding system in accordance with the fifth embodiment of the present invention.

Another example of the radio transmission encoding system will be explained hereinafter with reference to the block diagram of the encoding system shown in FIG. 18, an example of frame arrangement for the radio transmission encoding system shown in FIG. 21, and the block diagram of the decoding system shown in FIG. 20. The encoding system shown in FIG. 18 performs the encoding processing, so that the radio transmission frame constructing section a08 outputs a radio transmission coded output signal s99.

The radio transmission frame constructing section a08 shown in FIG. 18 employs a frame arrangement having a stationary time interval "h" containing only one frame consisting of additional radio transmission information "sync" only. FIG. 21 shows coded portions S03 and S08 corresponding to respective signals S03 and S08 shown in FIG. 18. Each suffix in parentheses accompanying to each of the information S03 and S08 shows the lapse of time in the corresponding information. In the example shown in FIG. 21, "g" is an arbitrary integer not smaller than 2. The time interval "h" can be expressed by ①×g, where ① represents the frame length of the radio transmission coded frame.

Hereinafter, the decoding processing performed in the decoding system shown in FIG. 20 will be explained. A decoder input signal s10 is an input signal entered into a decoding section. The frame arrangement of the decoder input signal s10 is identical with the radio transmission coded frame arrangement shown in FIG. 21. A radio transmission frame analyzing section a10 analyzes each information shown in FIG. 21. More specifically, in response to the "sync"-dedicated frame exclusively consisting of additional radio transmission information "sync" which is inserted at the stationary time intervals "h", the radio transmission frame analyzing section a10 performs sync acquisition for the radio transmission coded frame and a decoder side clock based on "sync." Then, within a guard time, the radio transmission frame analyzing section a10 performs predetermined processing, such as diversity switching or bidirectional switching, which is necessary for the radio transmission. Then, the radio transmission frame analyzing section a10 detects scale factor information s03 and a requantized signal s08. The radio transmission frame analyzing section a10 converts the detected information into k split bands and outputs the group scale factor information s16 and the requantized signal s11 of respective k split bands.

In this case, the group scale factor information s16 for each of (n+1) to k frequency bands is forcibly set to the maximum value, i.e., a scale factor indicating a minimum signal amplitude. Regarding the detection of the "sync"-dedicated frame exclusively consisting of additional radio transmission information "sync", periodic detecting processing will be preferably used in view of the nature of "h" which is a stationary time interval. After accomplishing the detection of the "sync"-dedicated frame, all of the additional radio transmission information is analyzed. Then, the sync acquisition processing of the frame sync signal and the clock sync signal is sufficiently performed, thereby improving the accuracy of the frame synchronization and the clock synchronization in the processing of succeeding frames.

As described above, the fifth embodiment of the present invention provides a subband encoding system which is preferably used in a radio transmission in which a transmission frame length is identical with the encoding frame length, a transmitter side adds requisite information for the radio transmission, such as a sync word required for sync acquisition, during the encoding operation, and a coded frame is detected based on the sync word. Thus, by performing the sync acquisition processing during the frame construction for the subband encoding used in the radio transmission, it becomes possible to reduce the delay time in the processing of an overall system.

Sixth Embodiment

A sixth embodiment of the present invention provides a subband decoding system which performs interpolation of data applied to a digital signal of a decoding processing section.

Interpolation Processing (I)

Figure 22:
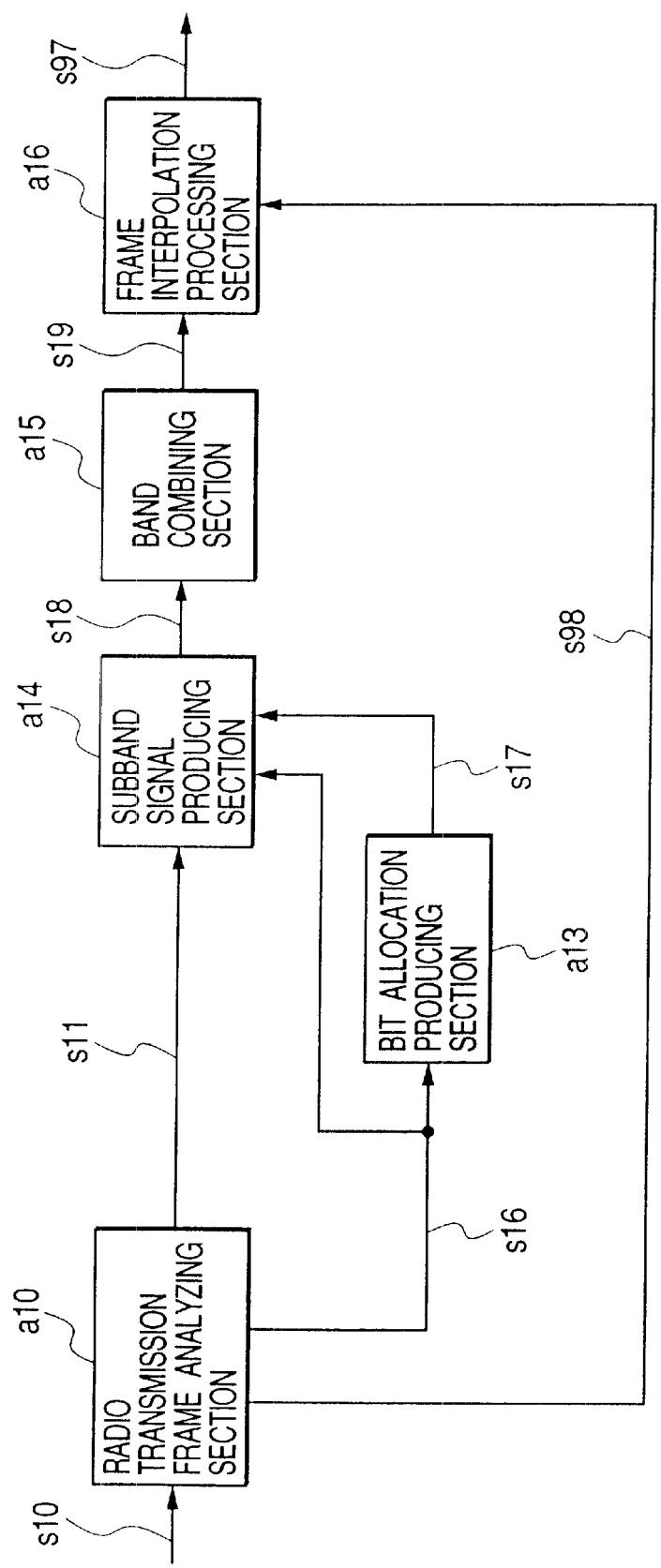
FIG. 22 is a block diagram showing a subband decoding system in accordance with a sixth embodiment of the present invention.
Figure 23:
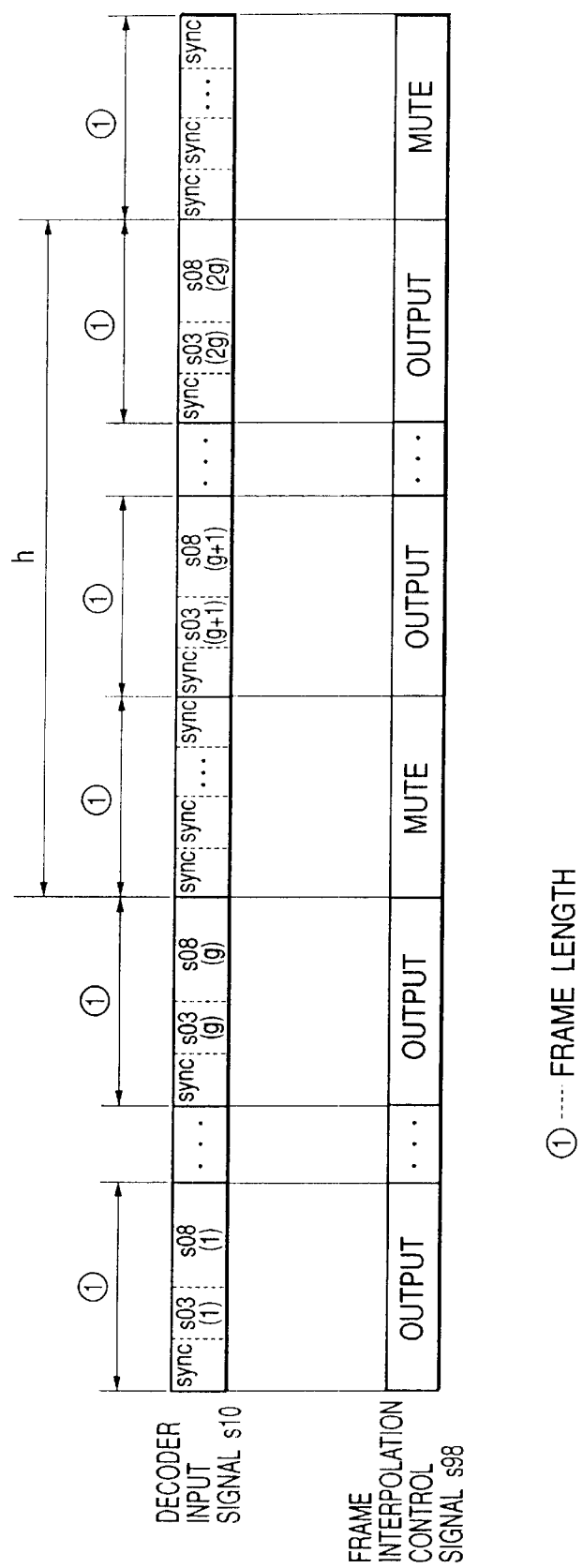
FIG. 23 is a timing chart showing the frame interpolation control processing performed in the subband decoding system in accordance with the sixth embodiment of the present invention.

FIG. 22 is a block diagram showing a subband decoding system in accordance with a sixth embodiment of the present invention. In FIG. 22, a frame interpolation processing section a16 interpolates a decoded output signal based on a frame interpolation control signal. FIG. 23 is a timing chart showing the frame interpolation control processing.

Hereinafter, the sixth embodiment will be explained with reference to the block diagram of the decoding system shown in FIG. 22 and the timing chart of frame interpolation control processing shown in FIG. 23. A decoder input signal s10, after being applied the encoding and radio transmission processing, is entered into the decoding processing section shown in FIG. 22. The frame arrangement of the decoder input signal s10 is identical with the radio transmission coded frame arrangement shown in FIG. 23.

A radio transmission frame analyzing section a10 analyzes each information shown in FIG. 23. When a frame consisting of the group scale factor information s03, the requantized output signal s08, and the additional radio transmission information "sync" is detected, the radio transmission frame analyzing section a10 performs sync acquisition for the radio transmission coded frame and a decoder side clock based on "sync" shown in FIG. 23. Then, within a guard time, the radio transmission frame analyzing section a10 performs predetermined processing, such as diversity switching or bidirectional switching, which is necessary for the radio transmission. Then, the radio transmission frame analyzing section a10 detects scale factor information s03 and the requantized signal s08. The radio transmission frame analyzing section a10 converts the detected information into k split bands and outputs the group scale factor information s16 and the requantized signal s11 of respective k split bands.

In this case, the group scale factor information s16 for each of (n+1) to k frequency bands is forcibly set to the maximum value, i.e., a scale factor indicating a minimum signal amplitude. Regarding the detection of the "sync"-dedicated frame appearing once during the stationary time interval "h," periodic detecting processing will be preferably used in view of the nature of "h" which is a stationary time interval. After accomplishing the detection of the "sync"-dedicated frame, the sync acquisition processing of the frame sync signal and the clock sync signal is sufficiently performed, thereby improving the accuracy of the frame synchronization and the clock synchronization in the processing of succeeding frames.

Furthermore, the radio transmission frame analyzing section a10 generates a frame interpolation control signal s98 in response to each detection of the "sync"-dedicated frame appearing once during the stationary time interval "h." As shown in FIG. 23, when the "sync"-dedicated frame is detected, the content of frame interpolation control signal s98 is "mute" which represents a frame interpolation instruction. Otherwise, the content of frame interpolation control signal s98 becomes "output" which represents a direct output instruction of a decoded signal. Both of "mute" and "output" instructions are binary signals representing their states. The information amount of each instruction is arbitrary. FIG. 23 shows the timing relationship between each instruction and the decoder input signal. The succeeding processing spanning to the re-constructing of bands of this embodiment is performed in the same manner as that shown in the decoding system of the fifth embodiment.

A band combining section a15 shown in FIG. 22 outputs a decoded output signal s19 which is a digital signal. A frame interpolation processing section a16 implements the frame interpolation processing based on the instruction contained in the frame interpolation control signal s98. The frame interpolation processing section a16 outputs an interpolated output signal s97. More specifically, when the frame interpolation control signal s98 contains the instruction "mute", the frame interpolation processing section a16 implements the frame interpolation processing. When the frame interpolation control signal s98 contains the instruction "output", the frame interpolation processing section a16 directly outputs the decoded output signal s19. For the frame interpolation processing, interpolation of voice is generally used. As shown in FIG. 22, this is the interpolation processing applied to a digital signal of a digital processing section.

Interpolation Processing (II)

Another example of the subband decoding system performing the interpolation of data will be explained hereinafter with reference to a block diagram of the decoding system shown in FIG. 24 and the timing chart of frame interpolation control processing shown in FIG. 23. A decoder input signal s10, after being applied the encoding and radio transmission processing similar to that shown in the fifth embodiment of the present invention, is entered into the decoding processing section shown in FIG. 24. The frame arrangement of the decoder input signal s10 is identical with the radio transmission coded frame arrangement shown in FIG. 23. A radio transmission frame analyzing section a10 analyzes each information shown in FIG. 23. When a frame consisting of the group scale factor information s03, the requantized output signal s08, and the additional radio transmission information "sync" is detected, the radio transmission frame analyzing section a10 performs sync acquisition for the radio transmission coded frame and a decoder side clock based on "sync" shown in FIG. 23. Then, within a guard time, the radio transmission frame analyzing section a10 performs predetermined processing, such as diversity switching or bidirectional switching, which is necessary for the radio transmission. Then, the radio transmission frame analyzing section a10 detects scale factor information s03 and the requantized signal s08. The radio transmission frame analyzing section a10 converts the detected information into k split bands and outputs the group scale factor information s16 and the requantized signal s11 of respective k split bands.

In this case, the group scale factor information s16 for each of (n+1) to k frequency bands is forcibly set to the maximum value, i.e., a scale factor indicating a minimum signal amplitude. Regarding the detection of the "sync"-dedicated frame appearing once during the stationary time interval "h," periodic detecting processing will be preferably used in view of the nature of "h" which is a stationary time interval. After accomplishing the detection of the "sync"-dedicated frame, the sync acquisition processing of the frame sync signal and the clock sync signal is sufficiently performed, thereby improving the accuracy of the frame synchronization and the clock synchronization in the processing of succeeding frames.

Furthermore, the radio transmission frame analyzing section a10 generates a frame interpolation control signal s98 in response to each detection of the "sync"-dedicated frame appearing once during the stationary time interval "h." As shown in FIG. 23, when the "sync"-dedicated frame is detected, the content of frame interpolation control signal s98 is "mute" which represents a frame interpolation instruction. Otherwise, the content of frame interpolation control signal s98 becomes "output" which represents a direct output instruction of a decoded signal. Both of "mute" and "output" instructions are binary signals representing their states. The information amount of each instruction is arbitrary. FIG. 23 shows the timing relationship between each instruction and the decoder input signal. The succeeding processing spanning to the re-constructing of bands of this embodiment is performed in the same manner as that shown in the decoding system of the fifth embodiment.

Figure 24:
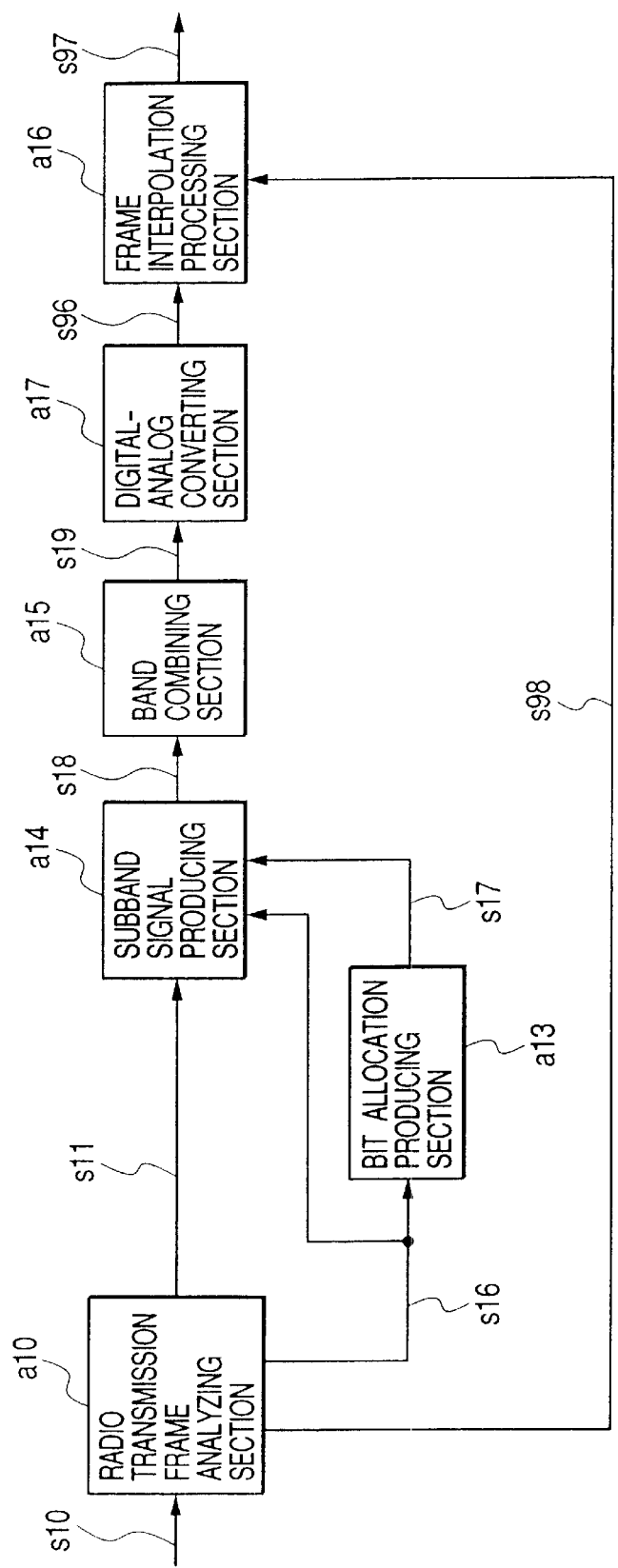
FIG. 24 is a block diagram showing a subband decoding system in accordance with the sixth embodiment of the present invention.

A band combining section a15 shown in FIG. 24 outputs a decoded output signal s19. A digital-analog converting section a17 converts the digital signal (i.e., the decoded output signal s19) into an analog signal. Thus, the digital-analog converting section a17 outputs an analog output signal s96. A frame interpolation processing section a16 implements the frame interpolation processing based on the instruction contained in the frame interpolation control signal s98. The frame interpolation processing section a16 outputs an interpolated output signal s97. More specifically, when the frame interpolation control signal s98 contains the instruction "mute", the frame interpolation processing section a16 implements the frame interpolation processing. When the frame interpolation control signal s98 contains the instruction "output", the frame interpolation processing section a16 directly outputs the decoded output signal s19. The frame interpolation processing performed in this case is the interpolation of voice, such as filtering, which is generally used.

As described above, the sixth embodiment of the present invention provides a subband decoding system which performs interpolation of data applied to a digital signal of a decoding processing section. Thus, even if a data blank of one frame occurs, it becomes possible to prevent such a data blank from being detected at a user interface level.

Seventh Embodiment

A seventh embodiment of the present invention provides a subband encoding system which performs error-correction encoding processing during the encoding operation by utilizing BCH codes, convolutional codes, etc.

Error Correction Encoding (I)

Figure 25:
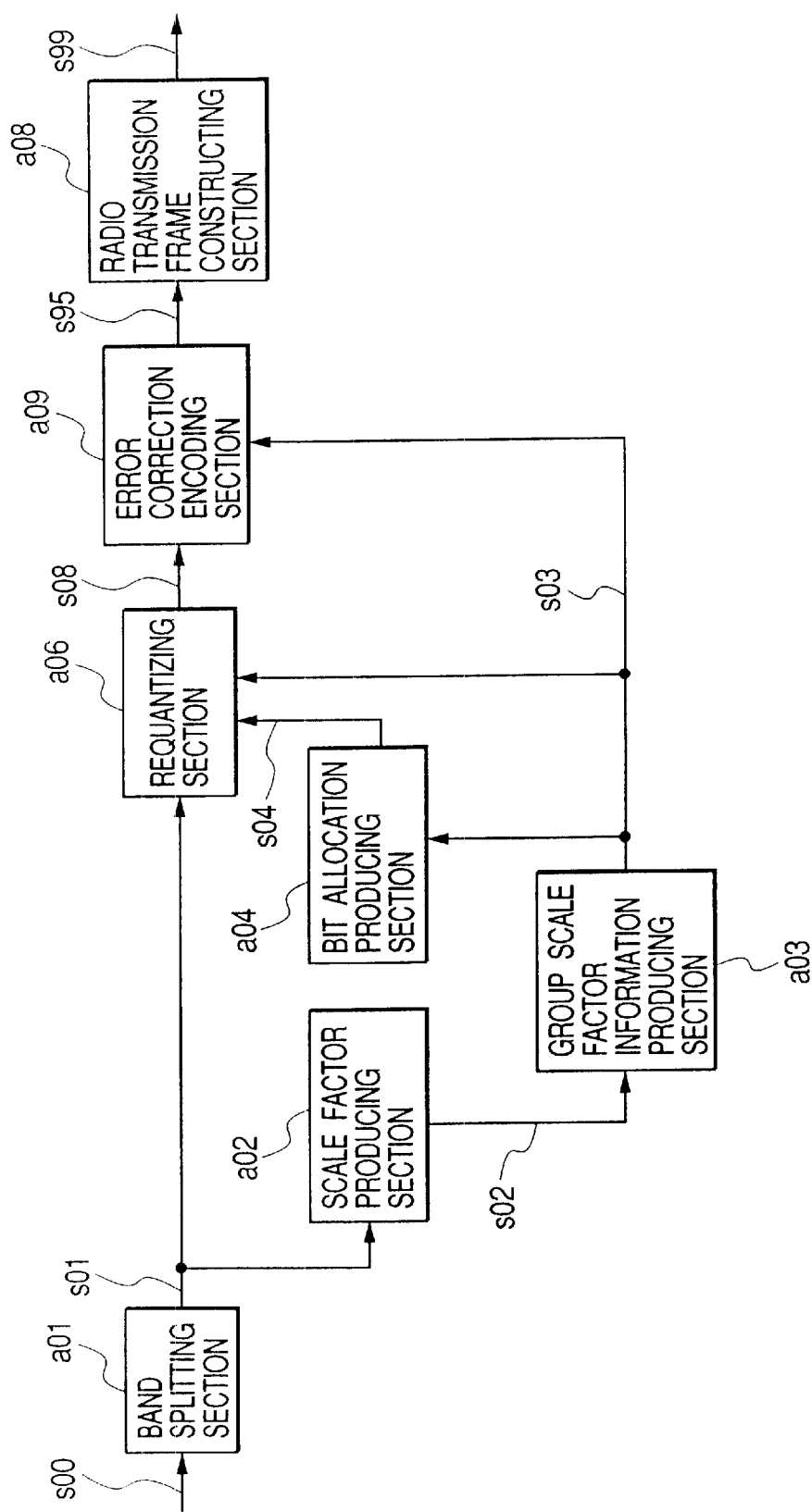
FIG. 25 is a block diagram showing a subband encoding system in accordance with the sixth embodiment of the present invention.

FIG. 25 is a block diagram showing a subband encoding system in accordance with a seventh embodiment of the present invention. In FIG. 25, an error-correction encoding section a09 performs error correction of the requantized output signal based on the group scale factor information.

Figure 26:
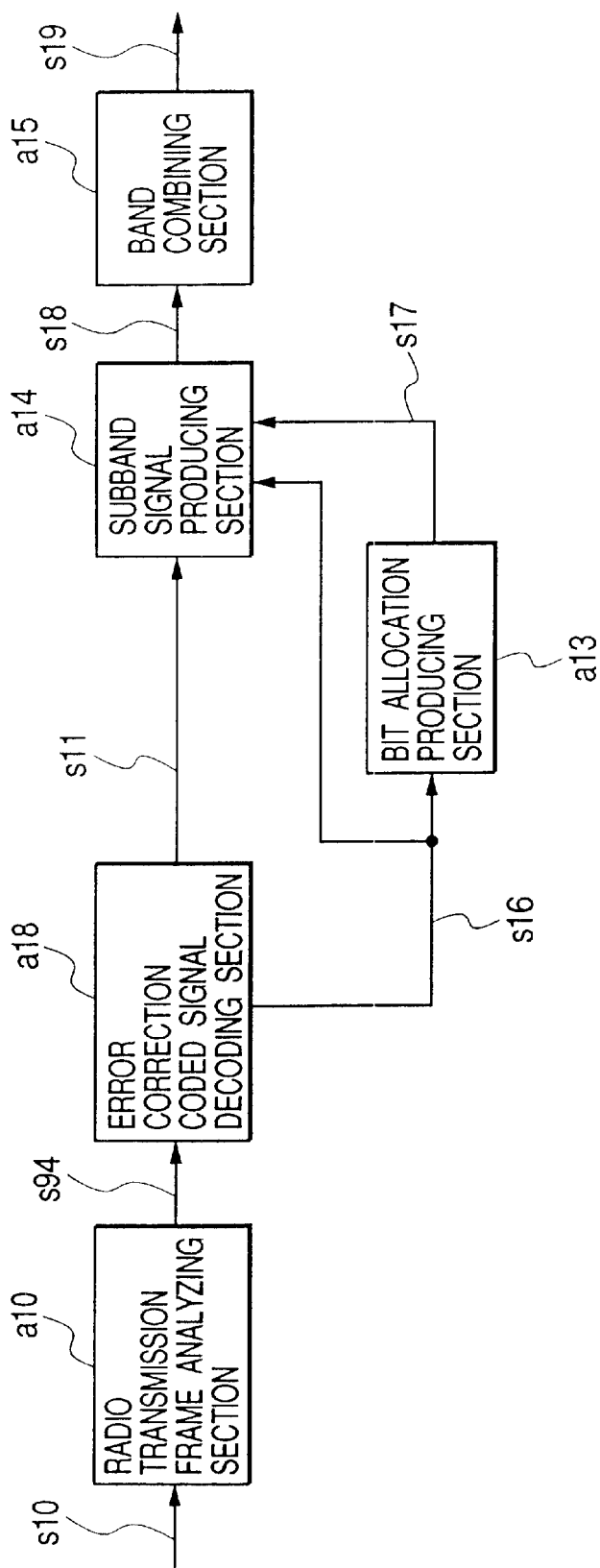
FIG. 26 is a block diagram showing a subband decoding system in accordance with a seventh embodiment of the present invention.

Hereinafter, the encoding system of the seventh embodiment will be explained with reference to the block diagram of the encoding system shown in FIG. 25, a block diagram of a decoding system shown in FIG. 26, and a frame arrangement for the error-correction encoding processing shown in FIG. 27. The encoding processing similar to that of the fifth embodiment of the present invention is performed in a band splitting section a01, a scale factor producing section a02, a group scale factor information producing section a03, a bit allocation producing section a04, and a requantizing section a06 in the encoding system shown in FIG. 25, thereby obtaining group scale factor information s03 and a requantized output signal s08.

Figure 27:
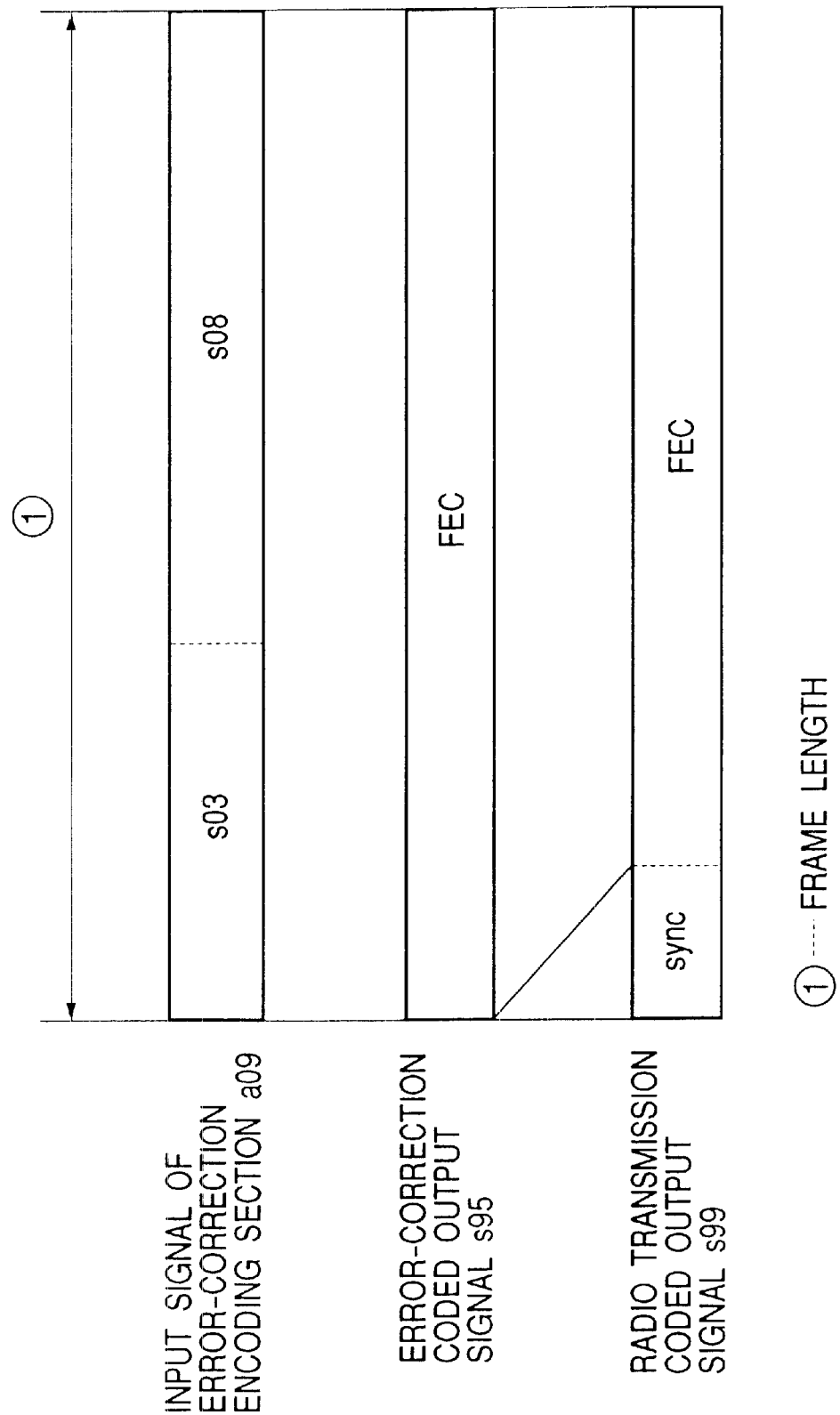
FIG. 27 is a view showing an error-correction coded frame arrangement for the subband decoding system in accordance with the seventh embodiment of the present invention.
Figure 28:
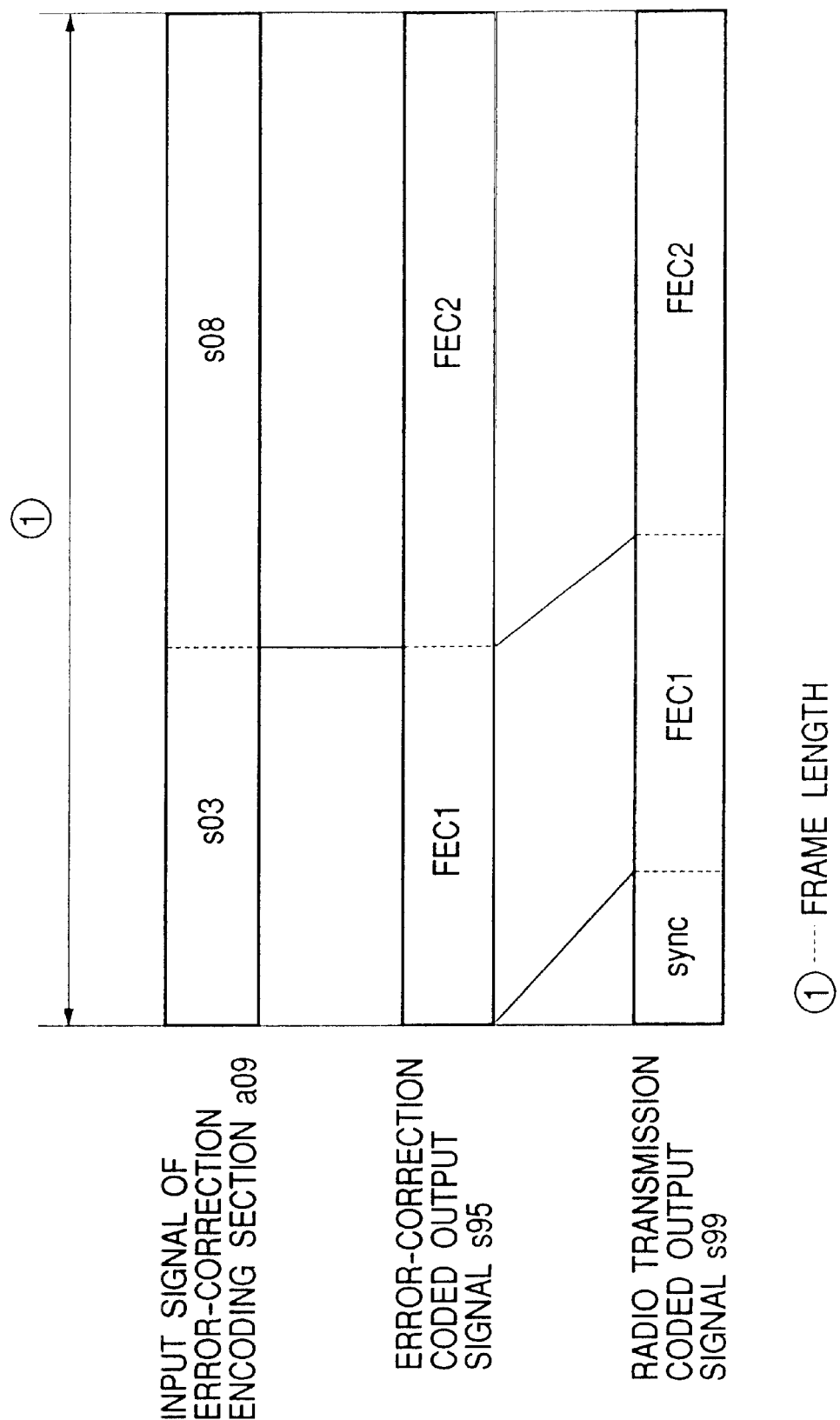
FIG. 28 is a view showing another error-correction coded frame arrangement for the subband decoding system in accordance with the seventh embodiment of the present invention.

The error-correction encoding section a09 performs the error correction encoding processing applied to the group scale factor information s03 and the requantized output signal s08 in a relationship shown in FIG. 28. The error-correction encoding section a09 produces an error-correction coded output signal s95. Error-correction codes used in the error-correction encoding section a09 are block codes, convolutional codes, and connected codes. According to the frame arrangement shown in FIG. 27, the error-correction encoding processing is performed in the order of s03 and s08. However, the processing order of the input signal can be flexibly changed provided that the changed order is consistent in both of the encoding section and the decoding section and is a predetermined one.

A radio transmission frame constructing section a08 puts additional radio transmission information "sync" to the error-correction coded output signal s95 as shown in FIG. 27, so as to construct a radio transmission frame. Thus, the radio transmission frame constructing section a08 outputs a radio transmission coded output signal s99. The additional radio transmission information "sync" contains a sync acquisition signal, such as a frame sync signal and a clock sync signal, as well as radio transmission information, such as a guard time required for diversity switching or bidirectional switching. The radio transmission frame consists of ordinary group scale factor information s03, additional radio transmission information "sync", and the requantized output signal s08. The frame sync signal and the clock sync signal of the radio transmission frame are expressed by repeating v times a sync word of a u-bit stationary pattern.

The radio transmission coded output signal s99 shown in FIG. 25 is modulated and then transmitted on a carrier having a predetermined transmission frequency. The transmitted radio wave is received by a receiving system. The receiving system converts the received signal into a baseband frequency signal, and demodulates this signal. The radio transmission encoding/decoding processing is thus accomplished.

Hereinafter, the decoding processing performed in the decoding system shown in FIG. 26 will be explained. A decoder input signal s10 is an input signal entered into a decoding section. A radio transmission frame analyzing section a10 analyzes the additional radio transmission information "sync", and outputs an error-correction coded signal s94 which contains information "FEC" obtained by excluding the additional radio transmission information "sync" from the decoder input signal s10. More specifically, the radio transmission frame analyzing section a10 performs sync acquisition for the radio transmission coded frame and a decoder side clock based on "sync" shown in FIG. 27. Then, within a guard time, the radio transmission frame analyzing section a10 performs predetermined processing, such as diversity switching or bidirectional switching, which is necessary for the radio transmission. Based on the error-correction coded signal s94, an error-correction coded signal decoding section a18 performs the error-correction decoding processing. Then, the error-correction coded signal decoding section a18 detects group scale factor flag information s16 and a requantized signal s11. And, the error-correction coded signal decoding section a18 outputs each signal. The decoding processing is performed in a manner agreeable to the error-correction encoding processing applied to this error-correction coded signal. The succeeding decoding processing of this embodiment is performed in the same manner as that shown in the decoding system of the fifth embodiment.

Error correction Coding (II)

Next, an error-correction processing performing error correction with two different error correcting capabilities will be explained with reference to the block diagram of the encoding system shown in FIG. 25, the block diagram of the decoding system shown in FIG. 26, and the frame arrangement for the error-correction encoding processing shown in FIG. 28. The encoding processing of the this embodiment is performed in the band splitting section a01, the scale factor producing section a02, the group scale factor information producing section a03, the bit allocation producing section a04, and the requantizing section a06 in the encoding system shown in FIG. 25, thereby obtaining group scale factor information s03 and a requantized output signal s08. The error-correction encoding section a09 performs the error correction encoding processing applied to the group scale factor information s03 and the requantized output signal s08. The error-correction encoding processing performed in the error-correction encoding section a09 is differentiated for each information of s03 and s08 shown in the frame arrangement of FIG. 28. In other words, error correction capabilities assigned to respective information s03 and s08 are different from each other. The error-correction encoding section a09 produces two different error-correction code words FEC1 and FEC2 corresponding to s03 and s08 respectively, and constructs a frame shown in FIG. 28. Thus, the error-correction encoding section a09 produces an error-correction coded output signal s95. Regarding the error-correction encoding processing using different error-correction capabilities, the error-correction capability of s03 is set to be higher than the error-correction capability of s08 because the information s08 is dependent on the information s03 in the production of bit allocation information. However, the order of the error-correction encoding processing and respective error-correction code words FEC1, FEC2 can be flexibly changed provided that the changed order is consistent in both of the encoding section and the decoding section and is a predetermined one.

The radio transmission frame constructing section a08 puts additional radio transmission information "sync" to the error-correction coded output signal s95 as shown in FIG. 28, so as to construct a radio transmission frame. Thus, the radio transmission frame constructing section a08 outputs a radio transmission coded output signal s99. The additional radio transmission information "sync" contains a sync acquisition signal, such as a frame sync signal and a clock sync signal, as well as radio transmission information, such as a guard time required for diversity switching or bidirectional switching.

The radio transmission coded output signal s99 shown in FIG. 25 is modulated and then transmitted on a carrier having a predetermined transmission frequency. The transmitted radio wave is received by a receiving system. The receiving system converts the received signal into a baseband frequency signal, and demodulates this signal. The radio transmission encoding/decoding processing is thus accomplished.

Hereinafter, the decoding processing performed in the decoding system shown in FIG. 26 will be explained. The decoder input signal s10 is an input signal entered into a decoding section. The radio transmission frame analyzing section a10 analyzes the additional radio transmission information "sync", and outputs an error-correction coded signal s94 which contains information "FEC" obtained by excluding the additional radio transmission information "sync" from the decoder input signal s10. More specifically, the radio transmission frame analyzing section a10 performs sync acquisition for the radio transmission coded frame and a decoder side clock based on "sync" shown in FIG. 27. Then, within a guard time, the radio transmission frame analyzing section a10 performs predetermined processing, such as diversity switching or bidirectional switching, which is necessary for the radio transmission. Based on the error-correction coded signal s94, the error-correction coded signal decoding section a18 performs the error-correction decoding processing using different error-correction capabilities with respect to respective data FEC1 and FEC2 shown in FIG. 28. Then, the error-correction coded signal decoding section a18 detects group scale factor information s16 and a requantized signal s11. And, the error-correction coded signal decoding section a18 outputs each signal. The decoding processing using different error-correction capabilities is performed in a manner agreeable to the error-correction encoding processing applied to this error-correction coded signal.

Error Correction Coding (III)

Hereinafter, an example utilizing BCH codes will be explained with reference to the block diagram of an encoding system shown in FIG. 29, a block diagram of a decoding system shown in FIG. 30, and a frame arrangement for the error-correction encoding processing shown in FIG. 31. The encoding processing similar to that of the seventh embodiment of the present invention is performed in a band splitting section a01, a scale factor producing section a02, a group scale factor information producing section a03, a bit allocation producing section a04, and a requantizing section a06 in the encoding system shown in FIG. 29, thereby obtaining group scale factor information s03 and a requantized output signal s08.

Next, a BCH encoding section a99 performs the BCH encoding processing applied to the group scale factor information s03 and the requantized output signal s08. The BCH encoding processing performed in the BCH encoding section a99 is for assigning different correction capabilities to respective information s03 and s08 shown in the frame arrangement of FIG. 31. The BCH encoding section a99 produces two different BCH codes bch1 and bch2 corresponding to s03 and s08 respectively, and constructs a frame shown in FIG. 31. Thus, the BCH encoding section a99 produces a BCH coded output signal s93. Regarding the BCH encoding processing using different correction capabilities, the error-correction capability of s03 is set to be higher than the error-correction capability of s08 because the information s08 is dependent on the information s03 in the production of bit allocation information. However, the order of the BCH encoding processing and respective BCH code words bch1, bch2 can be flexibly changed provided that the changed order is consistent in both of the encoding section and the decoding section and is a predetermined one.

Figure 31:
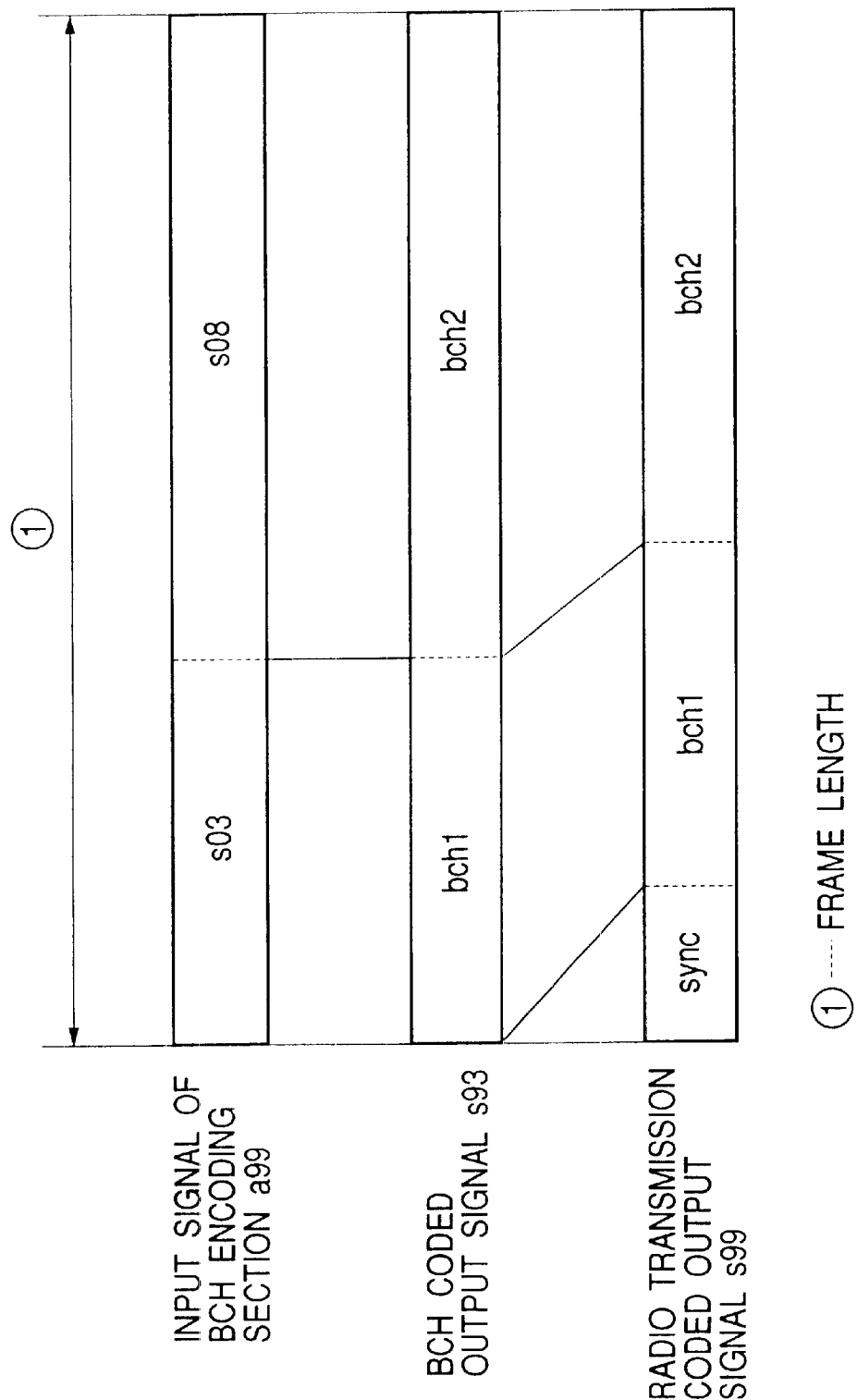
FIG. 31 is a view showing another error-correction coded frame arrangement for the subband decoding system in accordance with the seventh embodiment of the present invention.

A radio transmission frame constructing section a08 puts additional radio transmission information "sync" to the BCH coded output signal s93 as shown in FIG. 31, so as to construct a radio transmission frame. Thus, the radio transmission frame constructing section a08 outputs a radio transmission coded output signal s99.

Figure 29:
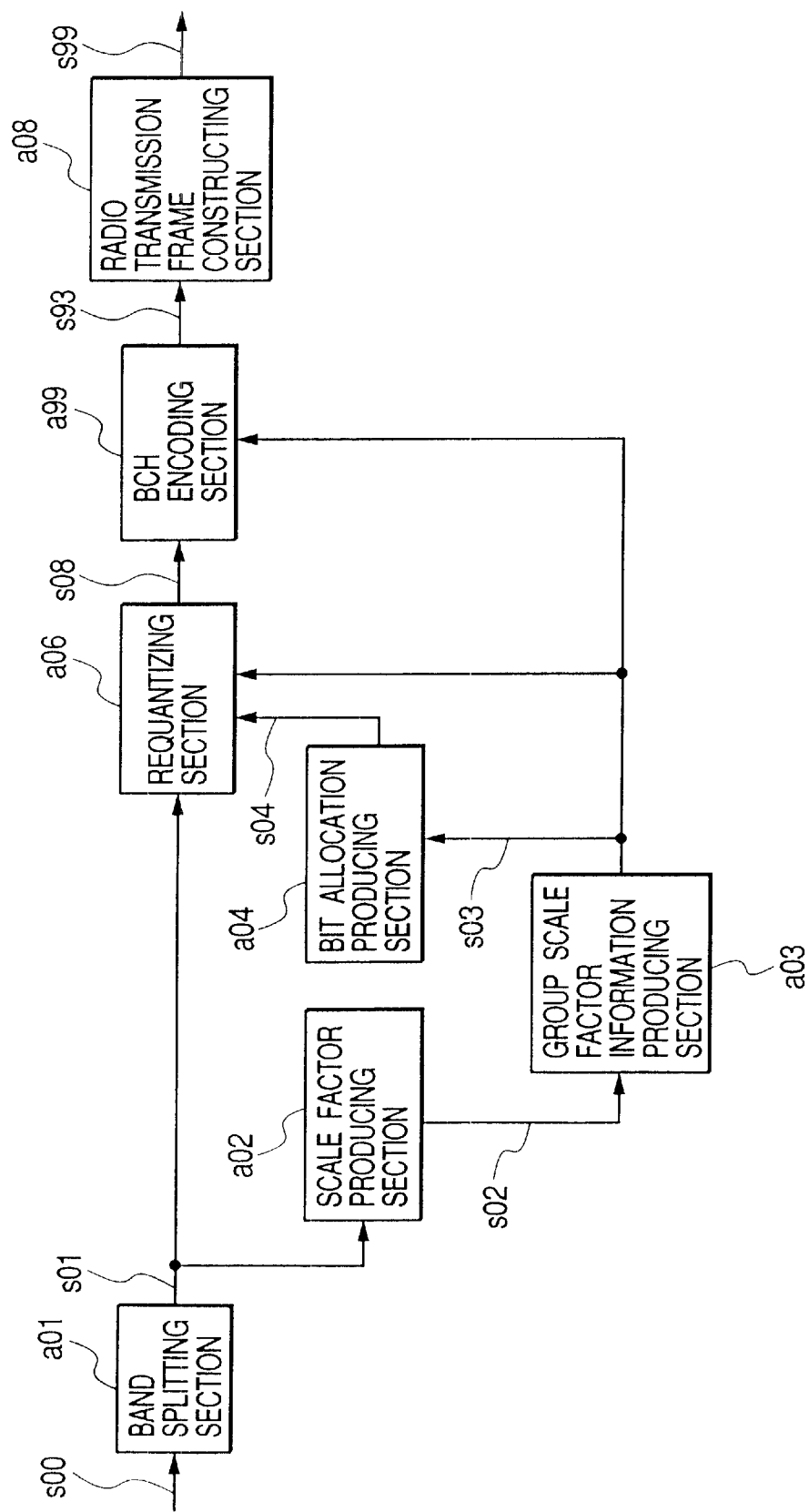
FIG. 29 is a block diagram showing a subband encoding system in accordance with the seventh embodiment of the present invention.
Figure 30:
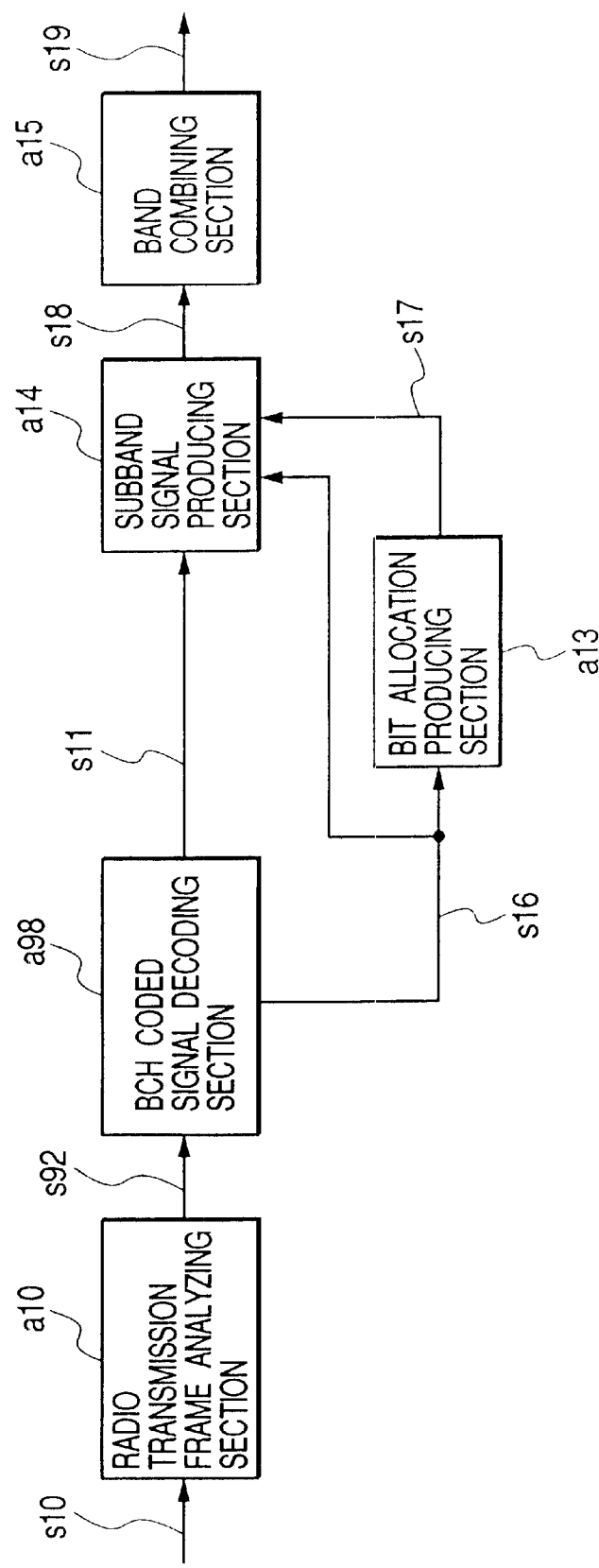
FIG. 30 is a block diagram showing another subband decoding system in accordance with the seventh embodiment of the present invention.

The radio transmission coded output signal s99 shown in FIG. 29 is modulated and then transmitted on a carrier having a predetermined transmission frequency. The transmitted radio wave is received by a receiving system. The receiving system converts the received signal into a baseband frequency signal, and demodulates this signal. The radio transmission encoding/decoding processing is thus accomplished.

Hereinafter, the decoding processing performed in the decoding system shown in FIG. 30 will be explained. A decoder input signal s10 is an input signal entered into a decoding section. A radio transmission frame analyzing section a10 analyzes the additional radio transmission information "sync", and outputs a BCH coded signal s92 which contains information "bch1" and "bch2" obtained by excluding the additional radio transmission information "sync" from the decoder input signal s10. More specifically, the radio transmission frame analyzing section a10 performs sync acquisition for the radio transmission coded frame and a decoder side clock based on "sync" shown in FIG. 31. Then, within a guard time, the radio transmission frame analyzing section a10 performs predetermined processing, such as diversity switching or bidirectional switching, which is necessary for the radio transmission. Based on the BCH coded signal s92, a BCH coded signal decoding section a98 performs the BCH decoding processing using different correction capabilities with respect to respective data bch1 and bch2 shown in FIG. 31. Then, the BCH coded signal decoding section a98 detects group scale factor information s16 and a requantized signal s11. And, the BCH coded signal decoding section a98 outputs each signal. The BCH decoding processing using different correction capabilities is performed in a manner agreeable to the BCH encoding processing applied to this BCH coded signal.

Error Correction Coding (IV)

Hereinafter, an example utilizing convolutional codes will be explained with reference to the block diagram of an encoding system shown in FIG. 32, a block diagram of a decoding system shown in FIG. 33, and a frame arrangement for the error-correction encoding processing shown in FIG. 34. The encoding processing is performed in a band splitting section a01, a scale factor producing section a02, a group scale factor information producing section a03, a bit allocation producing section a04, and a requantizing section a06 in the encoding system shown in FIG. 32, thereby obtaining group scale factor information s03 and a requantized output signal s08.

Next, a convolutional encoding section a97 performs the convolutional encoding processing applied to the group scale factor information s03 and the requantized output signal s08. The convolutional encoding processing performed in the convolutional encoding section a97 is for assigning different correction capabilities to respective information s03 and s08 shown in the frame arrangement of FIG. 34. The convolutional encoding section a97 produces two different convolutional codes CNV1 and CNV2 corresponding to s03 and s08 respectively, and constructs a frame shown in FIG. 34. Thus, the convolutional encoding section a97 produces a convolutional coded output signal s91. Regarding the convolutional encoding processing using different correction capabilities, the error-correction capability of s03 is set to be higher than the error-correction capability of s08 because the information s08 is dependent on the information s03 in the production of bit allocation information. However, the order of the convolutional encoding processing and respective convolutional code words CNV1, CNV2 can be flexibly changed provided that the changed order is consistent in both of the encoding section and the decoding section and is a predetermined one.

Figure 34:
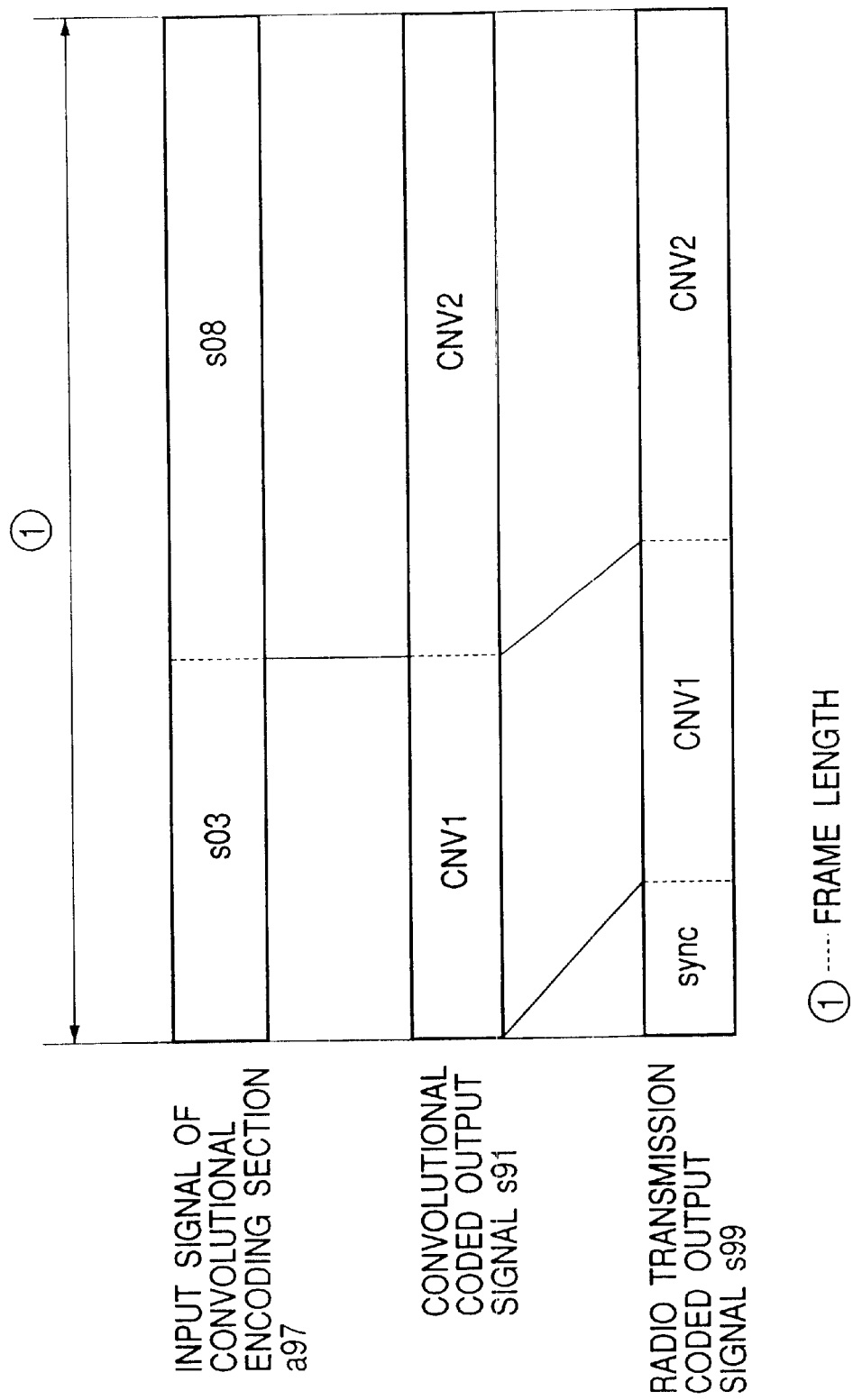
FIG. 34 is a view showing another error-correction coded frame arrangement for the subband decoding system in accordance with the seventh embodiment of the present invention.

A radio transmission frame constructing section a08 puts additional radio transmission information "sync" to the convolutional coded output signal s91 as shown in FIG. 34, so as to construct a radio transmission frame. Thus, the radio transmission frame constructing section a08 outputs a radio transmission coded output signal s99.

Figure 32:
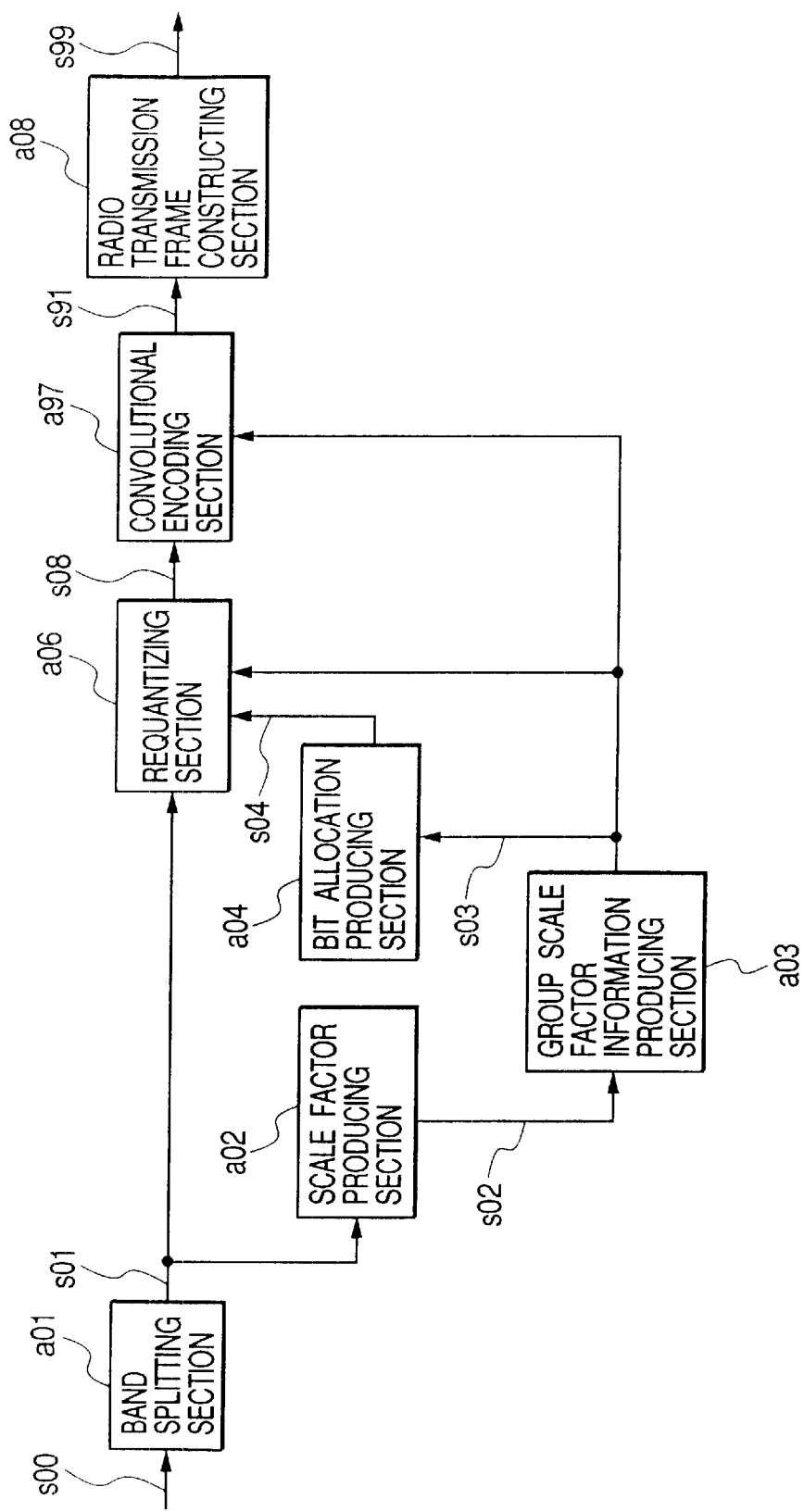
FIG. 32 is a block diagram showing another subband encoding system in accordance with the seventh embodiment of the present invention.
Figure 33:
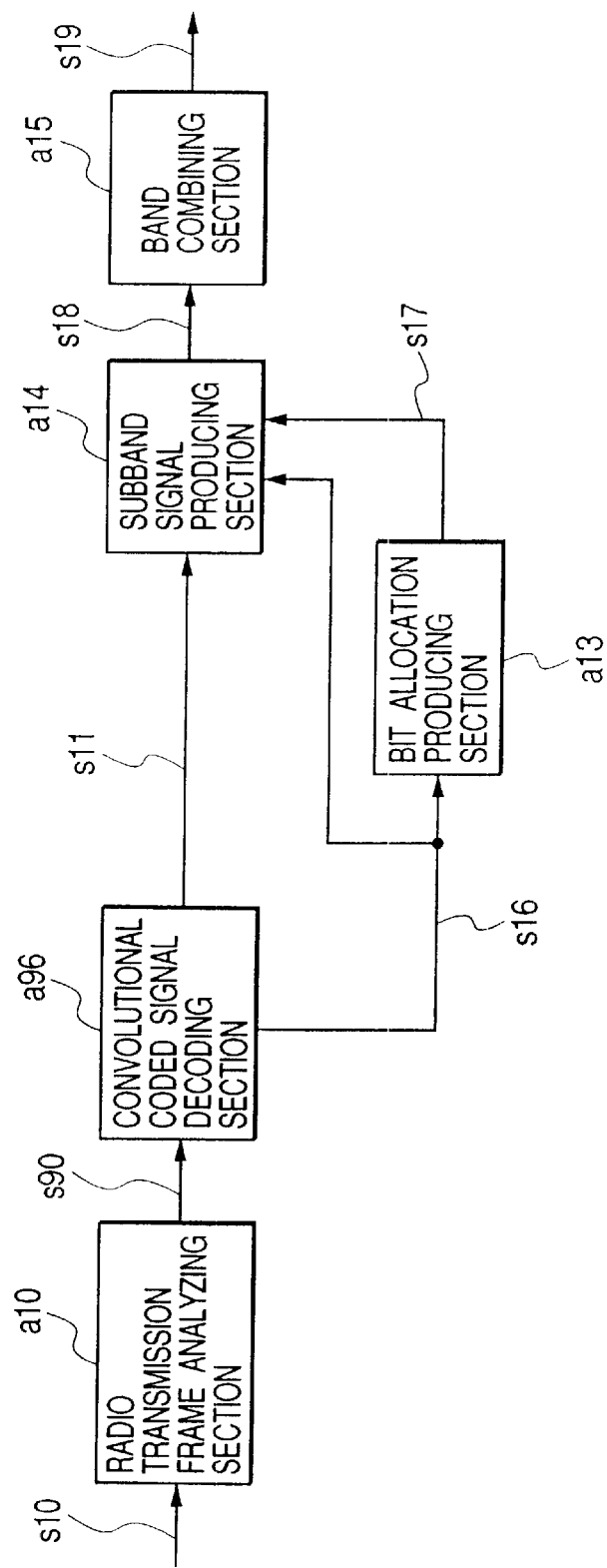
FIG. 33 is a block diagram showing another subband decoding system in accordance with the seventh embodiment of the present invention.

The radio transmission coded output signal s99 shown in FIG. 32 is modulated and then transmitted on a carrier having a predetermined transmission frequency. The transmitted radio wave is received by a receiving system. The receiving system converts the received signal into a baseband frequency signal, and demodulates this signal. The radio transmission encoding/decoding processing is thus accomplished.

Hereinafter, the decoding processing performed in the decoding system shown in FIG. 33 will be explained. A decoder input signal s10 is an input signal entered into a decoding section. A radio transmission frame analyzing section a10 analyzes the additional radio transmission information "sync", and outputs a convolutional coded signal s90 which contains information "CNV1" and "CNV2" obtained by excluding the additional radio transmission information "sync" from the decoder input signal s10. More specifically, the radio transmission frame analyzing section a10 performs sync acquisition for the radio transmission coded frame and a decoder side clock based on "sync" shown in FIG. 34. Then, within a guard time, the radio transmission frame analyzing section a10 performs predetermined processing, such as diversity switching or bidirectional switching, which is necessary for the radio transmission. Based on the convolutional coded signal s90, a convolutional coded signal decoding section a96 performs the convolutional decoding processing using different correction capabilities with respect to respective data CNV1 and CNV2 shown in FIG. 34. Then, the convolutional coded signal decoding section a96 detects group scale factor information s16 and a requantized signal s11. And, the convolutional coded signal decoding section a96 outputs each signal. The convolutional decoding processing using different correction capabilities is performed in a manner agreeable to the convolutional encoding processing applied to this convolutional coded signal.

Error Correction Coding (V)

Figure 35:
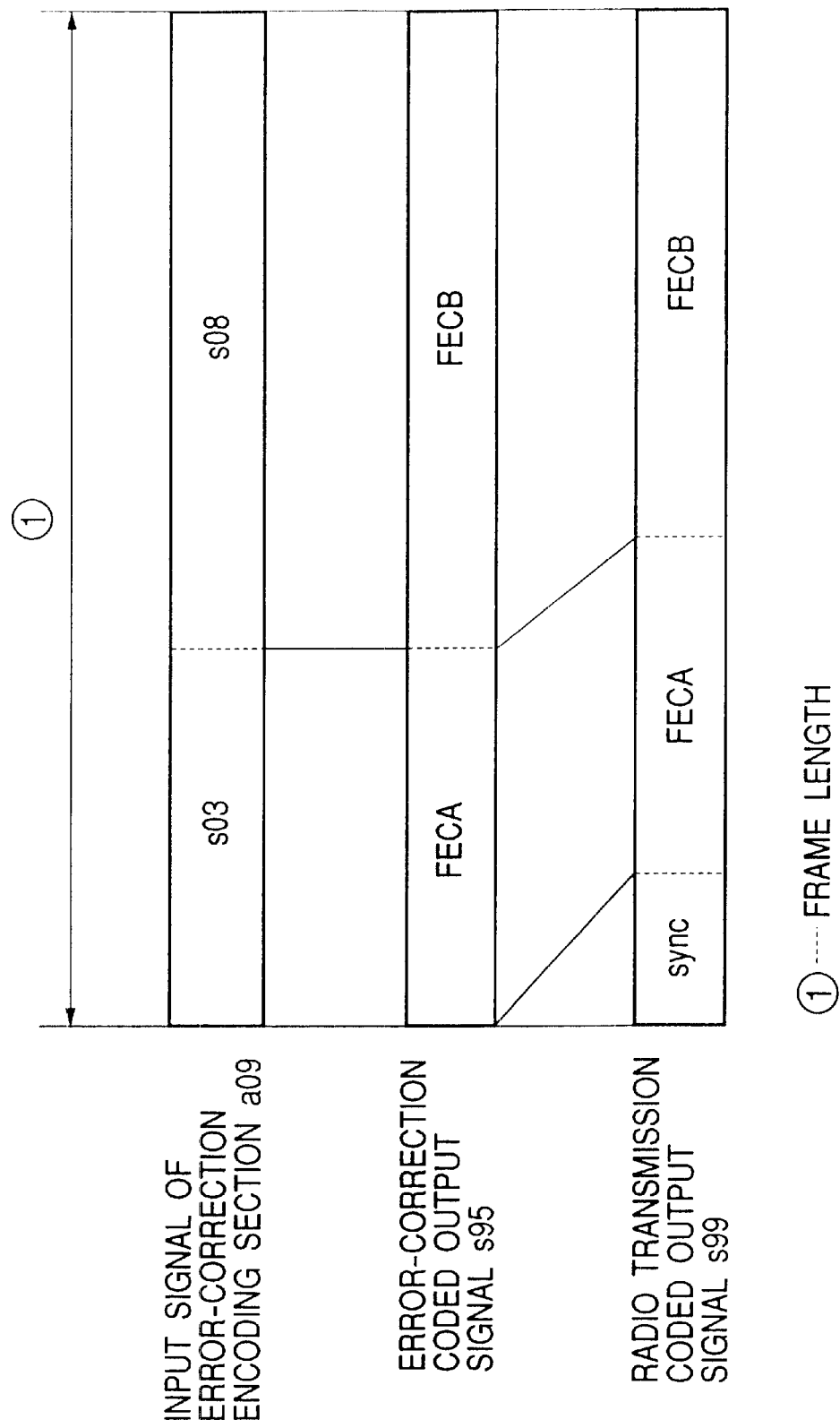
FIG. 35 is a view showing another error-correction coded frame arrangement for the subband decoding system in accordance with the seventh embodiment of the present invention.

Next, an example of using two different types of error correcting codes will be explained with reference to the block diagram of the encoding system shown in FIG. 25, the block diagram of the decoding system shown in FIG. 26, and a frame arrangement for the error-correction encoding processing shown in FIG. 35. The encoding processing of the this embodiment is performed in the band splitting section a01, the scale factor producing section a02, the group scale factor information producing section a03, the bit allocation producing section a04, and the requantizing section a06 in the encoding system shown in FIG. 25, thereby obtaining group scale factor information s03 and a requantized output signal s08. The error-correction encoding section a09 performs error correction encoding processing applied to the group scale factor information s03 and the requantized output signal s08. The error-correction encoding processing performed in the error-correction encoding section a09 is differentiated in the way of error correction for each information of s03 and s08 shown in the frame arrangement of FIG. 35. The error-correction encoding section a09 produces two different types of error-correction code words FECA and FECB corresponding to s03 and s08 respectively, and constructs a frame shown in FIG. 35. Thus, the error-correction encoding section a09 produces an error-correction coded output signal s95. Regarding the above error-correction encoding processing using different type error-correction capabilities, two different types of error-correction encoding methods are selected from a plurality kinds of error-correction encoding methods, such as block encoding, convolutional encoding etc. The error-correction capability of s03 is set to be higher than the error-correction capability of s08 because the information s08 is dependent on the information s03 in the production of bit allocation information. However, the order of the error-correction encoding processing and respective error-correction code words FECA, FECB can be flexibly changed provided that the changed order is consistent in both of the encoding section and the decoding section and is a predetermined one.

The radio transmission coded output signal s99 shown in FIG. 25 is modulated and then transmitted on a carrier having a predetermined transmission frequency. The transmitted radio wave is received by a receiving system. The receiving system converts the received signal into a baseband frequency signal, and demodulates this signal. The radio transmission encoding/decoding processing is thus accomplished.

Hereinafter, the decoding processing performed in the decoding system shown in FIG. 26 will be explained. The decoder input signal s10 is an input signal entered into a decoding section. The radio transmission frame analyzing section a10 analyzes the additional radio transmission information "sync", and outputs an error-correction coded signal s94 which contains information "FECA" and "FECB" obtained by excluding the additional radio transmission information "sync" from the decoder input signal s10. More specifically, the radio transmission frame analyzing section a10 performs sync acquisition for the radio transmission coded frame and a decoder side clock based on "sync" shown in FIG. 35. Then, within a guard time, the radio transmission frame analyzing section a10 performs predetermined processing, such as diversity switching or bidirectional switching, which is necessary for the radio transmission. Based on the error-correction coded signal s94, the error-correction coded signal decoding section a18 performs the error-correction decoding processing using different types of error corrections with respect to respective data FECA and FECB shown in FIG. 35. Then, the error-correction coded signal decoding section a18 detects group scale factor information s16 and a requantized signal s11. And, the error-correction coded signal decoding section a18 outputs each signal. The decoding processing using different types of error-correction capabilities is performed in a manner agreeable to the error-correction encoding processing applied to this error-correction coded signal.

Error Correction Coding (VI)

Figure 36:
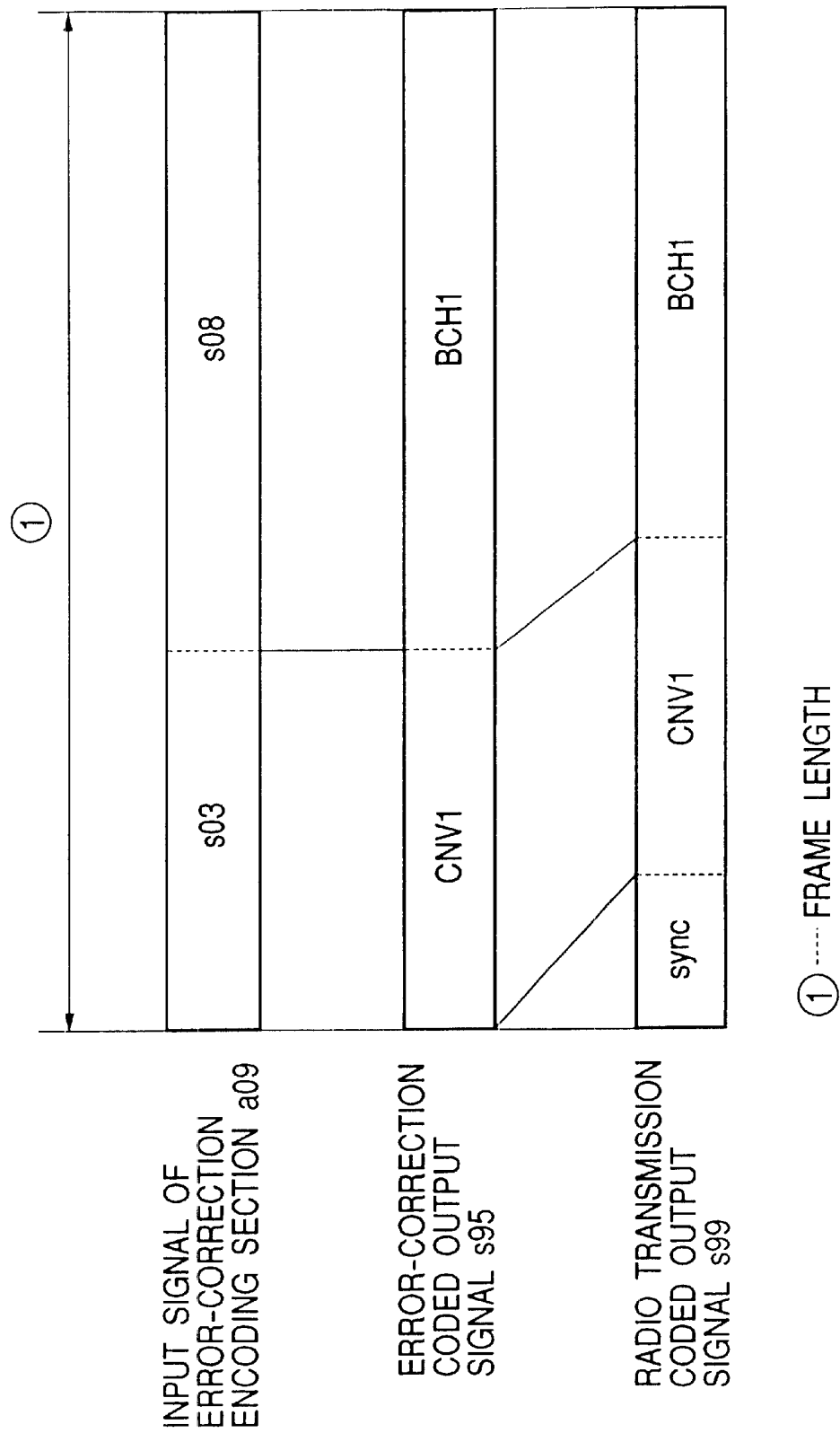
FIG. 36 is a view showing another error-correction coded frame arrangement for the subband decoding system in accordance with the seventh embodiment of the present invention.

Next, an example of using a combination of a convolutional code and a BCH code will be explained with reference to the block diagram of the encoding system shown in FIG. 25, the block diagram of the decoding system shown in FIG. 26, and a frame arrangement for the error-correction encoding processing shown in FIG. 36. The encoding processing of the this embodiment is performed in the band splitting section a01, the scale factor producing section a02, the group scale factor information producing section a03, the bit allocation producing section a04, and the requantizing section a06 in the encoding system shown in FIG. 25, thereby obtaining group scale factor information s03 and a requantized output signal s08. The error-correction encoding section a09 performs error correction encoding processing applied to the group scale factor information s03 and the requantized output signal s08. The error-correction encoding processing performed in the error-correction encoding section a09 is a combination of the convolutional code and the BCH code applied to the information s03 and s08 shown in the frame arrangement of FIG. 36. The error-correction encoding section a09 produces two different types of error-correction code words CNV1 and BCH1 corresponding to s03 and s08 respectively, and constructs a frame shown in FIG. 36. Thus, the error-correction encoding section a09 produces an error-correction coded output signal s95. Regarding the above error-correction encoding processing, the example of FIG. 36 assigns the convolutional code to the information s03 and the BCH code to the information s8, thereby producing respective code words CNV1 and BCH1. However, the combination of two different error-correction coding methods and setting of error-correction capabilities are arbitrarily changeable provided that the changed combination/setting is consistent in both of the encoding processing and the decoding processing. The error-correction capability of s03 is set to be higher than the error-correction capability of s08 because the information s08 is dependent on the information s03 in the production of bit allocation information. However, the order of the error-correction code words CNV1, BCH1 in the signals s95 and s99 shown in FIG. 36 can be flexibly changed provided that the changed order is consistent in both of the encoding section and the decoding section and is a predetermined one.

The radio transmission coded output signal s99 shown in FIG. 25 is modulated and then transmitted on a carrier having a predetermined transmission frequency. The transmitted radio wave is received by a receiving system. The receiving system converts the received signal into a baseband frequency signal, and demodulates this signal. The radio transmission encoding/decoding processing is thus accomplished.

Hereinafter, the decoding processing performed in the decoding system shown in FIG. 26 will be explained. The decoder input signal s10 is an input signal entered into a decoding section. The radio transmission frame analyzing section a10 analyzes the additional radio transmission information "sync", and outputs an error-correction coded signal s94 which contains information "CNV1" and "BCH1" obtained by excluding the additional radio transmission information "sync" from the decoder input signal s10. More specifically, the radio transmission frame analyzing section a10 performs sync acquisition for the radio transmission coded frame and a decoder side clock based on "sync" shown in FIG. 36. Then, within a guard time, the radio transmission frame analyzing section a10 performs predetermined processing, such as diversity switching or bidirectional switching, which is necessary for the radio transmission. Based on the error-correction coded signal s94, the error-correction coded signal decoding section a18 performs the error-correction decoding processing using different types of error corrections with respect to respective data CNV1 and BCH1 shown in FIG. 36. Then, the error-correction coded signal decoding section a18 detects group scale factor information s16 and a requantized signal s11. And, the error-correction coded signal decoding section a18 outputs each signal. The decoding processing combining the BCH coding correction and the convolutional coding correction is performed in a manner agreeable to the error-correction encoding processing applied to this error-correction coded signal.

Error Correction Coding (VII)

Next, another example of using a combination of a convolutional code and a BCH code will be explained with reference to the block diagram of the encoding system shown in FIG. 25, the block diagram of the decoding system shown in FIG. 26, and a frame arrangement for the error-correction encoding processing shown in FIG. 37. The encoding processing is performed in the band splitting section a01, the scale factor producing section a02, the group scale factor information producing section a03, the bit allocation producing section a04, and the requantizing section a06 in the encoding system shown in FIG. 25, thereby obtaining group scale factor information s03 and a requantized output signal s08. The error-correction encoding section a09 performs error correction encoding processing applied to the group scale factor information s03 and information s08a which is part of the requantized output signal s08. The error-correction encoding processing performed in the error-correction encoding section a09 is a combination of the convolutional code and the BCH code applied to the information s03 and s08a shown in the frame arrangement of FIG. 37. The error-correction encoding section a09 produces two different types of error-correction code words CNV1 and BCH1 corresponding to s03 and s08a respectively, and constructs a frame shown in FIG. 37. Thus, the error-correction encoding section a09 produces an error-correction coded output signal s95. The relationship between information s08a and s08b is as follows.

(Information amount of s08)=(Information amount of s08a)+(Information amount of s08b)

Figure 37:
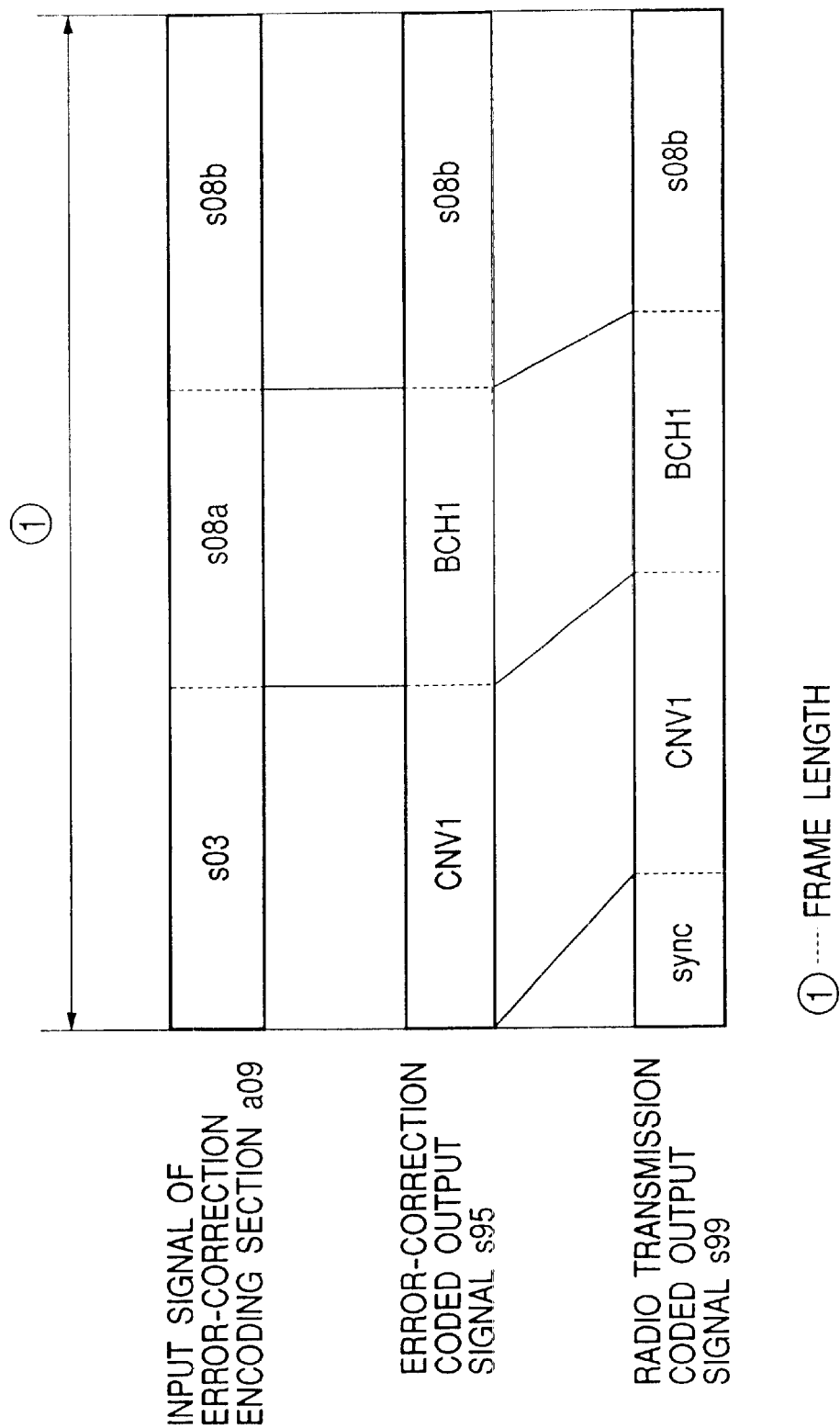
FIG. 37 is a view showing another error-correction coded frame arrangement for the subband decoding system in accordance with the seventh embodiment of the present invention.

Regarding the above error-correction encoding processing, the example of FIG. 37 assigns the convolutional code to the information s03 and the BCH code to the information s08a, thereby producing respective code words CNV1 and BCH1. According to this example, no error-correction code is assigned to the information s08b. In other words, the error-correction encoding processing is performed for part of information constituting a coded frame in response to importance of each information.

The combination of two different error-correction coding methods and setting of error-correction capabilities are arbitrarily changeable provided that the changed combination/setting is consistent in both of the encoding processing and the decoding processing. The error-correction capability of s03 is set to be higher than the error-correction capability of s08 because the information s08 is dependent on the information s03 in the production of bit allocation information. However, the order of the error-correction code words CNV1, BCH1 in the signals s95 and s99 shown in FIG. 37 can be flexibly changed provided that the changed order is consistent in both of the encoding section and the decoding section and is a predetermined one.

The radio transmission frame constructing section a08 puts additional radio transmission information "sync" to the error-correction coded output signal s95 as shown in FIG. 37, so as to construct a radio transmission frame. Thus, the radio transmission frame constructing section a08 outputs a radio transmission coded output signal s99.

The radio transmission coded output signal s99 shown in FIG. 25 is modulated and then transmitted on a carrier having a predetermined transmission frequency. The transmitted radio wave is received by a receiving system. The receiving system converts the received signal into a baseband frequency signal, and demodulates this signal. The radio transmission encoding/decoding processing is thus accomplished.

Hereinafter, the decoding processing performed in the decoding system shown in FIG. 26 will be explained. The decoder input signal s10 is an input signal entered into a decoding section. The radio transmission frame analyzing section a10 analyzes the additional radio transmission information "sync", and outputs an error-correction coded signal s94 which contains information "CNV1", "BCH1" and "s08b" obtained by excluding the additional radio transmission information "sync" from the decoder input signal s10. More specifically, the radio transmission frame analyzing section a10 performs sync acquisition for the radio transmission coded frame and a decoder side clock based on "sync" shown in FIG. 37. Then, within a guard time, the radio transmission frame analyzing section a10 performs predetermined processing, such as diversity switching or bidirectional switching, which is necessary for the radio transmission. Based on the error-correction coded signal s94, the error-correction coded signal decoding section a18 performs error-correction decoding processing using the combination of the BCH coding correction and the convolutional coding correction with respect to respective data CNV1 and BCH1 shown in FIG. 37. Then, the error-correction coded signal decoding section a18 detects group scale factor information s16 and a requantized signal s11. And, the error-correction coded signal decoding section a18 outputs each signal. The decoding processing combining the BCH coding correction and the convolutional coding correction is performed in a manner agreeable to the error-correction encoding processing applied to this error-correction coded signal.

As described above, the seventh embodiment of the present invention provides a subband encoding system which performs error-correction encoding processing during the encoding operation by utilizing BCH code, convolutional code, etc. Thus, by performing the error correction processing during the frame construction for the subband coding used in the radio transmission, it becomes possible to reduce the delay time in the processing of the overall system.

Eighth Embodiment

An eighth embodiment of the present invention provides a subband encoding system which considers influence of encoding error in rearranging requantized output signals.

The eighth embodiment of the present invention will be explained hereinafter with reference to the block diagram of the encoding system shown in FIG. 25, the decoding system shown in FIG. 26, and the frame arrangement of error-correction encoding processing shown in FIG. 37. The error-correction encoding section a09 shown in FIG. 25 receives requantized output signals s08 and rearranges them to implement a weighting considering influence of the error correction. More specifically, the requantized output signals s08 are lined up in order of the number (1 to n) of split bands, for each bit value from MSB to LSB. In this rearranging processing, a bit being applied no bit allocation is skipped. This rearrangement processing makes it possible to perform the error correction in accordance with the weighting to the error correction. Regarding the error-correction coded signal decoding processing, the error-correction coded signal decoding section a18 shown in FIG. 26 produces a requantized signal s11 considering the rearrangement performed in the encoding processing section.

As described above, the eighth embodiment of the present invention provides a subband encoding system which considers the influence of encoding error in the rearrangement of requantized output signals. Thus, it becomes possible to reduce deterioration at the user interface level induced by encoding error.

Ninth Embodiment

A ninth embodiment of the present invention provides a subband decoding system which performs frame interpolation processing when the encoding error bit number is not smaller than a threshold, and directly outputs a decoded signal otherwise.

Interpolation Processing (III)

Figure 38:
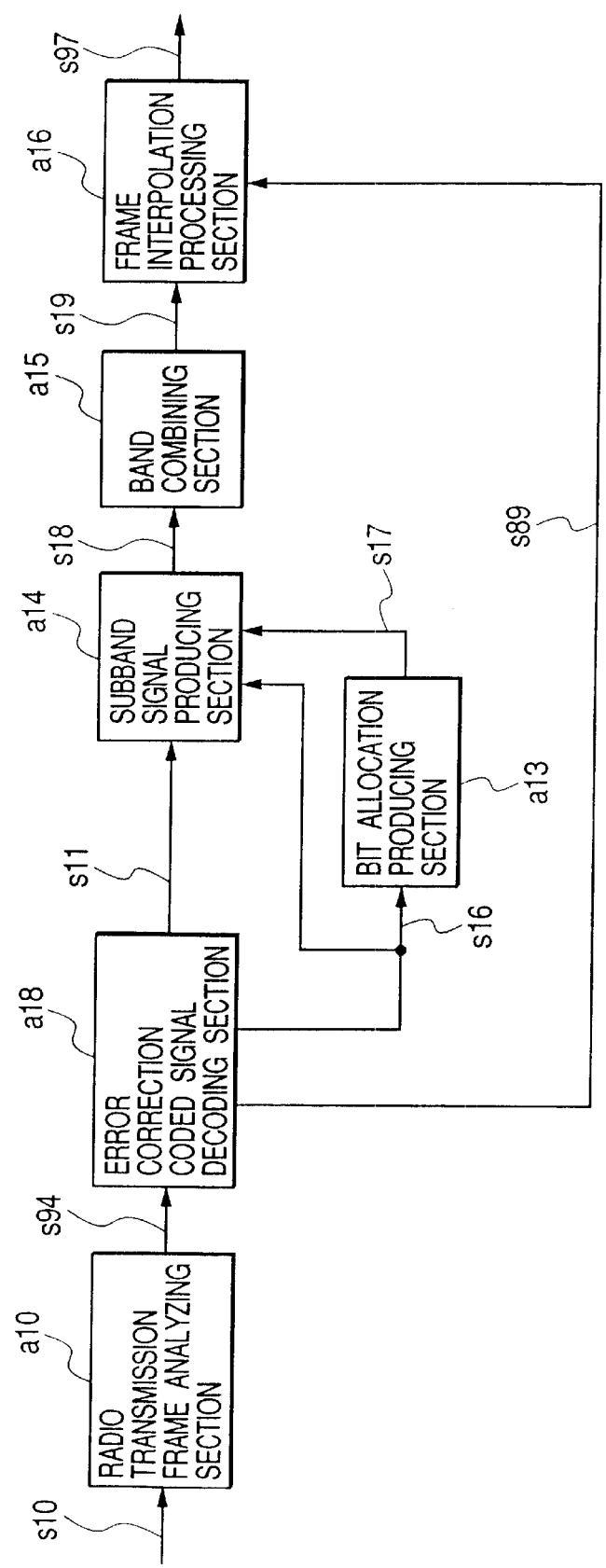
FIG. 38 is a block diagram showing a subband decoding system in accordance with a ninth embodiment of the present invention.

FIG. 38 is a block diagram showing a decoding system in accordance with the ninth embodiment of the present invention. In FIG. 38, the frame interpolation processing section a16 performs the interpolation processing on a digital output signal based on an error detection signal.

The decoding system in accordance with the ninth embodiment of the present invention will be explained hereinafter with reference to the block diagram of the decoding system shown in FIG. 38, and the frame arrangement for the error-correction encoding processing shown in FIG. 27. A decoder input signal s10, after being applied the encoding and radio transmission processing in accordance with the embodiment of this invention, is entered into the decoding processing section shown in FIG. 38. The frame arrangement of the decoder input signal s10 is identical with the radio transmission coded frame arrangement of the radio transmission coded output signal s99 shown in FIG. 27. A radio transmission frame analyzing section a10 detects additional radio transmission information "sync" shown in FIG. 27.

Based on the detected "sync", the radio transmission frame analyzing section a10 performs sync acquisition for the radio transmission coded frame and a decoder side clock. Then, within a guard time, the radio transmission frame analyzing section a10 performs predetermined processing, such as diversity switching or bidirectional switching, which is necessary for the radio transmission. Then, the radio transmission frame analyzing section a10 outputs an error-correction coded signal s94 which contains information "FEC" obtained by excluding the additional radio transmission information "sync" from the decoder input signal s10. Based on the error-correction coded signal s94, an error-correction coded signal decoding section a18 performs the error-correction decoding processing on an error-correction coded code word FEC. Then, the error-correction coded signal decoding section a18 detects group scale factor information s16 and a requantized signal s11. And, the error-correction coded signal decoding section a18 outputs each signal.

The error code encoding method used for the error-correction encoding processing is arbitrarily chosen from the convolutional coding, the BCH coding and others provided that the selected error code encoding method is consistent in both the encoding processing and the decoding processing. Similarly, selection of single or plural error-correction encoding processing, the number of types of error corrections, setting of the error-correction encoding correction capability, and adoption of the partial error-correction encoding processing are arbitrarily determined provided that the determined processing is consistent in both the encoding processing and the decoding processing.

The error-correction coded signal decoding section a18 detects an encoding error bit number per frame, and judges whether or not the encoding error bit number is equal to or larger than a predetermined threshold. The error-correction coded signal decoding section a18 produces an error detection signal s89 based on the judgement result. When the encoding error bit number is equal to or larger than the predetermined threshold, the content of error detection signal s89 is an instruction requesting the frame interpolation processing. Otherwise, the content of error detection signal s89 becomes an instruction requesting direct output of a decoded signal. The error detection signal s89 is a binary signal representing its state. The information amount of each instruction is arbitrary. The succeeding processing spanning to the re-constructing of bands of this embodiment is performed in the same manner as that shown in the decoding system of the embodiment of the present invention.

A frame interpolation processing section a16 shown in FIG. 38 performs the frame interpolation processing on the decoded output signal s19 (i.e., digital signal) produced from the band combining section a15 based on the error detection signal s89. The frame interpolation processing section a16 outputs an interpolated output signal s97. More specifically, when the error detection signal s89 is the instruction requesting the frame interpolation processing, the frame interpolation processing section a16 performs the frame interpolation processing. When the error detection signal s89 is the instruction requesting direct output of a decoded signal, the frame interpolation processing section a16 directly outputs the decoded output signal s19. The frame interpolation processing performed in this case is the general interpolation of voice, i.e., interpolation processing applied to the digital signal in the digital processing section as shown in FIG. 38.

Interpolation Processing (IV)

Another example of the frame interpolation processing will be explained hereinafter with reference to the block diagram of a decoding system shown in FIG. 39, and the frame arrangement for the error-correction encoding processing shown in FIG. 27. A decoder input signal s10, after being applied the encoding and radio transmission processing in accordance with the embodiment of this invention, is entered into the decoding processing section shown in FIG. 39. The frame arrangement of the decoder input signal s10 is identical with the radio transmission coded frame arrangement of the radio transmission coded output signal s99 shown in FIG. 27. A radio transmission frame analyzing section a10 detects additional radio transmission information "sync" shown in FIG. 27. Based on the detected "sync", the radio transmission frame analyzing section a10 performs sync acquisition for the radio transmission coded frame and a decoder side clock. Then, within a guard time, the radio transmission frame analyzing section a10 performs predetermined processing, such as diversity switching or bidirectional switching, which is necessary for the radio transmission. Then, the radio transmission frame analyzing section a10 outputs an error-correction coded signal s94 which contains information "FEC" obtained by excluding the additional radio transmission information "sync" from the decoder input signal s10.

Based on the error-correction coded signal s94, an error-correction coded signal decoding section a18 performs the error-correction decoding processing on an error-correction coded code word FEC. Then, the error-correction coded signal decoding section a18 detects group scale factor information s16 and a requantized signal s11. And, the error-correction coded signal decoding section a18 outputs each signal. The error code encoding method used for the error-correction encoding processing is arbitrarily chosen from the convolutional coding, the BCH coding and others provided that the selected error code coding method is consistent in both the encoding processing and the decoding processing. Similarly, selection of single or plural error-correction encoding processing, the number of types of error corrections, setting of the error-correction coding correction capability, and adoption of the partial error-correction encoding processing are arbitrarily determined provided that the determined processing is consistent in both the encoding processing and the decoding processing.

The error-correction coded signal decoding section a18 detects an encoding error bit number per frame, and judges whether or not the encoding error bit number is equal to or larger than a predetermined threshold. The error-correction coded signal decoding section a18 produces an error detection signal s89 based on the judgement result. When the encoding error bit number is equal to or larger than the predetermined threshold, the content of error detection signal s89 is an instruction requesting the frame interpolation processing. Otherwise, the content of error detection signal s89 becomes an instruction requesting direct output of a decoded signal. The error detection signal s89 is a binary signal representing its state. The information amount of each instruction is arbitrary. The succeeding processing spanning to the re-constructing of bands of this embodiment is performed in the same manner as that shown in the decoding system of the embodiment of the present invention.

Figure 39:
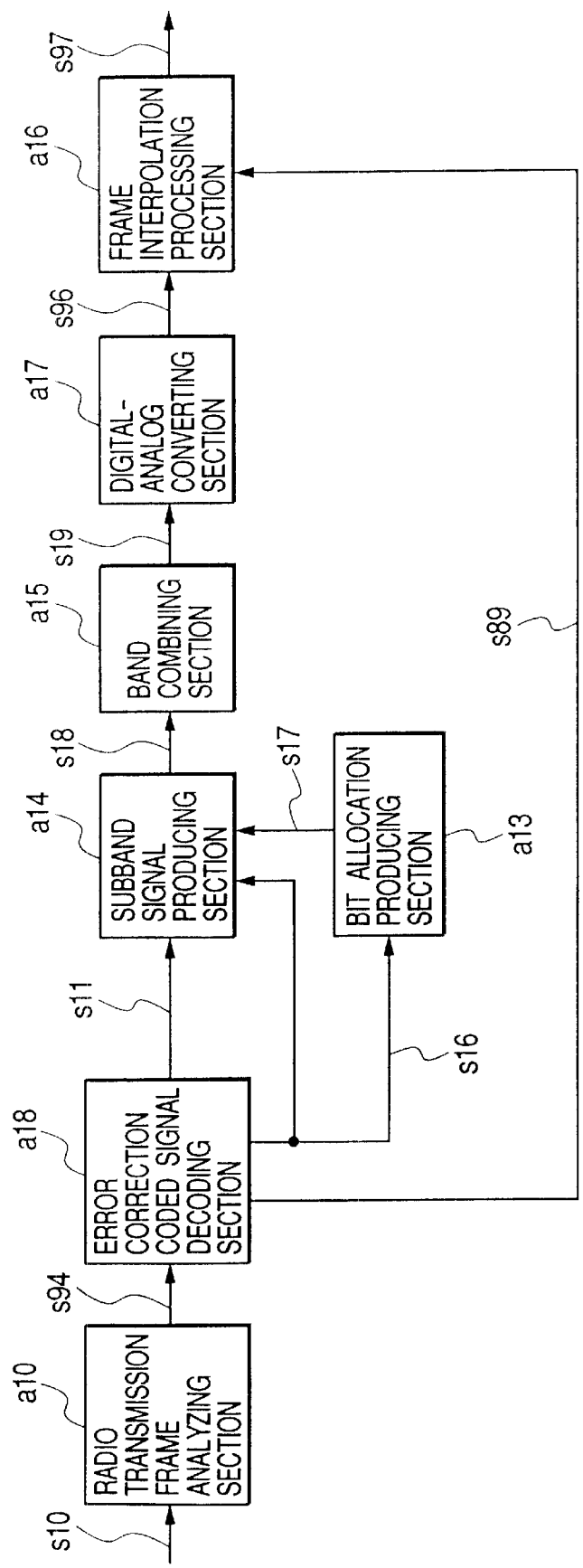
FIG. 39 is a block diagram showing another subband decoding system in accordance with the ninth embodiment of the present invention.
Figure 40:
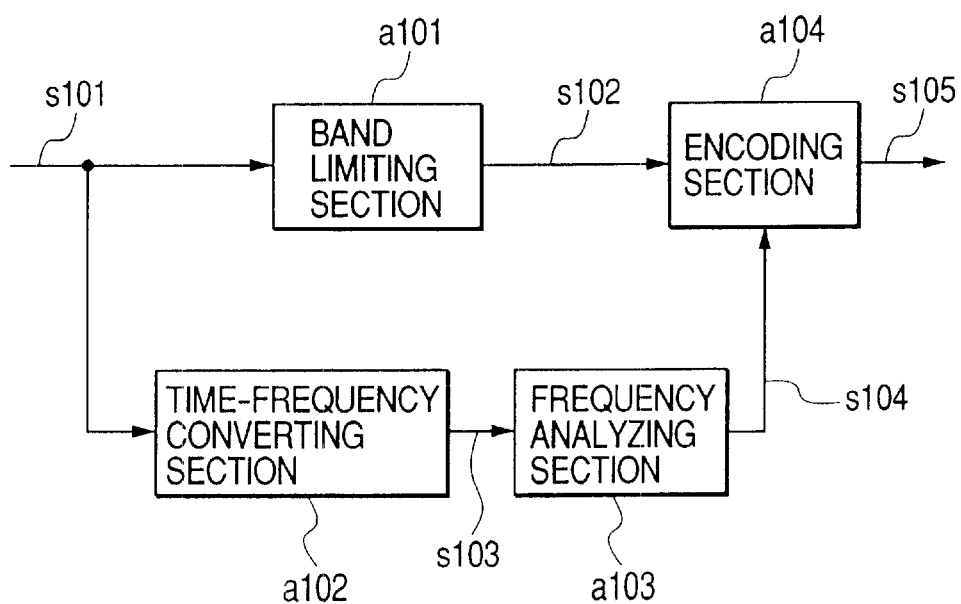
FIG. 40 is a schematic block diagram showing a conventional encoding system for a MPEG1 audio layer.
Figure 41:
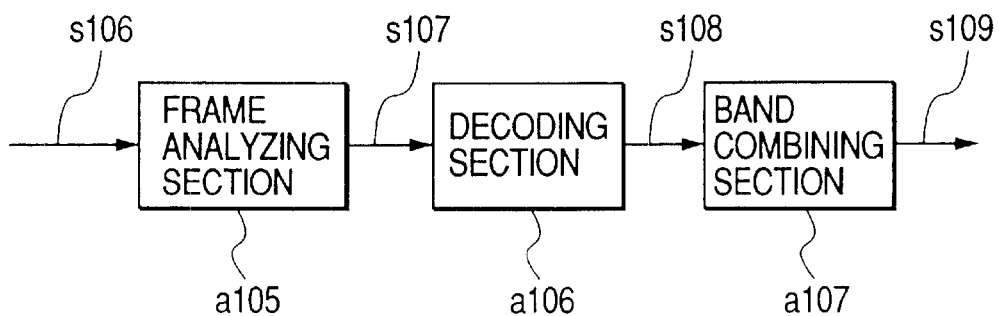
FIG. 41 is a schematic block diagram showing a conventional decoding system for the MPEG1 audio layer.

In FIG. 39, a digital-analog converting section a17 converts the received digital signal, i.e., the decoded output signal s19 produced from the band combining section a15, into an analog signal. Thus, the digital-analog converting section a17 outputs an analog output signal s96. A frame interpolation processing section a16 implements the frame interpolation processing based on the error detection signal s89, and outputs an interpolated output signal s97. More specifically, when the error detection signal s89 is the instruction requesting the frame interpolation processing, the frame interpolation processing section a16 performs the frame interpolation processing. When the error detection signal s89 is the instruction requesting direct output of an analog decoded signal, the frame interpolation processing section a16 directly outputs the analog output signal s96. The frame interpolation processing performed in this case is the interpolation of voice, such as filtering, which is generally used.

As described above, the ninth embodiment of the present invention provides a subband decoding system which performs frame interpolation processing when the encoding error bit number is not smaller than a threshold, and directly outputs a decoded signal otherwise. Thus, even if a non-correctable error occurs during the radio transmission, such an error can be restored as one not being perceived at a user interface level.

Tenth Embodiment

A tenth embodiment of the present invention provides a subband encoding system which implements the interleave processing during the frame construction in the encoding processing and implements the de-interleave processing during the radio transmission frame analysis in the decoding processing.

The tenth embodiment of the present invention will be explained hereinafter with reference to the block diagrams of the encoding system shown in FIGS. 25, 29, and 32 and the block diagrams of the decoding system shown in FIGS. 26, 30, 33, 38 and 39. The radio transmission frame constructing section a08 shown in each of FIGS. 25, 29, and 32 interleaves the error-correction coded output signal. Then, after adding the additional radio transmission information "sync", the radio transmission frame constructing section a08 outputs a radio transmission coded output signal s99. The interleave processing is generally the straight interleave or the cross interleave, which is realized by a device comprising memories and buffers.

Regarding the decoding processing, the radio transmission frame analyzing section a10 shown in each of FIGS. 26, 30, 33, 38 and 39 detects and analyzes the additional radio transmission information "sync" from the decoder input signal s10, and de-interleaves the decoder input signal s10. The information obtained through the de-interleave processing is output as an input signal of the error-correction coded signal decoding processing. Selection of the interleave method, such as straight and cross interleaves, and the row and column bit numbers are arbitrarily determined when the following conditions are satisfied.

(Row bit number×Column bit number)≦(Information amount of radio transmission coded output signal s99−Information amount of additional radio transmission information "sync")

As described above, the tenth embodiment of the present invention provides a subband encoding system which implements the interleave processing during the frame construction in the encoding processing and implements the de-interleave processing during the radio transmission frame analysis in the decoding processing. Thus, by performing the interleave processing during the frame construction for the subband encoding used in the radio transmission, it becomes possible to reduce the delay time in the processing of the overall system.

Effects of Embodiments

As apparent from the foregoing description, the present invention provides a subband encoding system comprising: band splitting means for implementing a band splitting on an encoder input signal to produce subband signals; scale factor producing means for producing a scale factor in accordance with a signal output level of each subband signal; bit allocation producing means for calculating bit allocation information based on the scale factor information; requantizing means for implementing requantization based on the subband signal, the scale factor information and the bit allocation information, thereby outputting a requantized output signal; frame constructing means for constructing a coded frame based on the requantized output signal and the scale factor information, thereby outputting a coded output signal; and limiting means for limiting a total number of split bands of the requantized output signal based on an audible upper limit frequency. Setting the processible upper-limit frequency according to an application and limiting the total number of the split bands processed in the encoding processing bring an effect of reducing the encoding bit rate and the encoding processing amount.

Furthermore, the present invention provides a subband decoding system comprising: frame analyzing means for receiving a subband coded signal as a decoder input signal and for detecting a requantized signal and scale factor information from the received subband coded signal while maintaining frame synchronization; bit allocation producing means for producing bit allocation information based on the scale factor information; subband signal producing means for producing a subband signal from the requantized signal based on the scale factor information and the bit allocation information; and band combining means for combining subband signals produced from the subband signal producing means. Setting the processible upper-limit frequency according to an application and limiting the total number of the split bands processed in the decoding processing bring an effect of reducing the decoding processing amount in a subband decoding operation.

Preferably, the subband encoding system further comprises group scale factor information producing means for producing group scale factor information based on the scale factor information, the group scale factor information being obtained as a representative value of each split band group, wherein the bit allocation producing means calculates the bit allocation information based on the group scale factor information, the requantizing means requantizes the subband signal based on the group scale factor information, thereby outputting the requantized output signal, and the frame constructing means outputs the coded output signal based on the group scale factor information and the requantized output signal. Grouping the split bands and producing a representative scale factor information brings an effect of reducing the encoding bit rate and the encoding processing amount in the subband encoding operation.

Preferably, the frame analyzing means receives the subband coded signal as a decoder input signal and detects the requantized signal and group scale factor information from the received subband coded signal while maintaining frame synchronization, the bit allocation producing means produces the bit allocation information based on the group scale factor information, and the subband signal producing means produces the subband signal from the requantized signal based on the group scale factor information and the bit allocation information. Grouping the split bands and producing a representative scale factor information brings an effect of reducing the decoding processing amount in the subband decoding operation.

Preferably, the subband encoding system further comprises a means for determining an upper limit split band number based on a minimum integer satisfying the following formula ((encoder input signal sampling frequency/2)/(total number of split bands)×(upper limit split band number ))≧(upper limit frequency on application)

and then for setting an encoding processible upper limit frequency. This brings an effect of reducing both the encoding bit rate and the encoding processing amount in the subband encoding operation.

Preferably, the subband encoding system further comprises a means for producing scale factor information for each of 6–20 split band groups when encoding processing is performed for 32 split bands ranging from 0 to a frequency equivalent to (sampling frequency)/2. This brings an effect of reducing both the encoding bit rate and the encoding processing amount in the subband encoding operation.

Preferably, the subband encoding system further comprises a means for setting an encoding frame length equal to (total number of split bands)/(sampling frequency number). This brings an effect of reducing a processing delay time in the subband encoding/decoding processing.

Preferably, the subband encoding system further comprises a means for setting an encoding frame length equal to (total number of split bands)×2/(sampling frequency number). This brings an effect of reducing a processing delay time in the subband encoding/decoding processing.

Preferably, the bit allocation producing means comprises a means for obtaining a ratio of the scale factor information in each split band to a minimum value of an audible smallest value in a corresponding split band group, and a means for producing the bit allocation information based on an energy ratio of each of all split bands considering the audible smallest value. This brings an effect of reducing the processing amount required for producing the bit allocation information in the subband encoding/decoding processing.

Preferably, the bit allocation producing means comprises a means for obtaining a ratio of the scale factor information in each split band to an average value of an audible smallest value in a corresponding split band group, and a means for producing the bit allocation information based on an energy ratio of each of all split bands considering the audible smallest value. This brings an effect of reducing the processing amount required for producing the bit allocation information in the subband encoding/decoding processing.

Preferably, the bit allocation producing means comprises a means for converting the bit allocation information into a comparable integer for each band, wherein remaining allocatable bits are allocated one by one to appropriate split bands according to a ranking order of the split bands determined based on largeness of a numerical value in the digits lower than a decimal point in their energy ratios. This realizes effective utilization of the encoding bits and brings an effect of reducing the processing amount required for producing the bit allocation information in the subband encoding/decoding processing.

Preferably, the bit allocation producing means comprises a means for producing the bit allocation information by multiplying a weighting factor of each frequency region. This realizes effective utilization of the encoding bits and brings an effect of reducing the processing amount required for producing the bit allocation information in the subband encoding/decoding processing as well as an effect of improving the sound quality.

Preferably, the bit allocation producing means comprises a means for producing the bit allocation information by multiplying a weighting factor of the scale factor information of each split band. This realizes effective utilization of the encoding bits and brings an effect of reducing the processing amount required for producing the bit allocation information in the subband encoding/decoding processing as well as an effect of improving the sound quality.

Preferably, the subband encoding system further comprises a means for equalizing an encoding frame length with a transmission frame length, and a means for putting additional transmission information during an encoding operation, the additional transmission information including a sync word. This brings an effect of shortening a buffering time and a processing amount required for the transmission path encoding and decoding processing as well as an effect of reducing the encoding bit rate when this subband encoding system is used for radio transmission.

Preferably, the subband encoding system further comprises a means for transmitting a sync-dedicated frame at predetermined time intervals, the sync-dedicated frame consisting of sync acquisition words only. This brings an effect of shortening a reset time required for restoring the scale factor information when the scale factor information is deteriorated due to transmission error when this subband encoding system is used for radio transmission.

Preferably, the subband decoding system further comprises a means for performing mute processing applied to a sync-dedicated frame which appears at predetermined time intervals and consists of sync acquisition words only, and a means for performing interpolation of data applied to a digital signal in a decoding processing section. This brings an effect of preventing a data blank of one frame from being detected at a user side when such a data blank occurs during the encoding and decoding processing.

Preferably, the subband decoding system further comprises a means for performing mute processing applied to a sync-dedicated frame which appears at predetermined time intervals and consists of sync acquisition words only, and a means for performing interpolation of data applied to an analog signal in a decoding processing section. This brings an effect of preventing a data blank of one frame from being detected at a user side when such a data blank occurs during the encoding and decoding processing.

Preferably, the subband encoding system further comprises a means for performing error-correction encoding processing during an encoding operation. This brings an effect of reducing the transmission error when this subband encoding system is used for radio transmission as well as an effect of reducing the system processing amount.

Preferably, the error-correction encoding processing is performed by assigning different error-correction capabilities to respective information constituting a coded frame considering characteristics of encoder error robustness. This brings an effect of reducing the transmission error when this subband encoding system is used for radio transmission as well as an effect of reducing the encoding bit rate.

Preferably, the error-correction encoding processing is performed by using BCH codes. This brings an effect of reducing the transmission error when this subband encoding system is used for radio transmission as well as an effect of reducing the encoding bit rate.

Preferably, the error-correction encoding processing is performed by using a convolutional coding. This brings an effect of reducing the transmission error when this subband encoding system is used for radio transmission as well as an effect of reducing the encoding bit rate.

Preferably, the error-correction encoding processing is performed by assigning different types of error correction codes to respective information constituting a coded frame considering characteristics of encoder error robustness. This brings an effect of reducing the transmission error when this subband encoding system is used for radio transmission as well as an effect of reducing the encoding bit rate.

Preferably, the different types of error correction codes are a combination of BCH and convolutional codes. This brings an effect of reducing the transmission error when this subband encoding system is used for radio transmission as well as an effect of reducing the encoding bit rate.

Preferably, the error-correction encoding processing is performed for part of information constituting a coded frame in response to importance of each information. This brings an effect of reducing the encoding bit rate.

Preferably, the subband encoding system further comprises a means for rearranging requantized output signals considering influence of encoding error. This brings an effect of reducing deterioration at a user interface level induced by encoding error.

Preferably, the subband decoding system further comprises a means for performing mute processing applied to a frame having an error bit number not smaller than a predetermined threshold, and a means for performing interpolation of data applied to a digital signal in a decoding processing section. This brings an effect of preventing an encoding error occurring during radio transmission from being detected at a user interface level.

Preferably, the subband decoding system further comprises a means for performing mute processing applied to a frame having an error bit number not smaller than a predetermined threshold, and a means for performing interpolation of data applied to an analog signal in a decoding processing section. This brings an effect of preventing an encoding error occurring during radio transmission from being detected at a user interface level.

Preferably, the subband encoding system further comprises a means for performing interleave processing during construction of a coded frame. This brings an effect of reducing a burst-like transmission error when this subband encoding system is used for radio transmission as well as an effect of reducing a delay time caused by a buffering in the interleave processing.

Preferably, the subband decoding system further comprises a means for performing de-interleave processing during analysis of a transmitted frame. This brings an effect of reducing a burst-like transmission error when used for radio transmission as well as an effect of reducing a delay time caused by the buffering in the interleave processing.

Accordingly, in an apparatus which transmits high-quality music or sounds at highly efficient rates, both a small delay and a low encoding bit rate can be realized in the transmission. Due to reduction of an overall processing amount, both a compact size and a low energy consumption can be realized. When the compression processing is performed for recording a large amount of high-quality music or sounds, a waiting time for the compression processing can be reduced. Thus, when used on an application, the actual quality of the high-quality music or sounds can be improved.

This invention may be embodied in several forms without departing from the spirit of essential characteristics thereof. The present embodiments as described are therefore intended to be only illustrative and not restrictive, since the scope of the invention is defined by the appended claims rather than by the description preceding them. All changes that fall within the metes and bounds of the claims, or equivalents of such metes and bounds, are therefore intended to be embraced by the claims.

What is claimed is:

1. A subband encoding system comprising:
   band splitting means for implementing a band splitting on an encoder input signal to produce subband signals;
   scale factor producing means for producing a scale factor information in accordance with a signal normalized level of each subband signal;
   bit allocation producing means for calculating bit allocation information based on said scale factor information;
   requantizing means for implementing requantization based on said subband signal, said scale factor information and said bit allocation information, thereby outputting a requantized output signal;

frame constructing means for constructing a coded frame based on said requantized output signal and said scale factor information, thereby outputting a coded output signal; and limiting means for limiting a total number of split bands of said requantized output signal based on an audible upper limit frequency.

2. The subband encoding system in accordance with claim 1, further comprising a means for performing interleave processing during construction of a coded frame.

3. The subband encoding system in accordance with claim 1, further comprising group scale factor information producing means for producing group scale factor information based on said scale factor information, said group scale factor information being obtained as a representative value of each split band group, wherein said bit allocation producing means calculates the bit allocation information based on said group scale factor information, said requantizing means requantizes said subband signal based on said group scale factor information, thereby outputting the requantized output signal, and said frame constructing means outputs the coded output signal based on said group scale factor information and said requantized output signal.

4. The subband encoding system in accordance with claim 3, wherein said bit allocation producing means obtains a ratio of said scale factor information in each split band to a minimum value of an audible smallest value in a corresponding split band group, and produces the bit allocation information based on an energy ratio of each of all split bands considering said audible smallest value.

5. The subband encoding system in accordance with claim 3, wherein said bit allocation producing means comprises obtains a ratio of said scale factor information in each split band to an average value of an audible smallest value in a corresponding split band group, and produces the bit allocation information based on an energy ratio of each of all split bands considering said audible smallest value.

6. The subband encoding system in accordance with claim 3, wherein said group scale factor information producing means produces group scale factor information for each of 6–20 split band groups when encoding processing is performed for 32 split bands ranging from 0 to a frequency equivalent to (sampling frequency)/2.

7. The subband encoding system in accordance with claim 1, further comprising a means for setting an encoding frame length equal to a value defined by (total number of split bands)/(sampling frequency number).

8. The subband encoding system in accordance with claim 1, further comprising a means for setting an encoding frame length equal to a value defined by (total number of split bands)×2/(sampling frequency number).

9. The subband encoding system in accordance with claim 1, further comprising a means for determining an upper limit split band number based on a minimum integer satisfying the following formula ((encoder input signal sampling frequency/2)/(total number of split bands)×(upper limit split band number ))≧(upper limit frequency on application)

and then for setting an encoding processible upper limit frequency.

10. The subband encoding system in accordance with claim 1, further comprising a means for transmitting a sync-dedicated frame at predetermined time intervals, said sync-dedicated frame consisting of sync acquisition words only.

11. The subband encoding system in accordance with claim 1, wherein said bit allocation producing means converts the bit allocation information into a comparable integer for each band, wherein remaining allocatable bits are allocated one by one to appropriate split bands according to a ranking order of the split bands determined based on largeness of a numerical value in the digits lower than a decimal point in their energy ratios.

12. The subband encoding system in accordance with claim 1, wherein said bit allocation producing means produces the bit allocation information by multiplying a weighting factor of each frequency region.

13. The subband encoding system in accordance with claim 1, wherein said bit allocation producing means produces the bit allocation information by multiplying a weighting factor of the scale factor information of each split band.

14. The subband encoding system in accordance with claim 1, further comprising a means for equalizing an encoding frame length with a transmission frame length, and a means for putting additional transmission information during an encoding operation, said additional transmission information including a sync word.

15. A subband decoding system comprising:

frame analyzing means for receiving a subband coded signal as a decoder input signal and for detecting a requantized signal and scale factor information from the received subband coded signal while maintaining frame synchronization;

bit allocation producing means for producing bit allocation information based on said scale factor information;

subband signal producing means for producing a subband signal from said requantized signal based on said scale factor information and said bit allocation information; and band combining means for combining subband signals produced from said subband signal producing means.

16. The subband decoding system in accordance with claim 15, further comprising a means for performing mute processing applied to a sync-dedicated frame which appears at predetermined time intervals and consists of sync acquisition words only, and a means for performing interpolation of data applied to a digital signal in a decoding processing section.

17. The subband decoding system in accordance with claim 15, further comprising a means for performing mute processing applied to a sync-dedicated frame which appears at predetermined time intervals and consists of sync acquisition words only, and a means for performing interpolation of data applied to an analog signal in a decoding processing section.

18. The subband encoding system in accordance with claim 1, further comprising a means for performing an error-correction encoding processing during an encoding operation.

19. The subband encoding system in accordance with claim 18, wherein said error-correction encoding processing is performed by assigning different error-correction capabilities to respective information constituting a coded frame considering characteristics of encoder error robustness.

20. The subband encoding system in accordance with claim 18, wherein said error-correction encoding processing is performed by using a BCH coding.

21. The subband encoding system in accordance with claim 18, wherein said error-correction encoding processing is performed by using a convolutional coding.

22. The subband encoding system in accordance with claim 18, wherein said error-correction encoding processing is performed by assigning different types of error correction codes to respective information constituting a coded frame considering characteristics of encoder error robustness.

23. The subband encoding system in accordance with claim 22, wherein said different types of error correction codes are a combination of BCH and convolutional codes.

24. The subband encoding system in accordance with claim 18, wherein said error-correction encoding processing is performed for part of information constituting a coded frame in response to importance of each information.

25. The subband encoding system in accordance with claim 18, further comprising a means for rearranging requantized output signals considering influence of encoding error.

26. The subband decoding system in accordance with claim 15, further comprising a means for performing mute processing applied to a frame having an error bit number not smaller than a predetermined threshold, and a means for performing interpolation of data applied to a digital signal in a decoding processing section.

27. The subband decoding system in accordance with claim 15, further comprising a means for performing mute processing applied to a frame having an error bit number not smaller than a predetermined threshold, and a means for performing interpolation of data applied to an analog signal in a decoding processing section.

28. The subband decoding system in accordance with claim 15, wherein said frame analyzing means receives the subband coded signal as the decoder input signal and detects group scale factor information in addition to said requantized signal from the received subband coded signal while maintaining frame synchronization, said bit allocation producing means produces the bit allocation information based on said group scale factor information, and said subband signal producing means produces the subband signal from said requantized signal based on said group scale factor information and said bit allocation information.

29. The subband decoding system in accordance with claim 15, further comprising a means for performing de-interleave processing during analysis of a transmitted frame.

* * * * *